US012694744B2

(12) United States Patent
Cost et al.

(10) Patent No.: US 12,694,744 B2
(45) Date of Patent: Jul. 28, 2026

(54) JAM CLEARANCE MECHANISM FOR BANKNOTE FEEDER

(71) Applicant: Crane Payment Innovations, Inc., Malvern, PA (US)

(72) Inventors: Evan John Cost, Audubon, PA (US); Robert Clauser, Columbus, NJ (US)

(73) Assignee: Crane Payment Innovations, Inc., Malvern, PA (US)

( * ) Notice: Subject to any disclaimer, the term of this patent is extended or adjusted under 35 U.S.C. 154(b) by 18 days.

(21) Appl. No.: 18/689,176

(22) PCT Filed: Nov. 4, 2022

(86) PCT No.: PCT/US2022/079318
§ 371 (c)(1),
(2) Date: Mar. 5, 2024

(87) PCT Pub. No.: WO2023/081836
PCT Pub. Date: May 11, 2023

(65) Prior Publication Data

US 2024/0386769 A1 Nov. 21, 2024

Related U.S. Application Data

(60) Provisional application No. 63/276,432, filed on Nov. 5, 2021.

(51) Int. Cl.
*G07D 11/14* (2019.01)

(52) U.S. Cl.
CPC ......... *G07D 11/14* (2019.01); *G07D 2211/00* (2013.01)

(58) Field of Classification Search
CPC .... G07D 11/14; G07D 11/40; B65H 2402/44; B65H 2601/321; B65H 2601/324
See application file for complete search history.

(56) References Cited

U.S. PATENT DOCUMENTS 5,324,921 A * 6/1994 Takarada ................ G06M 7/06 271/265.02
6,000,521 A 12/1999 Jung
(Continued)

FOREIGN PATENT DOCUMENTS

CN 1198558 A 11/1998
CN 101405773 A 4/2009
(Continued)

OTHER PUBLICATIONS

International Search Report and the Written Opinion of the International Searching Authority dated Feb. 2, 2023, in connection with International Application No. PCT/US2022/079318, 7 pages.
(Continued)

*Primary Examiner* — Patrick Cicchino

(57) ABSTRACT

A banknote feeder includes a body and a cover. The body is configured to attach to a banknote receiver. The cover is removably coupled to the body using a guide assembly. The guide assembly is configured to linearly guide the cover in an operational position away from the body to a pulled position. The guide assembly is also configured to rotatably guide the cover away from the pulled position to a hinged position.

20 Claims, 51 Drawing Sheets

(56) References Cited

U.S. PATENT DOCUMENTS

| | | | | |
|---|---|---|---|---|
| 8,662,490 | B2 * | 3/2014 | Clauser | G07D 11/14<br>194/207 |
| 11,967,195 | B2 * | 4/2024 | Togano | G07D 11/40 |
| 11,987,463 | B2 * | 5/2024 | Jang | G07D 11/40 |
| 12,175,820 | B2 * | 12/2024 | Hamada | G07D 11/13 |
| 2001/0015309 | A1 * | 8/2001 | Ikuta | G07D 11/14<br>194/206 |
| 2006/0081441 | A1 * | 4/2006 | Vysma | G07F 1/04<br>194/206 |
| 2007/0000993 | A1 | 1/2007 | Graef et al. | |
| 2009/0314839 | A1 | 12/2009 | Saltsov et al. | |
| 2010/0289208 | A1 * | 11/2010 | Clauser | G07D 11/14<br>271/145 |
| 2020/0005576 | A1 * | 1/2020 | Yates | B65H 1/06 |
| 2022/0108580 | A1 * | 4/2022 | Hamada | G07D 11/13 |

FOREIGN PATENT DOCUMENTS

| | | | | |
|---|---|---|---|---|
| JP | 2014191446 A | * | 10/2014 | G07D 11/14 |
| KR | 101001695 B1 | | 12/2010 | |

OTHER PUBLICATIONS

Extended European Search Report dated Aug. 5, 2025, European Application No. 22891106.1, 8 pages.
Examination Report No. 1 dated Jan. 20, 2026, in connection with Australian Application No. 2022381762, 3 pages.
Office Action dated Apr. 13, 2026, in connection with Chinese Application No. 202280072639.3, 17 pages.

* cited by examiner

JAM CLEARANCE MECHANISM FOR BANKNOTE FEEDER

CROSS REFERENCE TO RELATED APPLICATIONS

This application is a 371 National Stage of International Application No. PCT/US2022/079318, filed Nov. 4, 2022, which claims priority to U.S. Provisional Patent Application No. 63/276,432, filed Nov. 5, 2021, the disclosures of which are incorporated herein by reference in their entirety.

TECHNICAL FIELD

This disclosure relates generally to automated payment systems. More specifically, this disclosure relates to an architecture of a multi-mode banknote feeder implementation within a banknote deposit-withdrawal system or other system.

BACKGROUND

Banknote deposit-withdrawal systems can be included in cashier safes, gaming machines, cashier-assisted automated cash handling systems, change providing systems, self-service terminals such as self-checkout terminals, vending machines, ticket dispensers, photocopiers, ATMs, and the like. In banknote deposit-withdrawal systems, a banknote feeder allows for individual note insertion or a stack of banknotes also known as bulk note feeding. Banknote feeders, by necessity, have larger openings than single note acceptors. The larger opening presents more opportunity for foreign object ingress, such as coins, credit cards, trash, etc. Previous banknote feeders have moving mechanisms at an inlet to provide the necessary pressure on the banknote bundle, which slows down single note feeding through the different banknote deposit-withdrawal system or other systems. Thus, current systems have to compromise between single note and bulk banknote use cases, such as in reducing an amount of notes that are included in a bulk banknote use case. The smaller bundle size results in wasted motion and time.

This disclosure relates generally to automated payment systems. More specifically, this disclosure relates to an architecture of a multi-mode banknote feeder implementation within a banknote deposit-withdrawal system or other system.

SUMMARY

This disclosure provides a jam clearance mechanism for a banknote feeder device or other system.

In various embodiments, a banknote feeder can include a housing and a cover meant to contain internal component for feeding banknotes. The cover can be arranged in three different positions in relation to the housing including an operational position, a pulled position, and a hinged position. The operational position is an arrangement where the cover is coupled with a latch to enclose the banknote path. The latch can extend from the cover or the housing. The pulled position exposes the banknote path in order to identify a banknote jam along the banknote path in the banknote feeder and is an arrangement where first pins on the cover are linearly moved along a linear slot of a banknote accept inlet positioned in the housing and second pins on the cover are linearly moved along a linear portion of a combined linear and arc slot on sidewalls of the housing. The hinged position rotates the cover away from the housing to allow access to remove the identified banknote jam and is an arrangement where the first pins operate as a hinge and the second pins travel along an arc portion of the combination linear and arc slot.

In various embodiments, a banknote feeder can include a housing, a banknote accept inlet, a cover, and a wire. The housing can include a combination linear and arc slots positioned in each side wall. The banknote accept inlet can be positioned inside the housing including linear slots positioned in each side wall. The cover can include a guide assembly and a latch. The guide assembly can connect to the housing and can include a set of first pins and a set of second pins. The first pins are configured to insert into the linear slots. The second pins are configured to insert into the combination linear and arc slots. The latch is configured to secure the cover to the housing. The wire can extend from the housing to the cover. The cover can be arranged in an operational position, a pulled position, and a hinged position. The operational position is where the first pins are at a first end of the linear slot, the second pins are at a first end of a linear portion of the combination linear and arc slots, and the latch is secured to the housing. The pulled positioned is where the latch is removed from the housing, the first pins have been moved to a second end of the linear slot, and the second pins are between the linear portion and an arc portion of the combination arc and linear slot. The hinged positioned is where the first pins remain at the second end of the linear slot to act as hinges as the second pins are transitioned to an end of the arc portion of the combination linear and arc slots. In the hinged position, the first pins can be removable from the linear slot, the second pins can be removable from the combination linear and arc slot, and the wire is accessible to be disconnected from the cover.

In various embodiments, a banknote feeder includes a body and a cover. The body is configured to attach to a banknote receiver. The cover is removably coupled to the body using a guide assembly. The guide assembly is configured to linearly guide the cover in an operational position away from the body to a pulled position. The guide assembly is also configured to rotatably guide the cover away from the pulled position to a hinged position.

In certain embodiments, the body comprises first slots positioned on each side wall of the body. The guide assembly includes first pins insert into the first slots and are configured to linearly and rotatably guide the cover from the operational position to the pulled position and from the pulled position to the hinged position.

In certain embodiments, the first slots include a linear portion configured to guide the first pins to move the cover from the operational position to the pulled position.

In certain embodiments, the first slots include an arc portion configured to guide the first pins to rotate the cover from the pulled position to the hinged position.

In certain embodiments, the body includes second slots positioned on each side wall of the body. The guide assembly includes second pins inserted into the second slots and are configured to not allow rotation of the cover through a linear motion of the cover from the operational position to the pulled position.

In certain embodiments, the second pins are further configured to not allow linear movement of the cover through a rotation motion of the cover from the pulled position to the hinged position.

In certain embodiments, the banknote feeder further includes a latch fixedly coupled to the cover and removably coupled to the body and is configured to maintain the cover in the operational position while removably coupled to the body.

In certain embodiments, the latch includes a groove and a prong. The groove is formed in the body. The prong is coupled to the cover and configured to insert into the groove in the body to maintain the cover in the operational position.

In certain embodiments, the groove includes a depression on a lower surface of the groove. The prong includes a protrusion extending from a lower surface of the prong and the protrusion is configured to insert into the depression to lock the prong into the groove.

In certain embodiments, the banknote feeder further includes a dispense tray in a dispense outlet. The dispense tray includes a water ingress slot configured to route a fluid introduced into the banknote feeder to an exterior of the banknote feeder.

In various embodiments, a banknote system includes a banknote receiver and a banknote feeder. The banknote feeder includes a body and a cover. The body is configured to attach to a banknote receiver. The cover is removably coupled to the body using a guide assembly. The guide assembly is configured to linearly guide the cover in an operational position away from the body to a pulled position. The guide assembly is also configured to rotatably guide the cover away from the pulled position to a hinged position.

In certain embodiments, the body comprises first slots positioned on each side wall of the body. The guide assembly includes first pins inserted into the first slots and configured to linearly and rotatably guide the cover from the operational position to the pulled position and from the pulled position to the hinged position.

In certain embodiments, the first slots include a linear portion configured to guide the first pins to allow the cover to move from the operational position to the pulled position.

In certain embodiments, the first slots include an arc portion configured to guide the first pins and rotate the cover from the pulled position to the hinged position.

In certain embodiments, the body includes second slots positioned on each sidewall of the body. The guide assembly includes second pins inserted into the second slots and configured to not allow rotation of the cover through a linear motion of the cover from the operational position to the pulled position.

In certain embodiments, the second pins are further configured to not allow linear movement of the cover through a rotation motion of the cover from the pulled position to the hinged position.

In certain embodiments, the banknote feeder further comprises a latch fixedly coupled to the cover and removably coupled to the body and configured to maintain the cover in the operational position while removably coupled to the body.

In certain embodiments, the latch comprises a groove formed in the body and a prong coupled to the cover and configured to insert into the groove in the body to maintain the cover in the operational position.

In certain embodiments, the groove includes a depression on a lower surface of the groove. The prong includes a protrusion extending from a lower surface of the prong. The protrusion is configured to insert into the depression to lock the prong into the groove.

In certain embodiments, the banknote feeder further comprises a dispense tray in a dispense outlet. The dispense tray includes a water ingress slot configured to route a fluid introduced into the banknote feeder to an exterior of the banknote feeder.

Other technical features may be readily apparent to one skilled in the art from the following FIGURES, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1A through 13, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

As used throughout this specification, the terms currency denomination, denomination of currency, valuable document, currency bill, bill, banknote, note, bank check, paper money, paper currency, and cash may be used interchangeably herein to refer to a type of a negotiable instrument or any other writing that evidences a right to the payment of a monetary obligation, typically issued by a central banking authority. In addition, direction, orientation or axis may be used interchangeably herein to refer to the direction of linear mechanical movement of components. In this specification terms banknote storing unit, banknote storage, banknote storing portion, tamper-evident storage, secured banknote storage may be used interchangeably herein to refer to a type of an instrument or any other device that may store currency from any systems incorporating a banknote acceptor.

The embodiments of a document transport system illustrated in FIGS. 1A through 13 are for illustration only. FIGS. 1A through 13 do not limit the scope of this disclosure to any particular implementation of a document transport system.

Figure 1A:
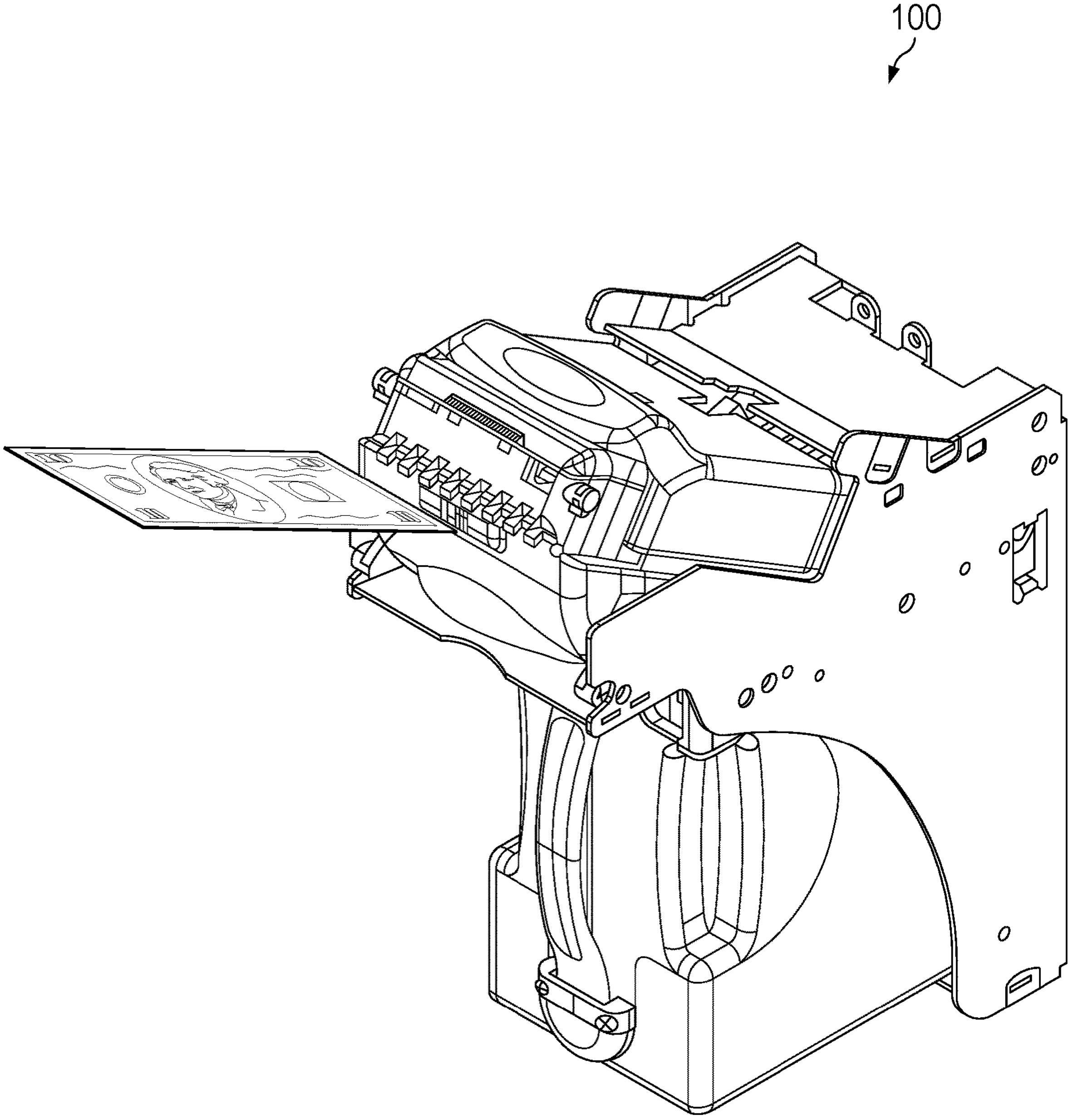
FIG. 1A illustrates an example of a banknote accepting apparatus in accordance with various embodiments of the present disclosure.
Figure 1B:
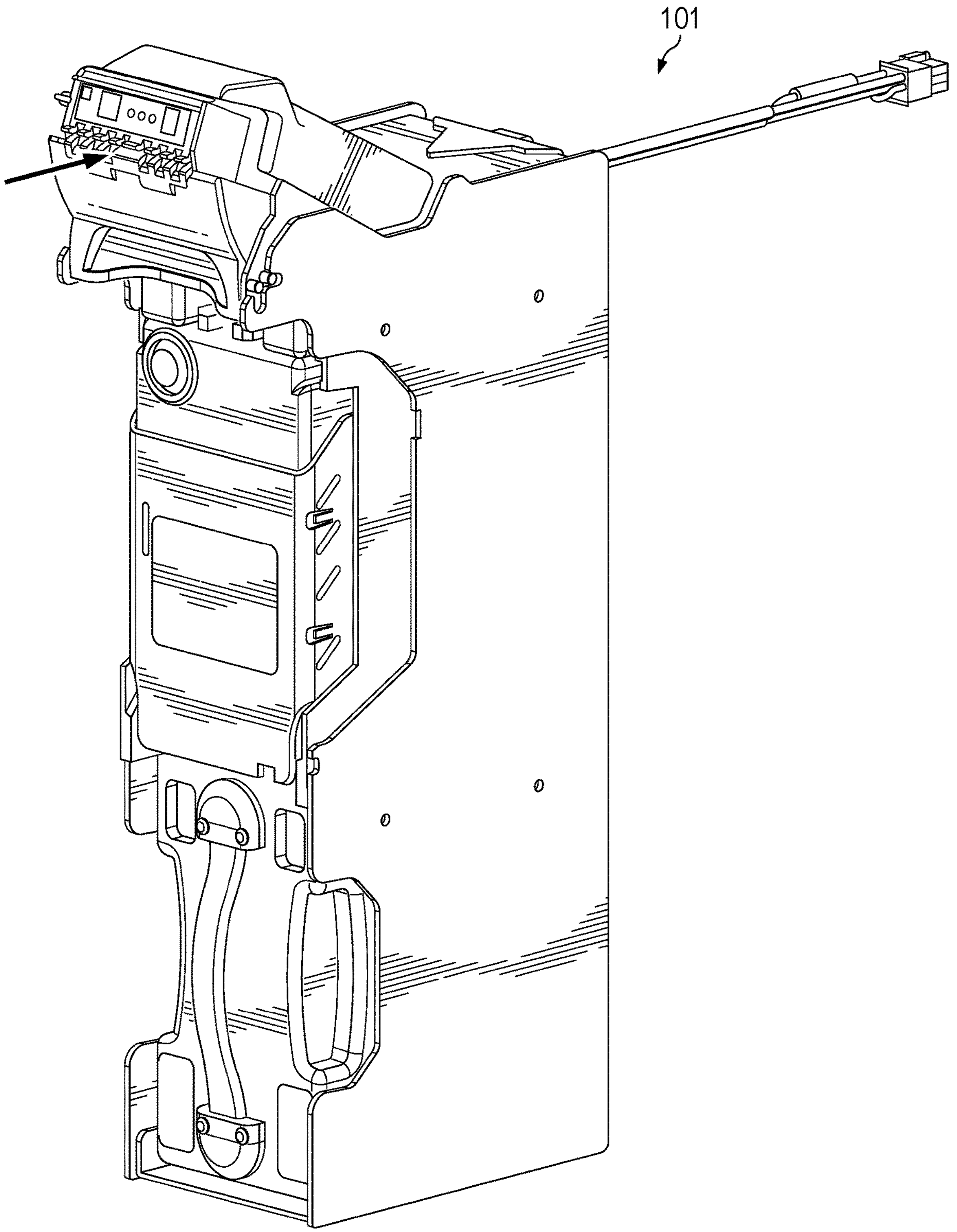
FIG. 1B illustrates an example of a banknote accepting apparatus in accordance with various embodiments of the present disclosure.
Figure 1C:
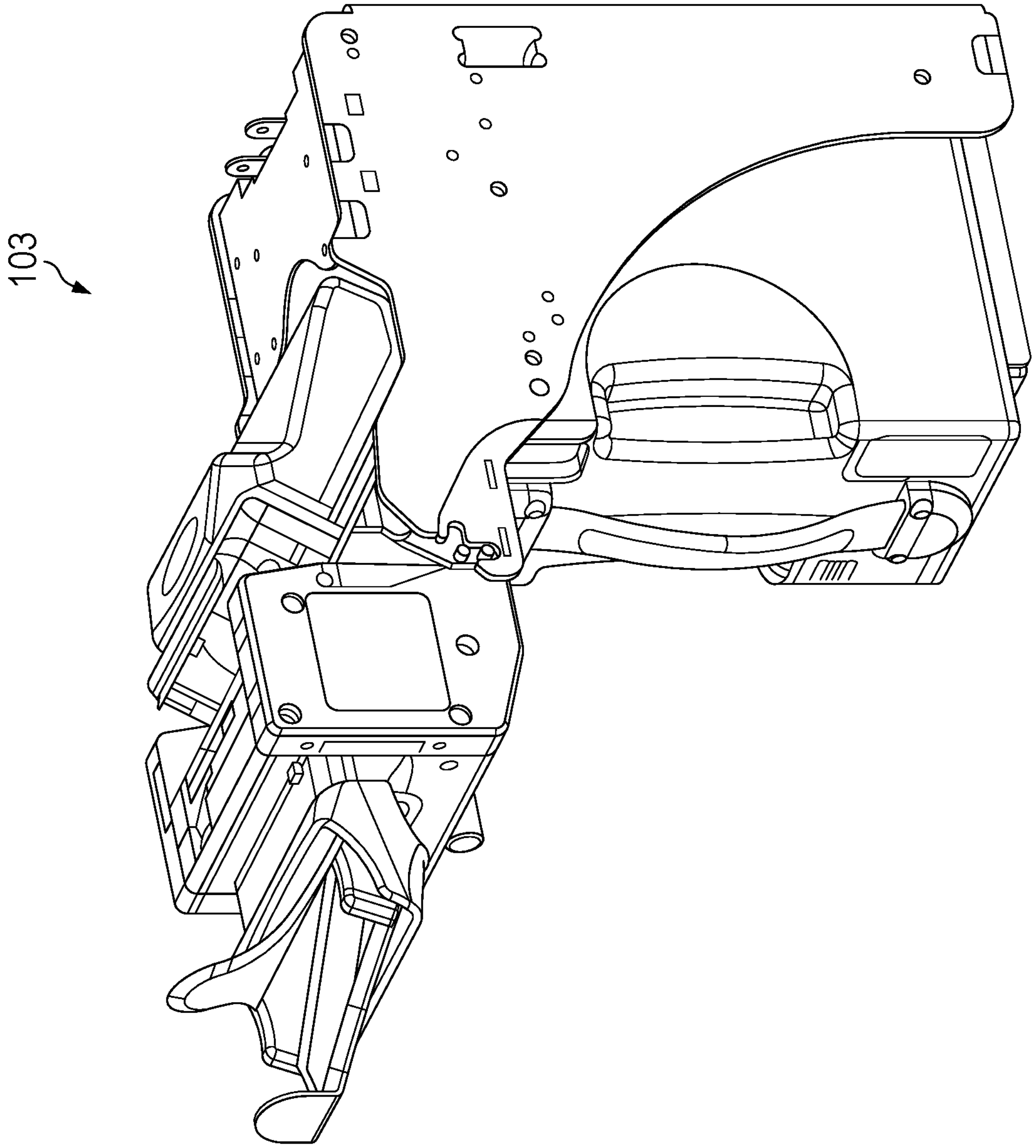
FIG. 1C illustrates an example of a banknote accepting apparatus in accordance with various embodiments of the present disclosure.
Figure 1D:
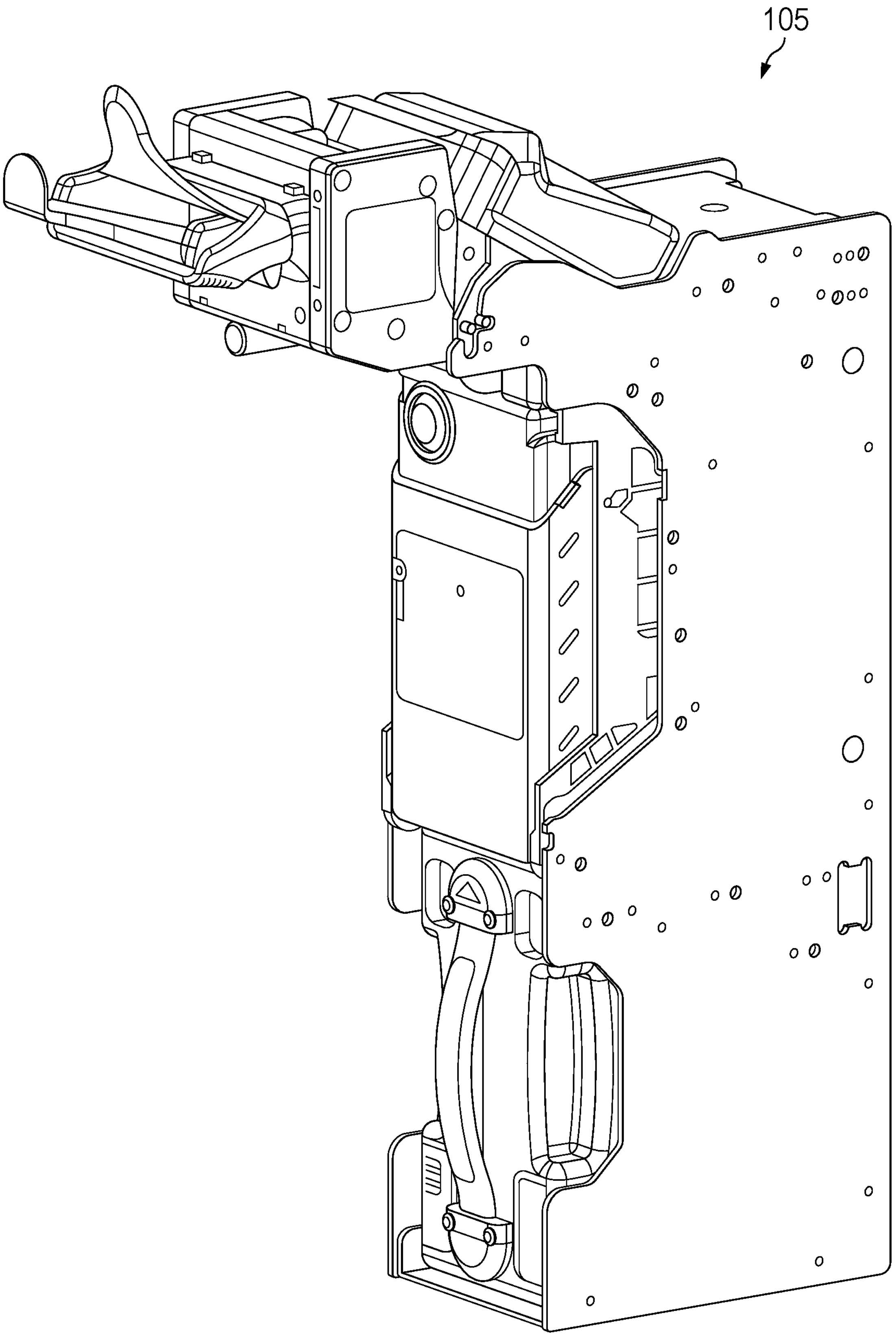
FIG. 1D illustrates an example of a banknote accepting apparatus in accordance with various embodiments of the present disclosure.
Figure 1E:
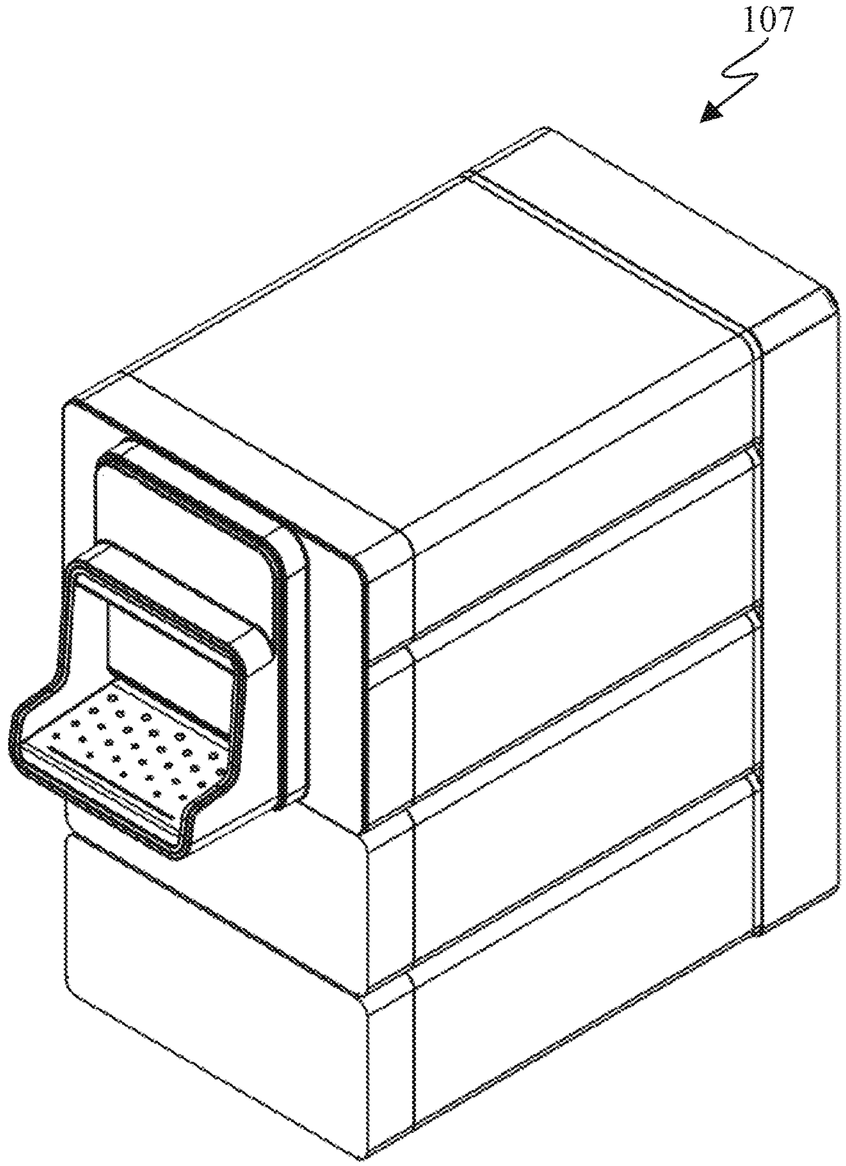
FIG. 1E illustrates an example of a banknote accepting apparatus in accordance with various embodiments of the present disclosure.
Figure 1F:
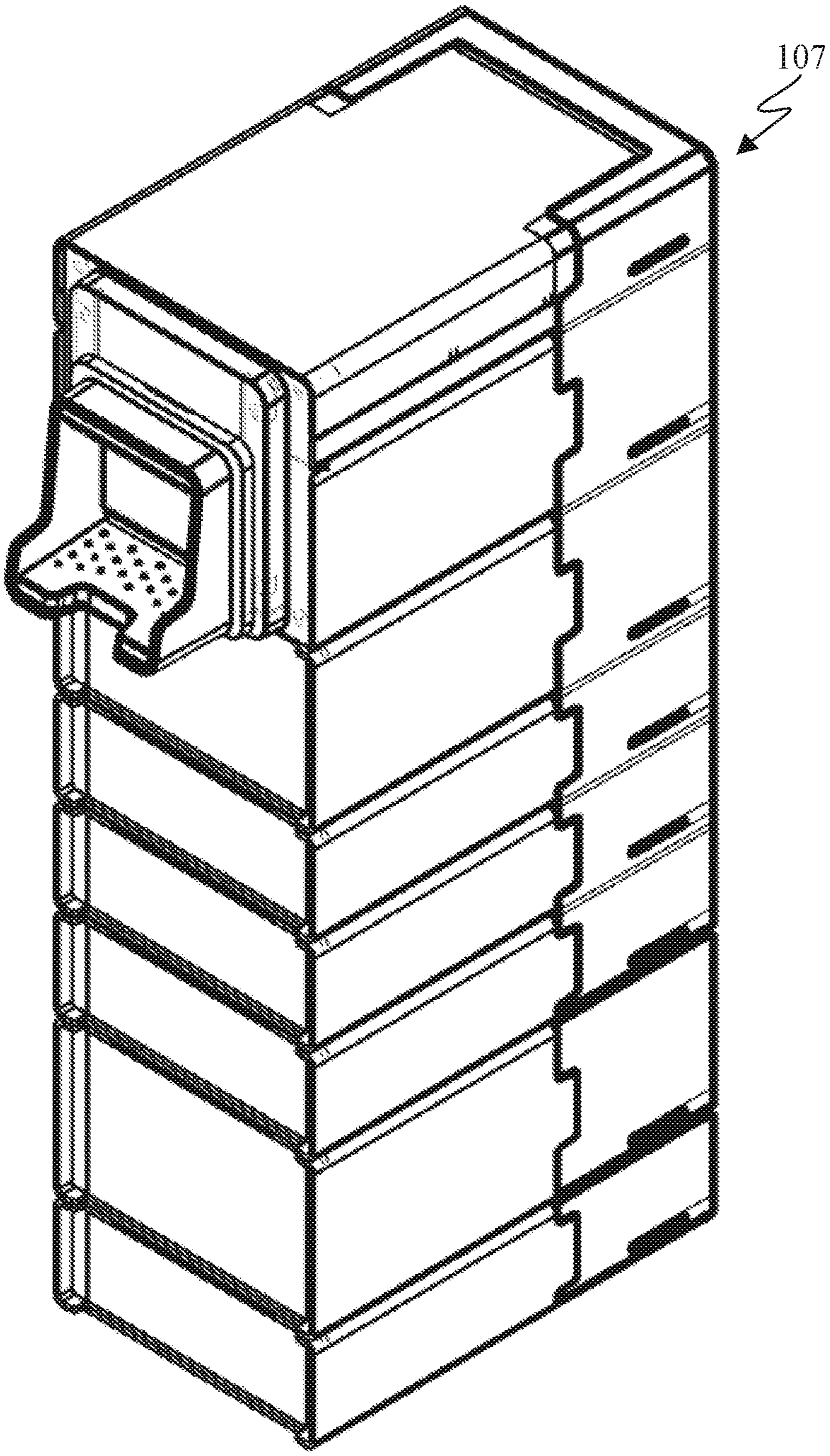
FIG. 1F illustrates an example of a banknote accepting apparatus in accordance with various embodiments of the present disclosure.

FIGS. 1A through 1F illustrate schematic views of banknote acceptor and banknote deposit-withdrawal systems in accordance with various embodiments of the present disclosure. FIG. 1A illustrates an example of a banknote acceptor system 100 in accordance with various embodiments of the present disclosure. FIG. 1B illustrates an example of a banknote deposit-withdrawal system 101 in accordance with various embodiments of the present disclosure. FIG. 1C illustrates an example of a banknote acceptor system 103 in accordance with various embodiments of the present disclosure. FIG. 1D illustrates an example of a banknote deposit-withdrawal system 105 in accordance with various embodiments of the present disclosure. FIG. 1E illustrates an example of a banknote deposit-withdrawal system 107 in accordance with various embodiments of the present disclosure. FIG. 1F illustrates an example of a banknote deposit-withdrawal system 109 in accordance with various embodiments of the present disclosure.

FIG. 1A shows a banknote acceptor system 100 configured to verify the authenticity of the inserted banknote. The banknote acceptor system 100 generally has an acceptor head or banknote feeder, a banknote transport system and a removable banknote storage unit. Inserted banknotes are generally authenticated in a banknote accepting module using various sensors, once the banknote is deemed authentic and deemed acceptable the banknote is transported further into the banknote acceptor using the banknote transport system into the removable banknote storage unit.

FIG. 1B illustrates a banknote deposit-withdrawal system 101 in accordance with various embodiments of the present disclosure. In addition to a banknote accepting module or banknote feeder, a banknote transport system, and a removable banknote storage unit as shown in FIG. 1A, the banknote deposit-withdrawal system 101 illustrated in FIG. 1B comprises a banknote recycling module that allows the unit to provide banknotes back to the customer. For example, the banknote deposit-withdrawal system 101 could be used in an automated payment system where a customer presents a high denomination banknote to purchase goods or services that are valued more than the value of purchased goods or services and the unit provides lower denomination banknotes to provide change to the customer to assist in completing the transaction. The recycling module may act as an escrow unit that holds the accepted document until the transaction is completed.

FIG. 1C illustrates a banknote acceptor system 103 in accordance with various embodiments of the present disclosure. FIG. 1C shows a banknote acceptor system or banknote feeder configured to receive multiple banknotes in bulk to verify the authenticity of the inserted banknotes in bulk. The banknote acceptor includes an adapter to accept banknotes in bulk, and has a banknote accepting module, a banknote transport system, and a removable banknote storage unit. Inserted banknotes are separated serially and sent to be authenticated in the banknote accepting module using various sensors. Once the banknote is deemed authentic and deemed acceptable, the banknote is transported further into the banknote acceptor using the banknote transport system and into the removable banknote storage unit.

FIG. 1D illustrates a banknote deposit-withdrawal system 105 in accordance with various embodiments of the present disclosure. In addition to a banknote accepting module or banknote feeder, a banknote transport system, and a removable banknote storage unit as shown in FIG. 1C, the banknote deposit-withdrawal system 105 illustrated in FIG. 1D comprises a banknote recycling module that allows the unit to provide banknotes back to the customer. For example, the banknote deposit-withdrawal system 105 could be used in an automated payment system where a customer presents a high denomination banknote to purchase goods or services that are valued more than the value of purchased goods or services and the unit provides lower denomination banknotes to provide change to the customer to assist in completing the transaction. The recycling module may act as an escrow unit that holds the accepted document until the transaction is completed.

FIG. 1E illustrates a banknote deposit-withdrawal system 107 in accordance with various embodiments of the present disclosure. The banknote deposit-withdrawal system 107 includes a banknote accepting module or banknote feeder, a banknote transport system, a removable banknote storage unit, and a banknote recycling module that allows the unit to provide banknotes back to the customer. For example, the banknote deposit-withdrawal system 107 can be used in an automated payment system where a customer presents a high denomination banknote to purchase goods or services that are valued more than the value of purchased goods or services; and the unit provides lower denomination banknotes to provide change to the customer to assist in completing the transaction. The recycling module may act as an escrow unit that holds the accepted document until the transaction is completed.

FIG. 1F illustrates a banknote deposit-withdrawal system 109 in accordance with various embodiments of the present disclosure. The banknote deposit-withdrawal system 109 includes a banknote accepting module or banknote feeder, a banknote transport system and a removable banknote storage unit, an escrow module and multiple banknote recycling modules that allows the unit to provide banknotes back to the customer. For example, the banknote deposit-withdrawal system could be used in an automated payment system where a customer presents a high denomination banknote to purchase goods or services that are valued more than the value of purchased goods or services and the unit provides lower denomination banknotes to provide change to the customer to assist in completing the transaction. The escrow unit holds the accepted document until the transaction is completed.

Figure 2:
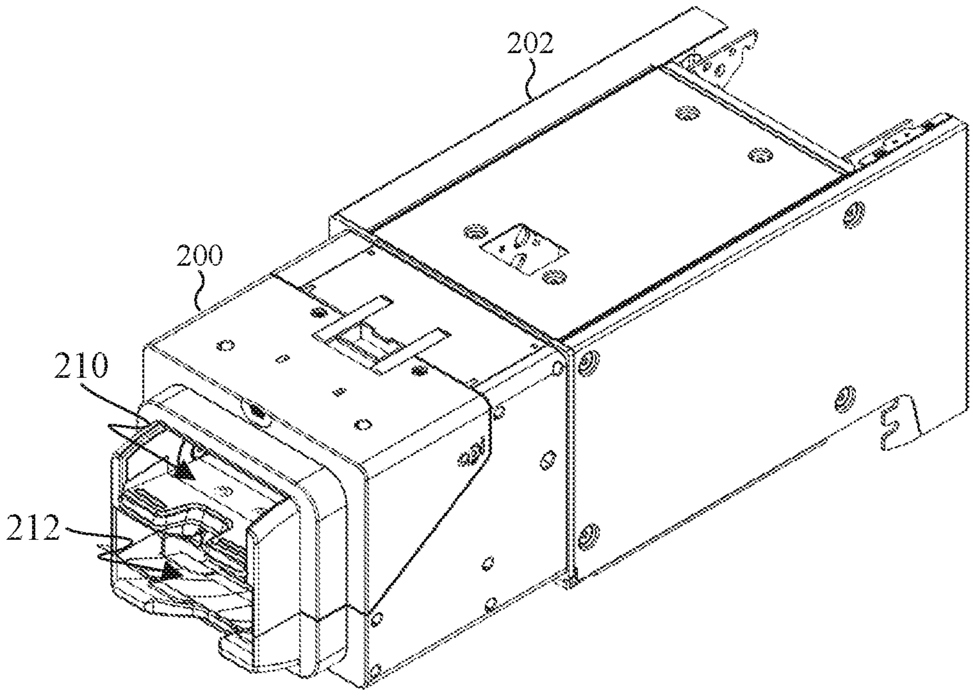
FIG. 2 illustrates schematic view of proposed embodiment of a banknote feeder in accordance with various embodiments of the present disclosure.
Figure 2A:
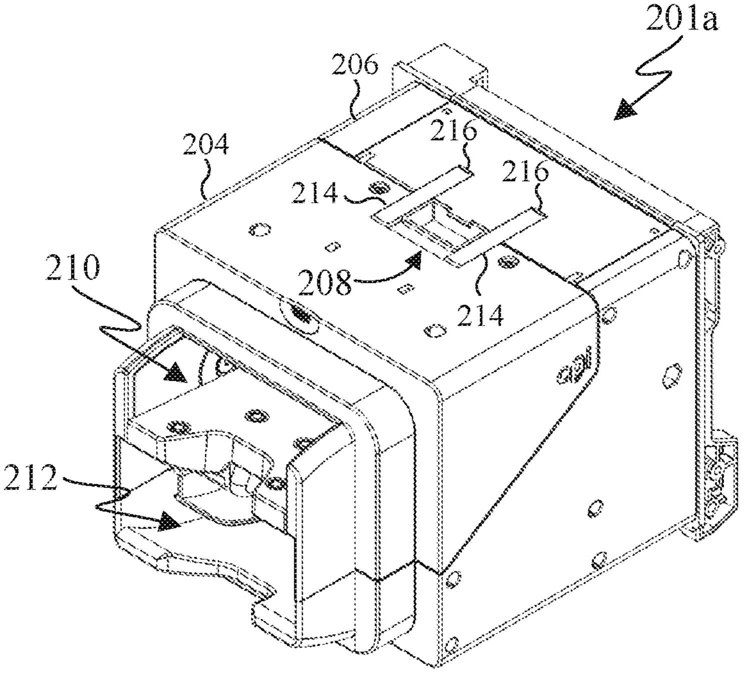
FIGS. 2A through 2K illustrate schematic views of proposed embodiments of a banknote feeder in an operation position in accordance with various embodiments of the present disclosure.
Figure 2B:
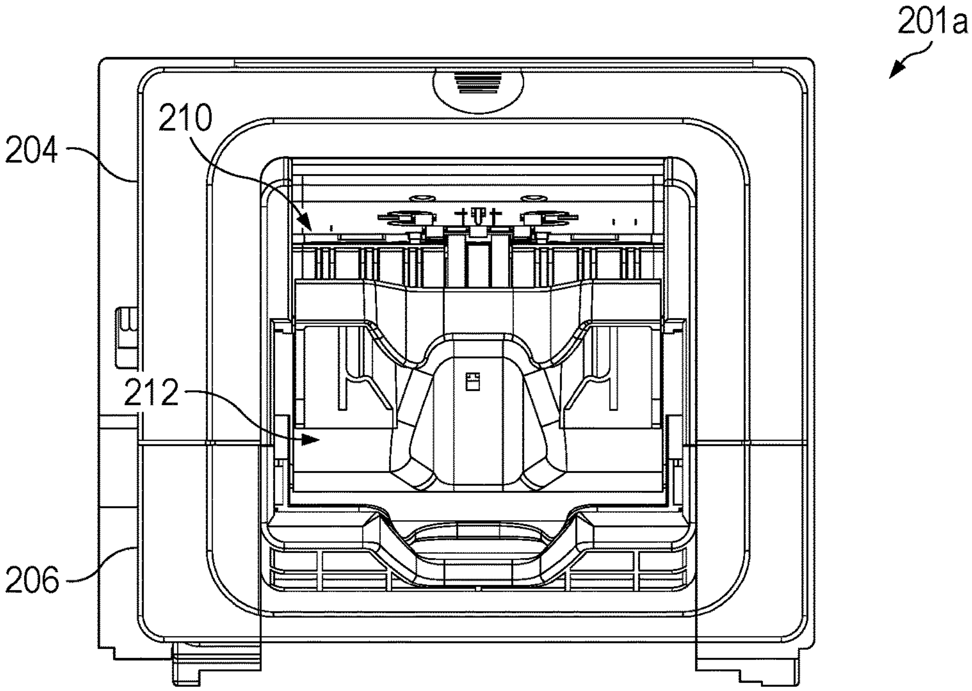
Figure 2C:
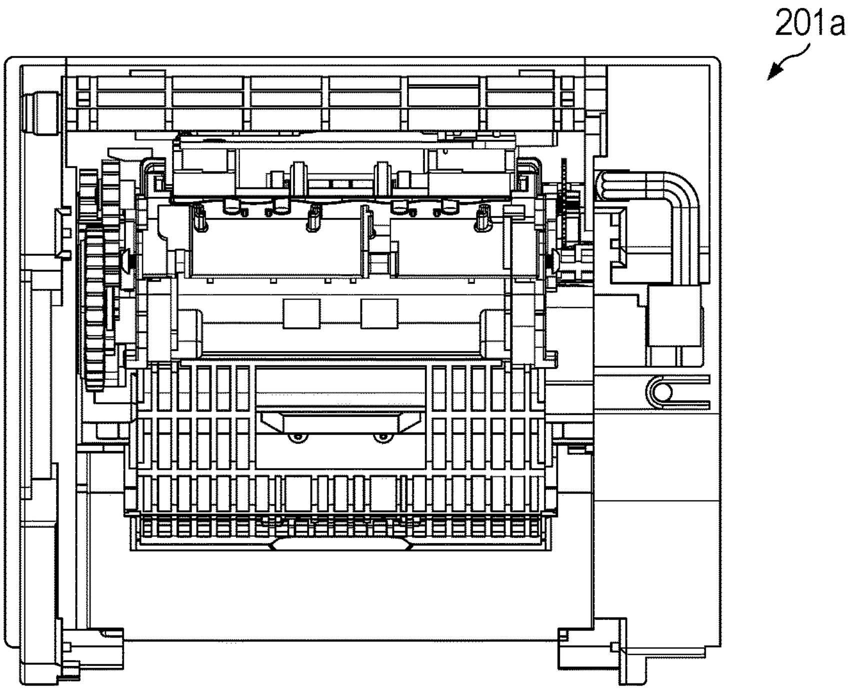
Figure 2D:
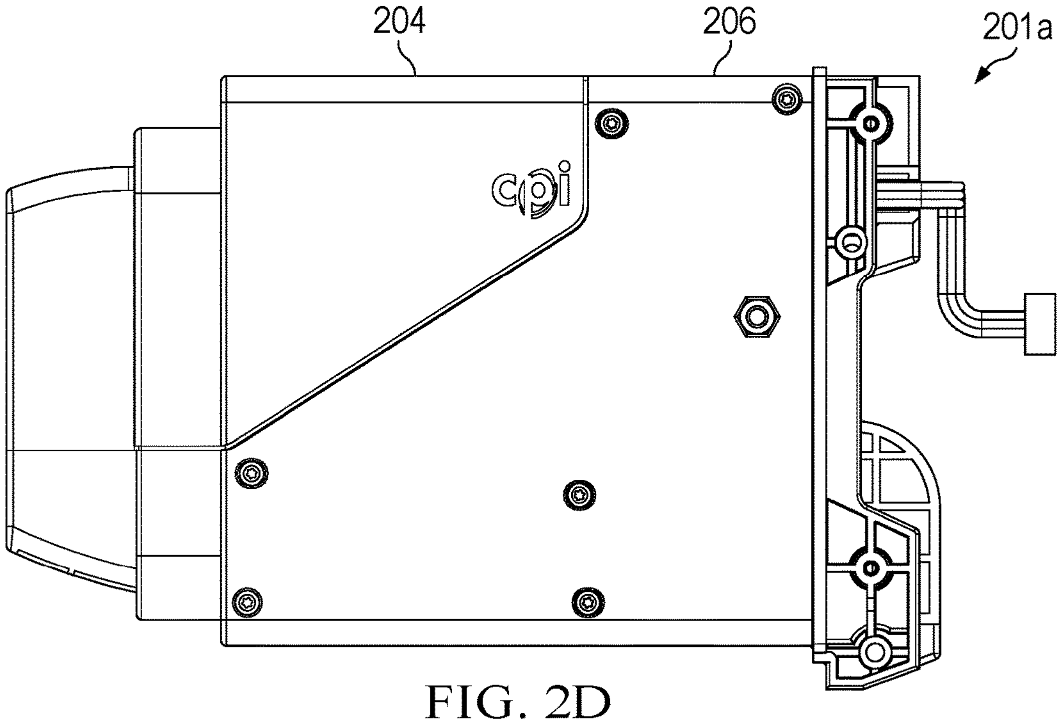
Figure 2E:
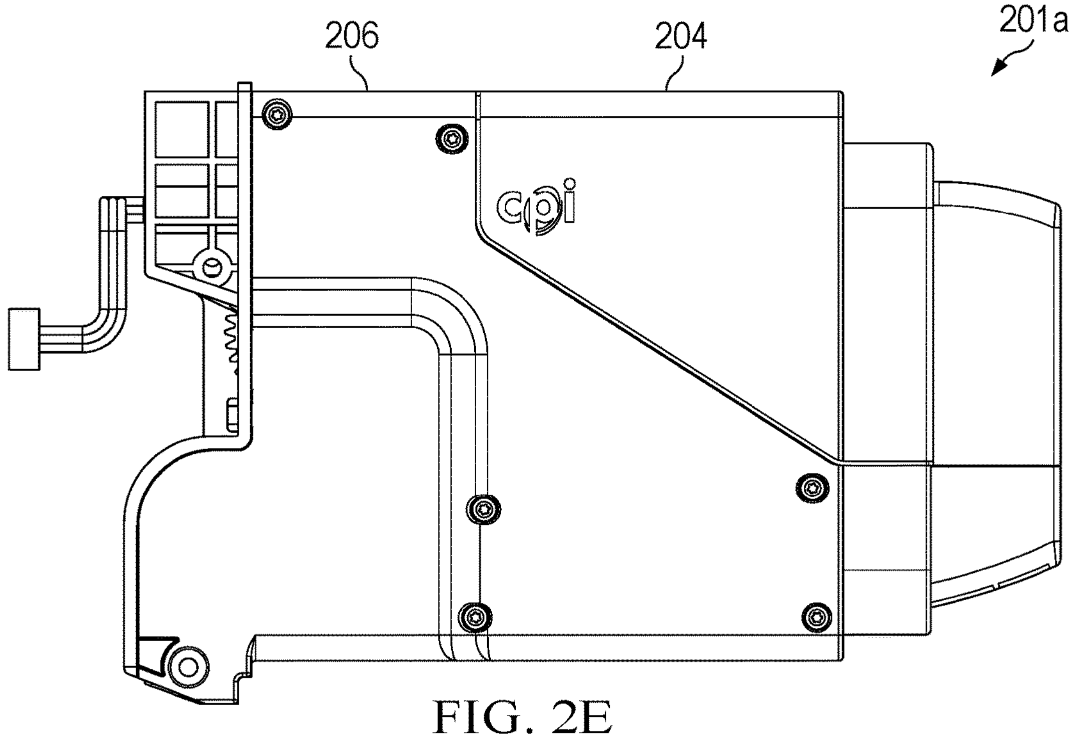
Figure 2G:
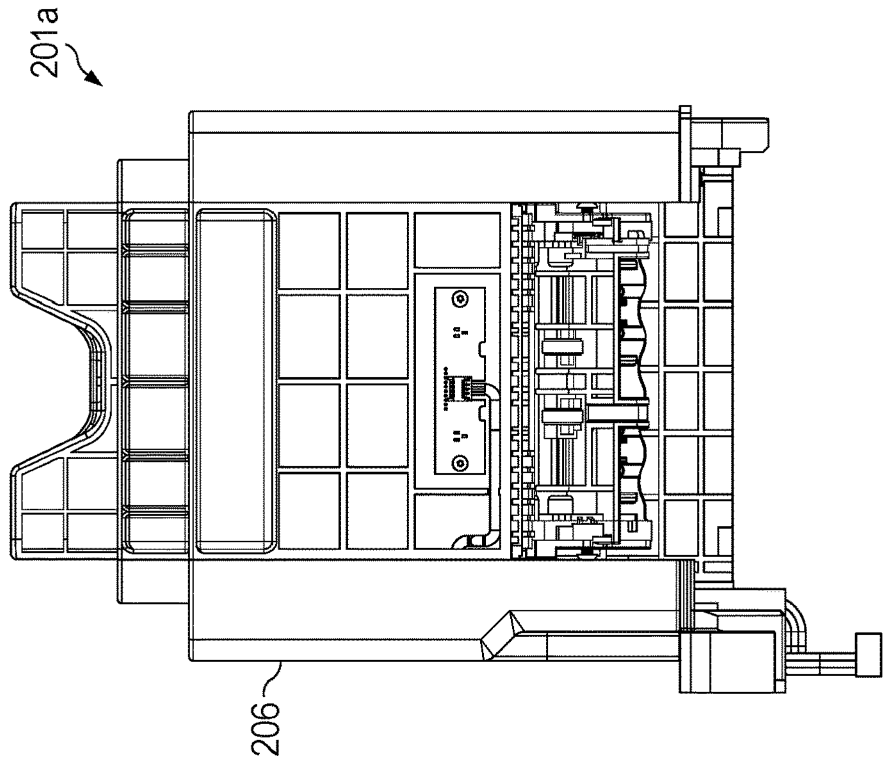
Figure 2F:
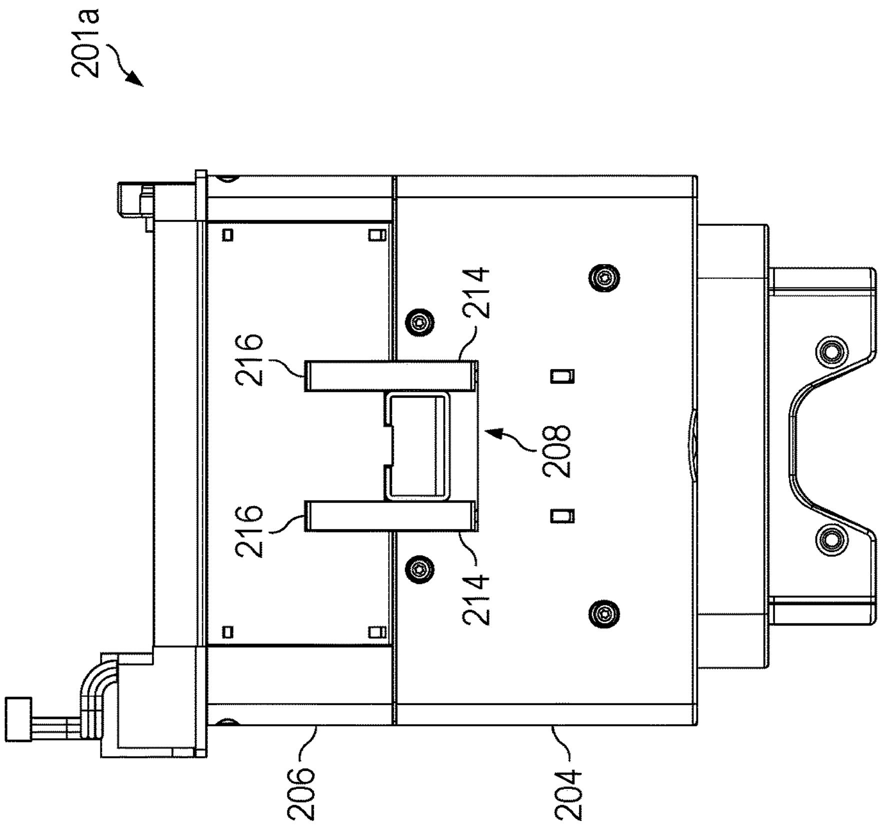
Figure 2H:
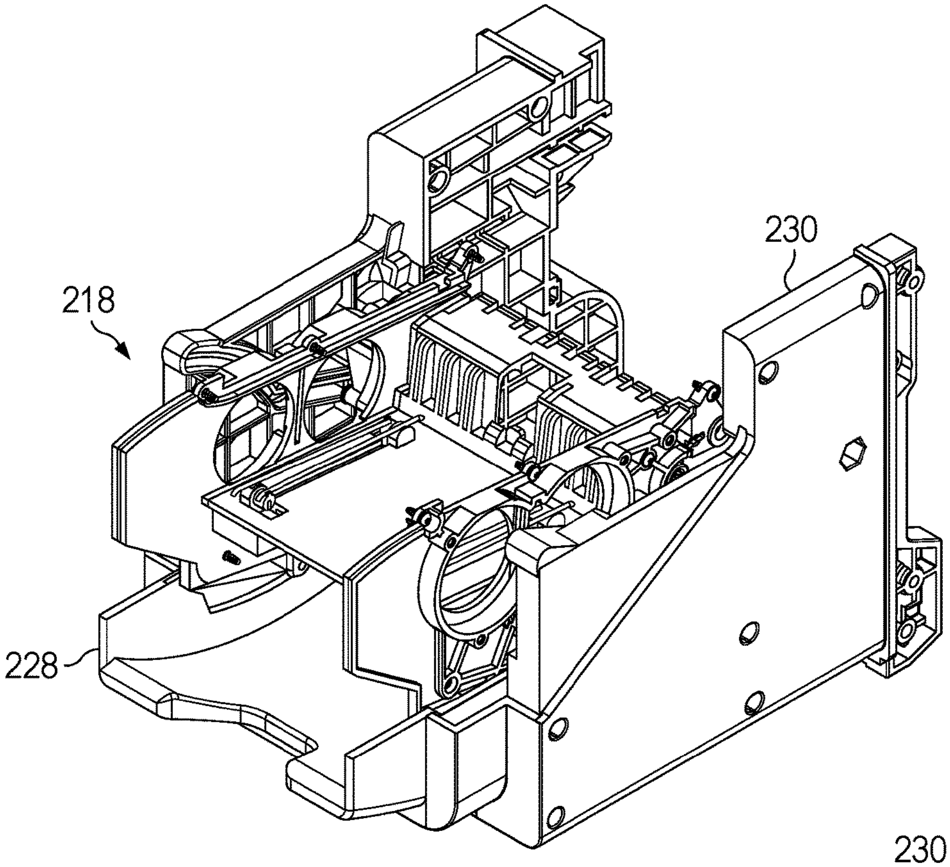
Figure 2I:
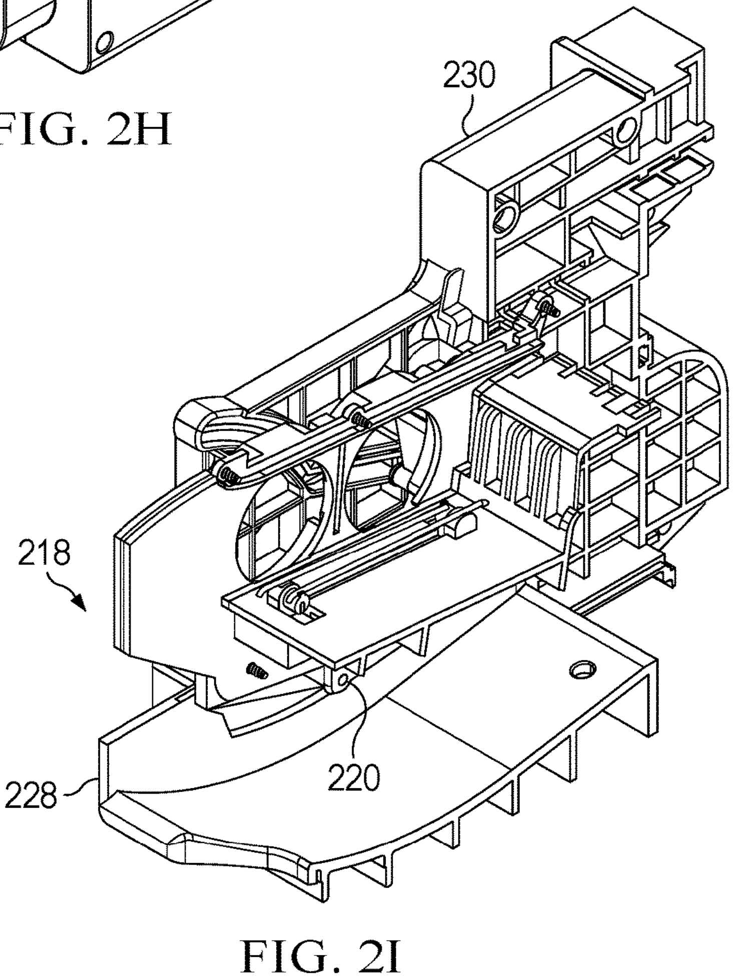
Figure 2J:
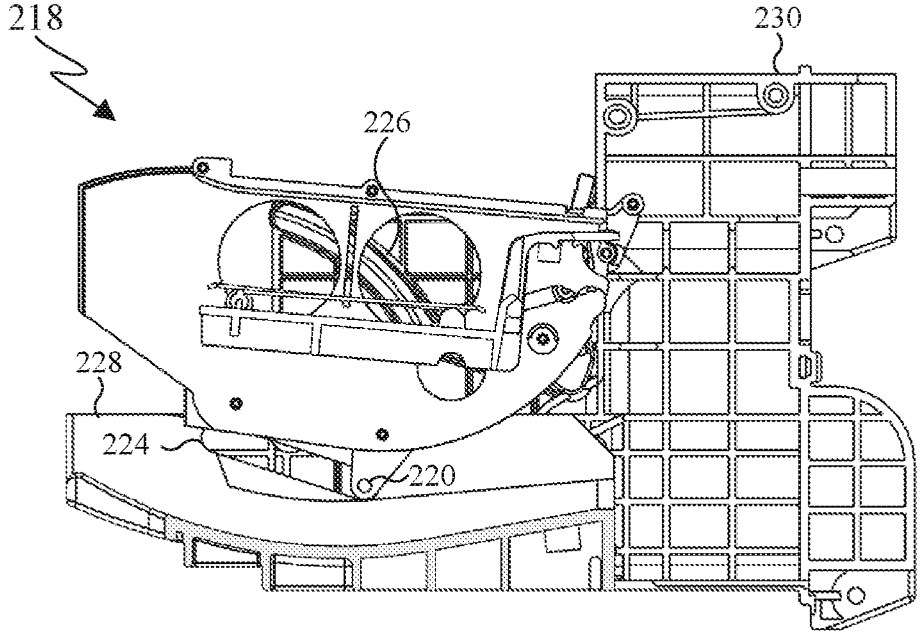
Figure 2K:
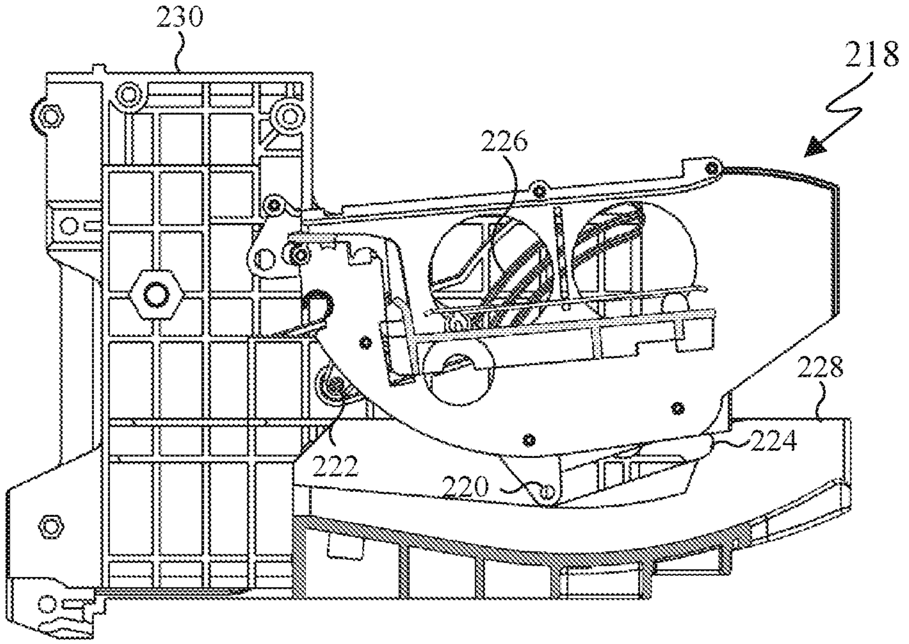

FIGS. 2 and 2A through 2K illustrate schematic views of proposed embodiments of a banknote feeder 200 in an operation position 201*a* in accordance with various embodiments of the present disclosure. FIG. 2 illustrates an example banknote feeder 200 and a banknote receiver 202 in an operation position 201*a* from an isometric perspective in accordance with various embodiments of the present disclosure. FIG. 2A illustrates an example of a banknote feeder 200 in an operation position 201*a* from an isometric perspective in accordance with various embodiments of the present disclosure. FIG. 2B illustrates an example of a banknote feeder 200 in an operation position 201*a* from a front perspective in accordance with various embodiments of the present disclosure. FIG. 2C illustrates an example of a banknote feeder 200 in an operation position 201*a* from a back perspective in accordance with various embodiments of the present disclosure. FIG. 2D illustrates an example of a banknote feeder 200 in an operation position 201*a* from a first side perspective in accordance with various embodiments of the present disclosure. FIG. 2E illustrates an example of a banknote feeder 200 in an operation position 201*a* from a second side perspective in accordance with various embodiments of the present disclosure. FIG. 2F illustrates an example of a banknote feeder 200 in an operation position 201*a* from a top perspective in accordance with various embodiments of the present disclosure. FIG. 2G illustrates an example of a banknote feeder 200 in an operation position 201*a* from a bottom perspective in accordance with various embodiments of the present disclosure. FIG. 2H illustrates an example of a banknote feeder 200 in an operation position 201*a* with a cover 204 removed from an isometric perspective in accordance with various embodiments of the present disclosure. FIG. 2I illustrates an example cross section of a banknote feeder 200 in an operation position 201*a* with a cover 204 removed from an isometric perspective in accordance with various embodiments of the present disclosure. FIG. 2J illustrates an example cross section of a banknote feeder 200 in an operation position 201*a* with a cover 204 removed from a first side perspective in accordance with various embodiments of the present disclosure. FIG. 2K illustrates an example cross section of a banknote feeder 200 in an operation position 201*a* with a cover 204 removed from a second side perspective in accordance with various embodiments of the present disclosure.

As shown in FIG. 2, a banknote feeder 200 can be installed on a front of a banknote receiver 202. Banknotes can be inserted into an accept inlet 210 and returned through a return outlet 212. The return outlet 212 can be used for rejected banknotes, unauthenticated banknotes, change banknotes, etc. The banknote feeder 200 can separate a stack of banknotes and transport each banknote separately to the banknote receiver 202. The banknote receiver 202 can perform different verifications and authentications of banknotes. The banknote receiver 202 can also transport the banknotes further into banknote systems 100-107. The banknote feeder 200 is shown in the operation position 201*a* where the cover 204 is latched to the body 206. The cover 204 of the banknote feeder 200 can protect internal components of the banknote feeder 200 from external interferences. The latch 208 on the cover 204 keeps the cover 204 from accidentally being opened and exposing the internal components. Once a banknote jam is detected, the latch 208 can be detached from the body 206 to allow the cover 204 to move away from the body 206.

As shown in FIGS. 2A through 2G, a housing of the banknote feeder 200 can completely enclose the internal components except for a banknote accept inlet 210 that accepts one or more banknotes and a banknote return outlet 212 that returns one or more banknotes. The housing can include a cover 204 and a body 206. The cover 204 can include a latch 208 that secures the cover 204 onto the body 206 in a manner that the cover 204 cannot be accidentally opened exposing internal components of the banknote feeder 200. Any type of latching mechanism can be used to secure the cover 204 to the body 206. In certain embodiments, the latch 208 has two prongs 214 that extend into grooves 216 of the body 206. Each prong 214 can include an extra protrusion 215 that extends downward that interacts with a depression 217 on a lower surface of the groove 216 in the body 206 or can each include a depression on a lower surface that interacts with a protrusion from a lower surface of the groove 216 in the body 206. The latch 208 can be lifted or depressed to move the entire latch 208 in a manner that the prongs 214 are separated from the grooves 216 of the body 206. In certain embodiments, the protrusions can be retractable when a button of the latch 208 or body 206 is pressed. While illustrated on the cover 204, the latch 208 can also be positioned on the body 206 to latch on to the cover 204.

As shown in FIGS. 2H through 2K, the cover 204 can include a guide assembly 218 that includes two second pins 220 and two first pins 222. The body 206 of the banknote feeder 200 includes a second slot 224 that is a second slot 224 on the each of the side walls 228 of the banknote inlet and a first slot 226 that is a combination linear and arc slot on each side wall 230 of the body 206. Each of the second pins 220 can be inserted into a respective second slot 224 and each of the first pins 222 can be inserted into a respective first slot 226. Movement of the guide assembly 218 is guided by the respective slots. The second pins 220 can move linearly in the second slot 224. The first pins 222 can move linearly in the linear portion of the first slot 226 along with the second pins 220 in the second slot 224. The first pins 222 can guide a rotation of the guide assembly 218 once the second pins 220 have reached an end of the respective second slots 224. In the second motion, the second pins 220 can act as hinges. The linear movement of the cover 204 is referred to as a pulled position 201*b* and the arc or rotational movement of the cover 204 is referred to as a rotated or hinged position. In the orientation where the cover 204 is latched onto the body is referred to as the operational position when the banknote feeder 200 is able to receive banknotes.

Figure 3A:
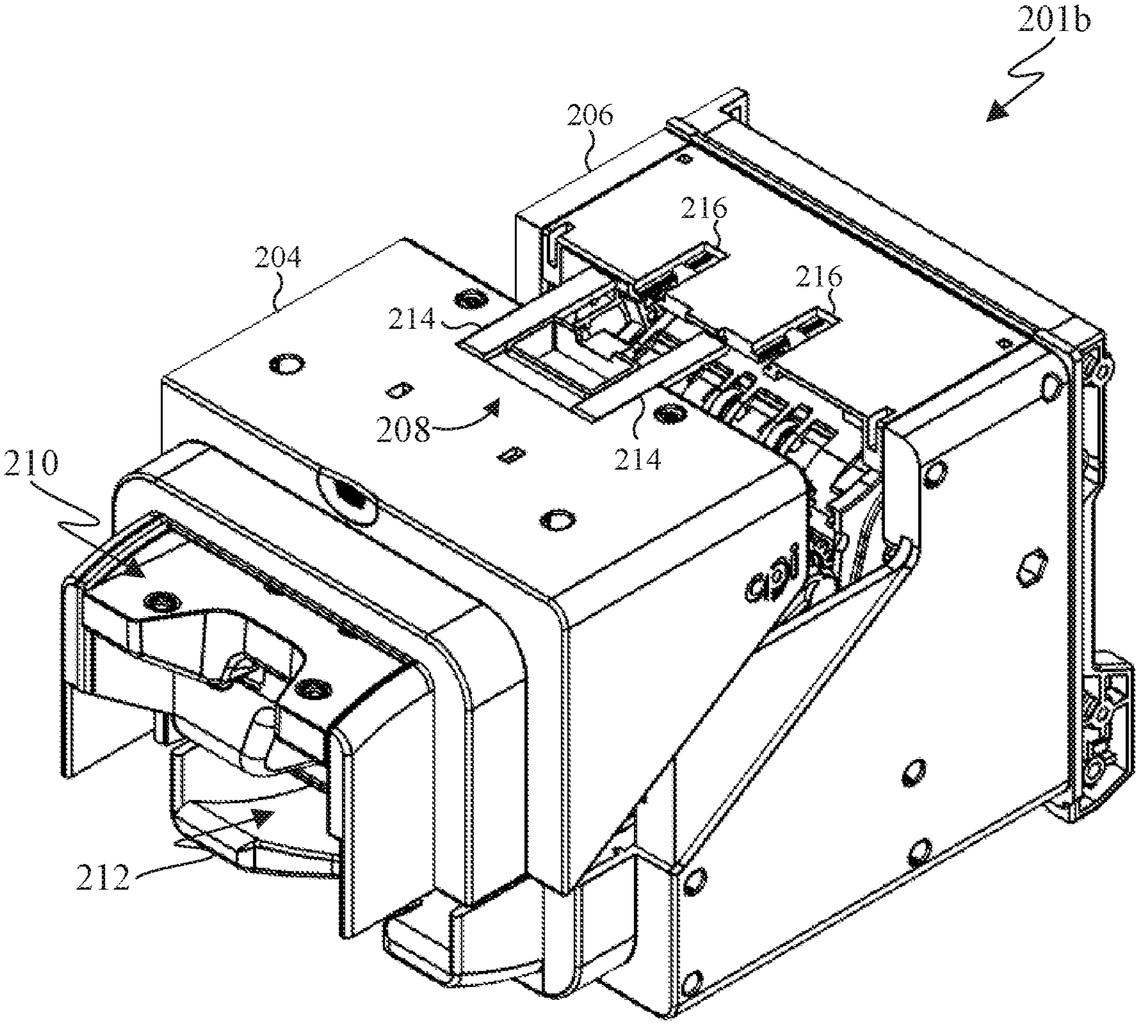
FIGS. 3A through 3K illustrate schematic views of proposed embodiments of a banknote feeder in a pulled position in accordance with various embodiments of the present disclosure.
Figure 3B:
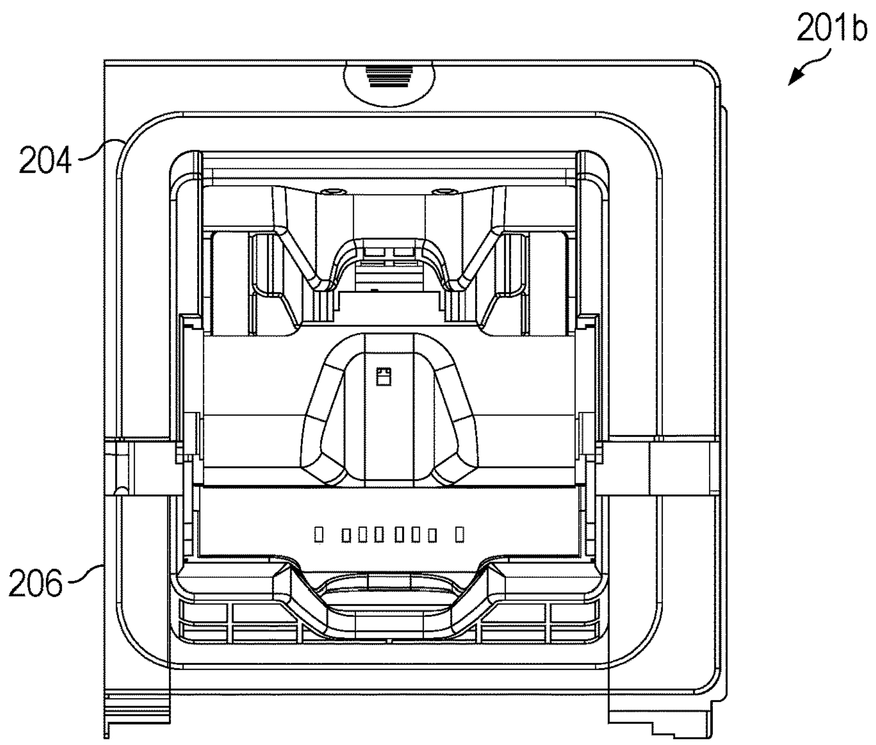
Figure 3C:
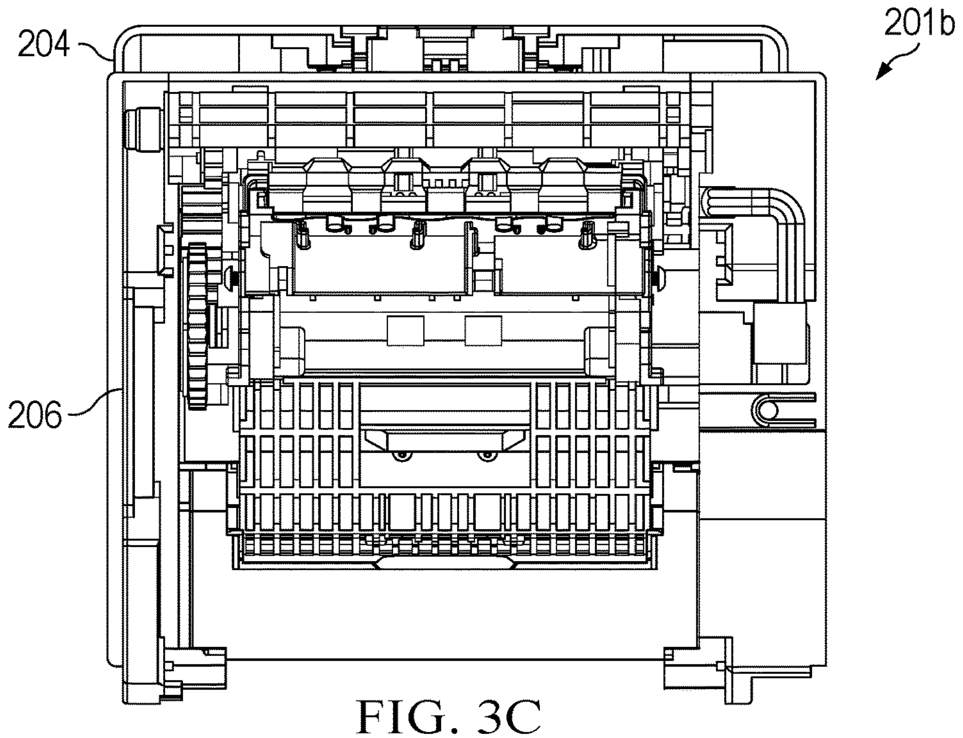
Figure 3D:
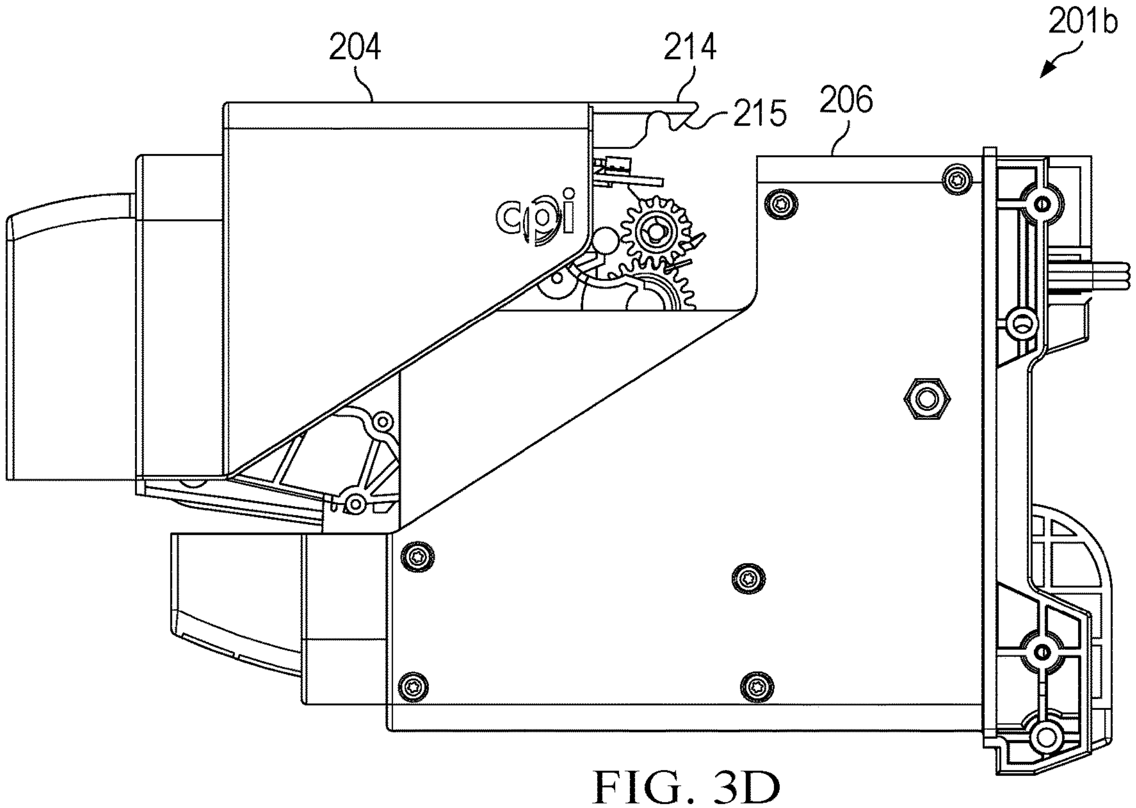
Figure 3E:
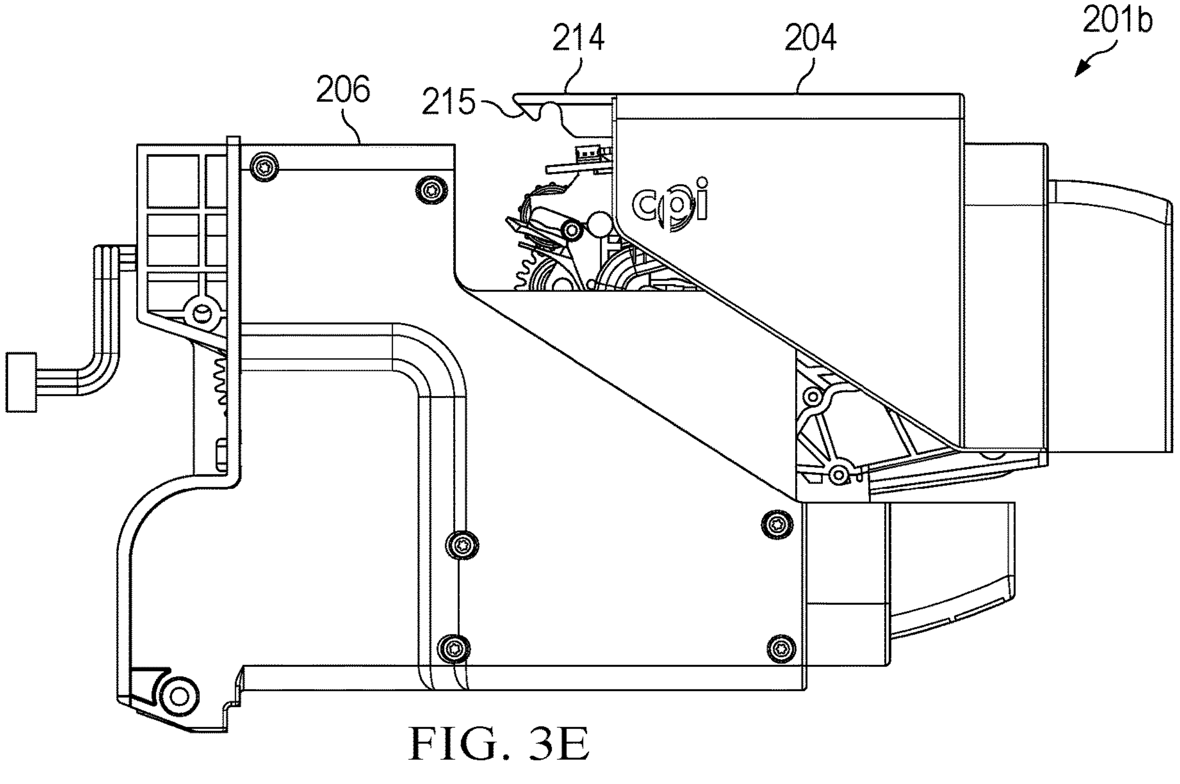
Figure 3G:
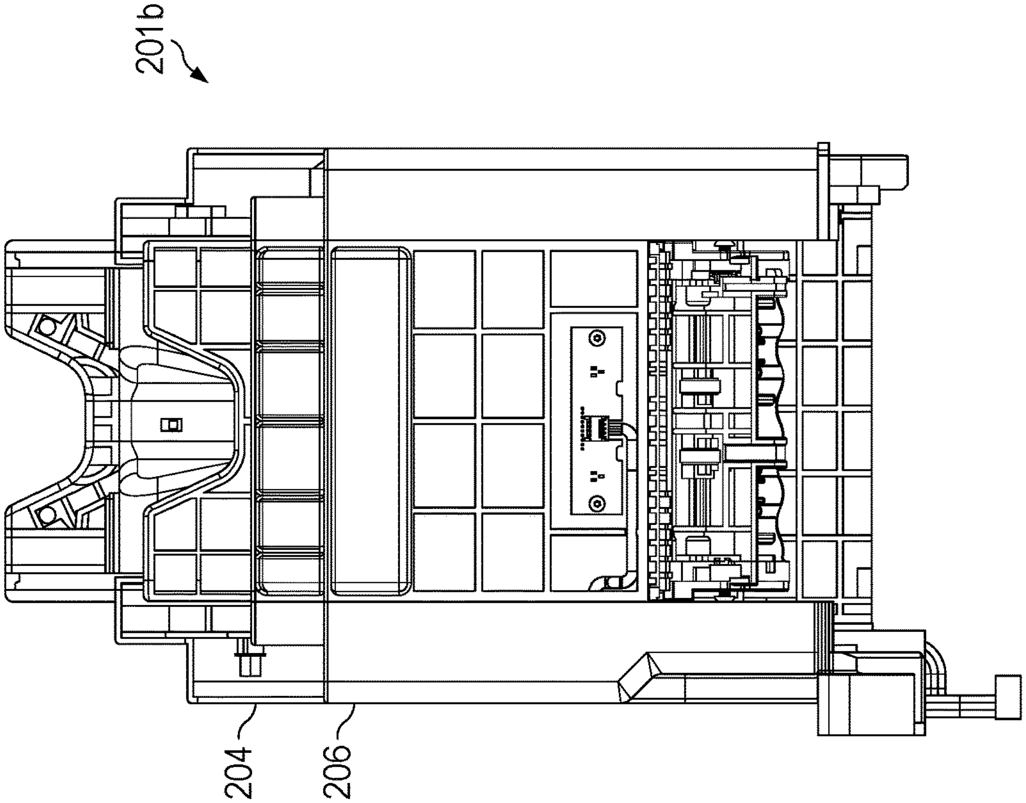
Figure 3F:
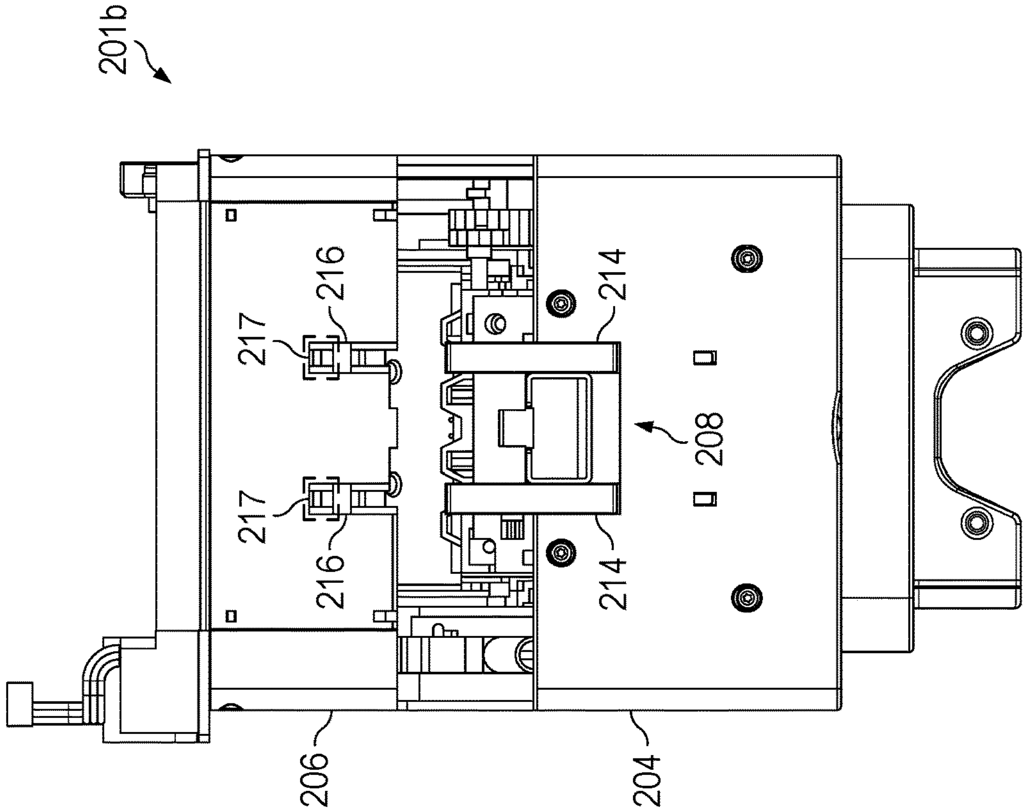
Figure 3H:
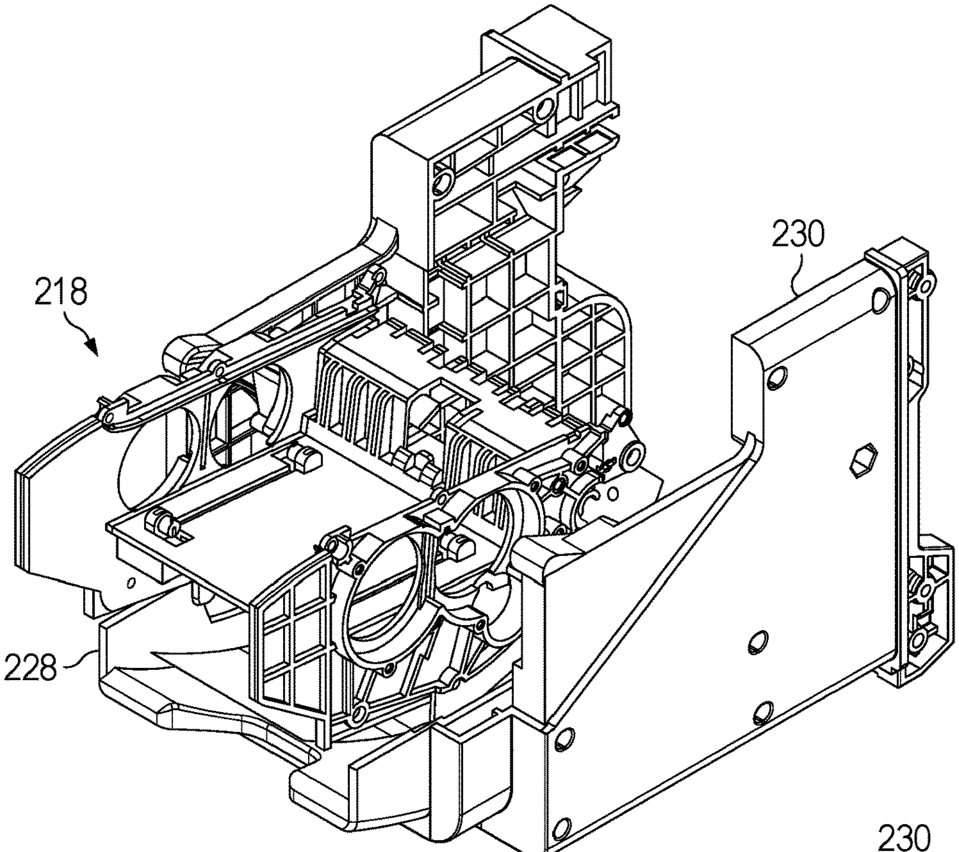
Figure 3I:
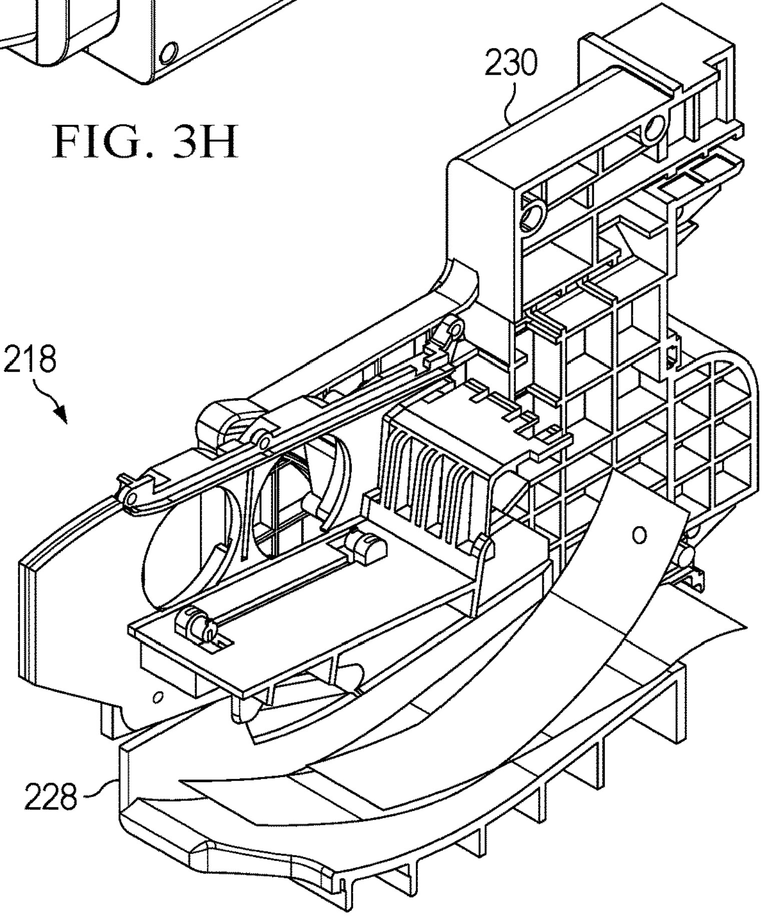
Figure 3J:
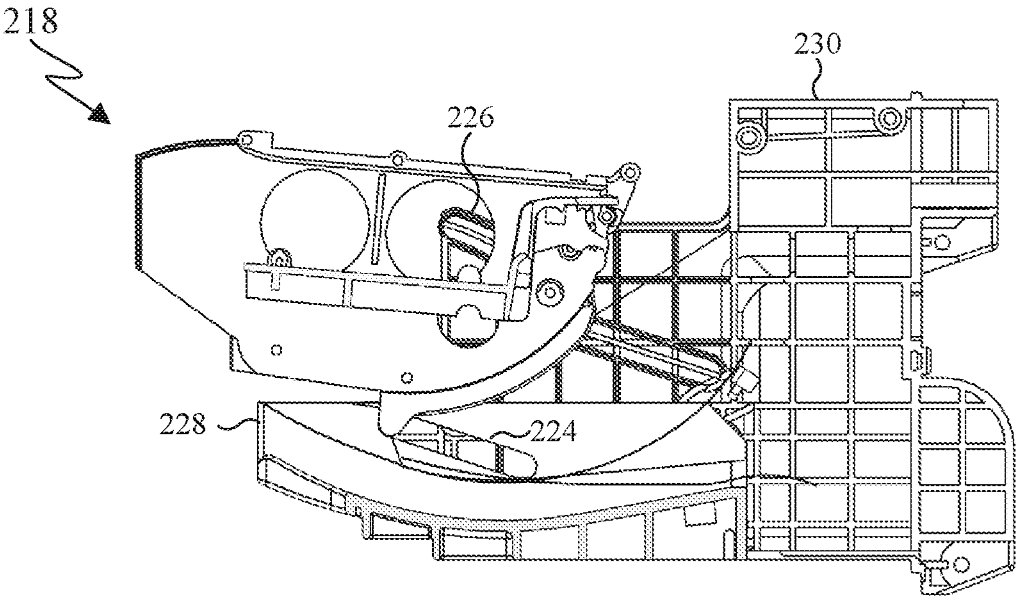
Figure 3K:
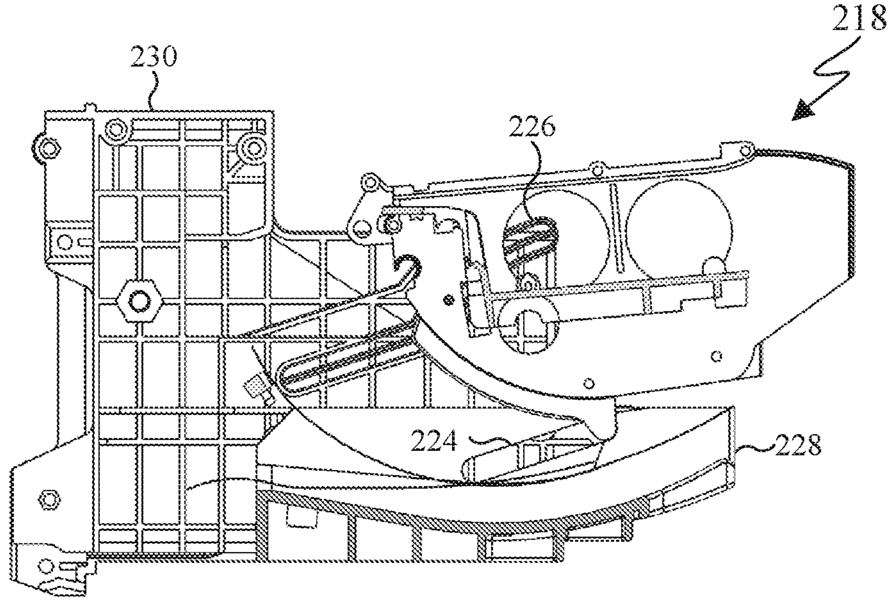

FIGS. 3A through 3K illustrate schematic views of proposed embodiments of a banknote feeder 200 in a pulled position 201*b* in accordance with various embodiments of the present disclosure. FIG. 3A illustrates an example of a banknote feeder 200 in a pulled position 201*b* from an isometric perspective in accordance with various embodiments of the present disclosure. FIG. 3B illustrates an example of a banknote feeder 200 in a pulled position 201*b* from a front perspective in accordance with various embodiments of the present disclosure. FIG. 3C illustrates an example of a banknote feeder 200 in a pulled position 201*b* from a back perspective in accordance with various embodiments of the present disclosure. FIG. 3D illustrates an example of a banknote feeder 200 in a pulled position 201*b* from a first side perspective in accordance with various embodiments of the present disclosure. FIG. 3E illustrates an example of a banknote feeder 200 in a pulled position 201*b* from a second side perspective in accordance with various embodiments of the present disclosure. FIG. 3F illustrates an example of a banknote feeder 200 in a pulled position 201*b* from a top perspective in accordance with various embodiments of the present disclosure. FIG. 3G illustrates an example of a banknote feeder 200 in a pulled position 201*b* from a bottom perspective in accordance with various embodiments of the present disclosure. FIG. 3H illustrates an example of a banknote feeder 200 in a pulled position 201*b* with a cover 204 removed from an isometric perspective in accordance with various embodiments of the present disclosure. FIG. 3I illustrates an example cross section of a banknote feeder 200 in a pulled position 201*b* with a cover 204 removed from an isometric perspective in accordance with various embodiments of the present disclosure. FIG. 3J illustrates an example cross section of a banknote feeder 200 in a pulled position 201*b* with a cover 204 removed from a first side perspective in accordance with various embodiments of the present disclosure. FIG. 3K illustrates an example cross section of a banknote feeder 200 in a pulled position 201*b* with a cover 204 removed from a second side perspective in accordance with various embodiments of the present disclosure.

As shown in FIGS. 3A through 3G, the cover 204 of the banknote feeder 200 has been unlatched from the body 206 and has been pulled away from the body 206 in a linear movement. The pulled position 201*b* allows for viewing of the internal components and any potential jams within the body 206.

As shown in FIGS. 3H through 3K, the second pins 220 and first pins 222 of the cover 204 are guided along the second slot and the linear portion of the first slot. The second slot 224 limits a linear movement of the cover 204 away from the body 206. The second pins 220 contact an outer edge of the second slot 224. The first pins 222 reach an end of the linear portion of the first slot 226 but are not necessarily restricted for moving along the first slot 226 due to the curved portion of the first slot 226.

Figure 4A:
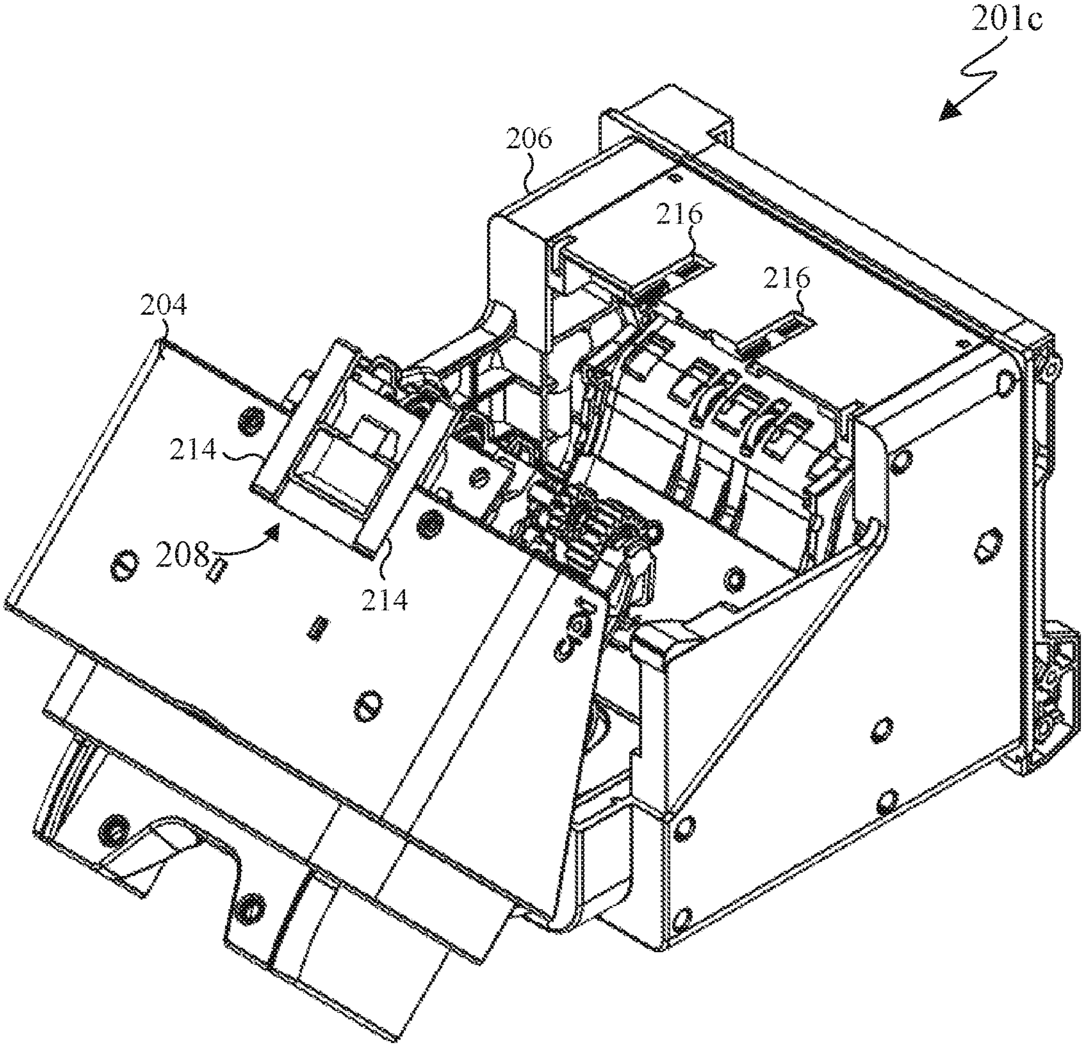
FIGS. 4A through 4K illustrate schematic views of proposed embodiments of a banknote feeder in a pulled and hinged position in accordance with various embodiments of the present disclosure.
Figure 4C:
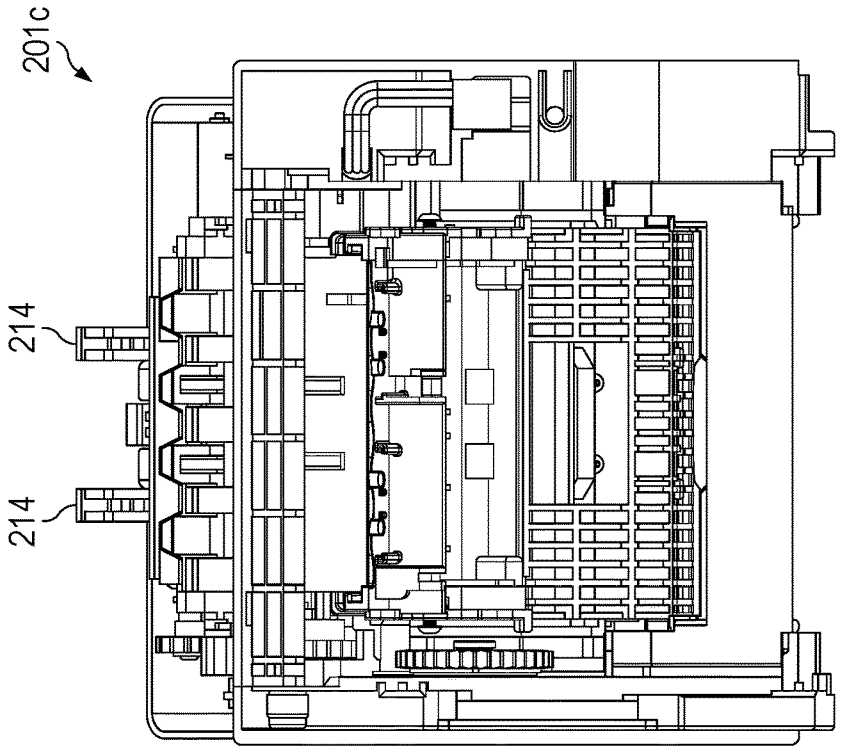
Figure 4B:
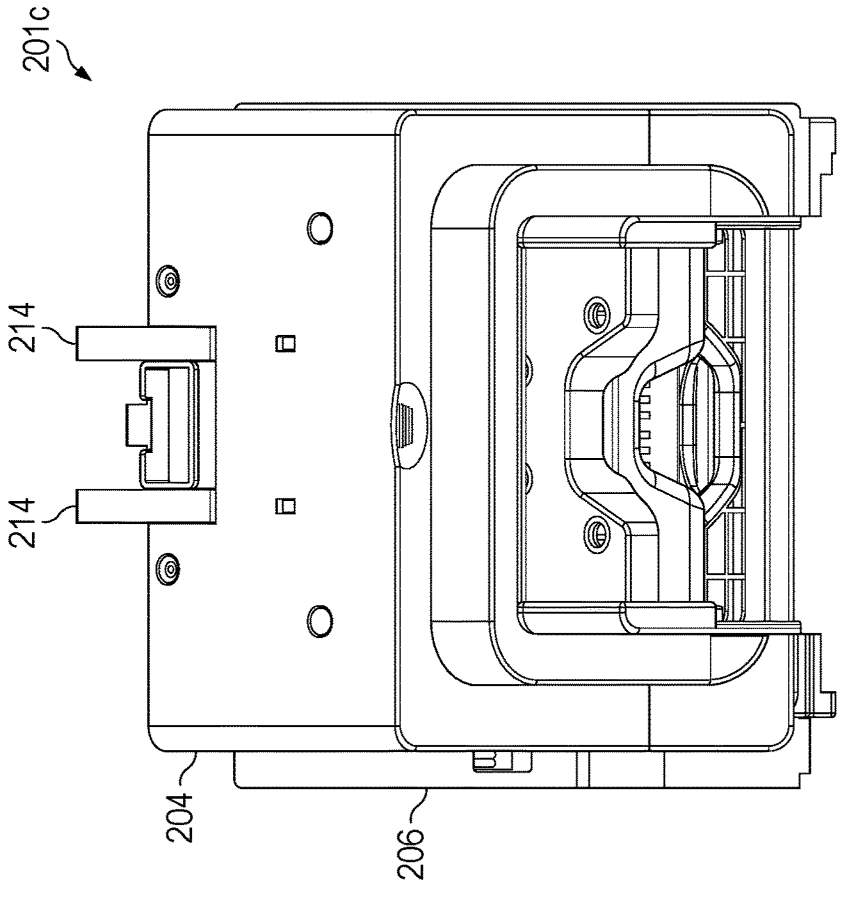
Figure 4D:
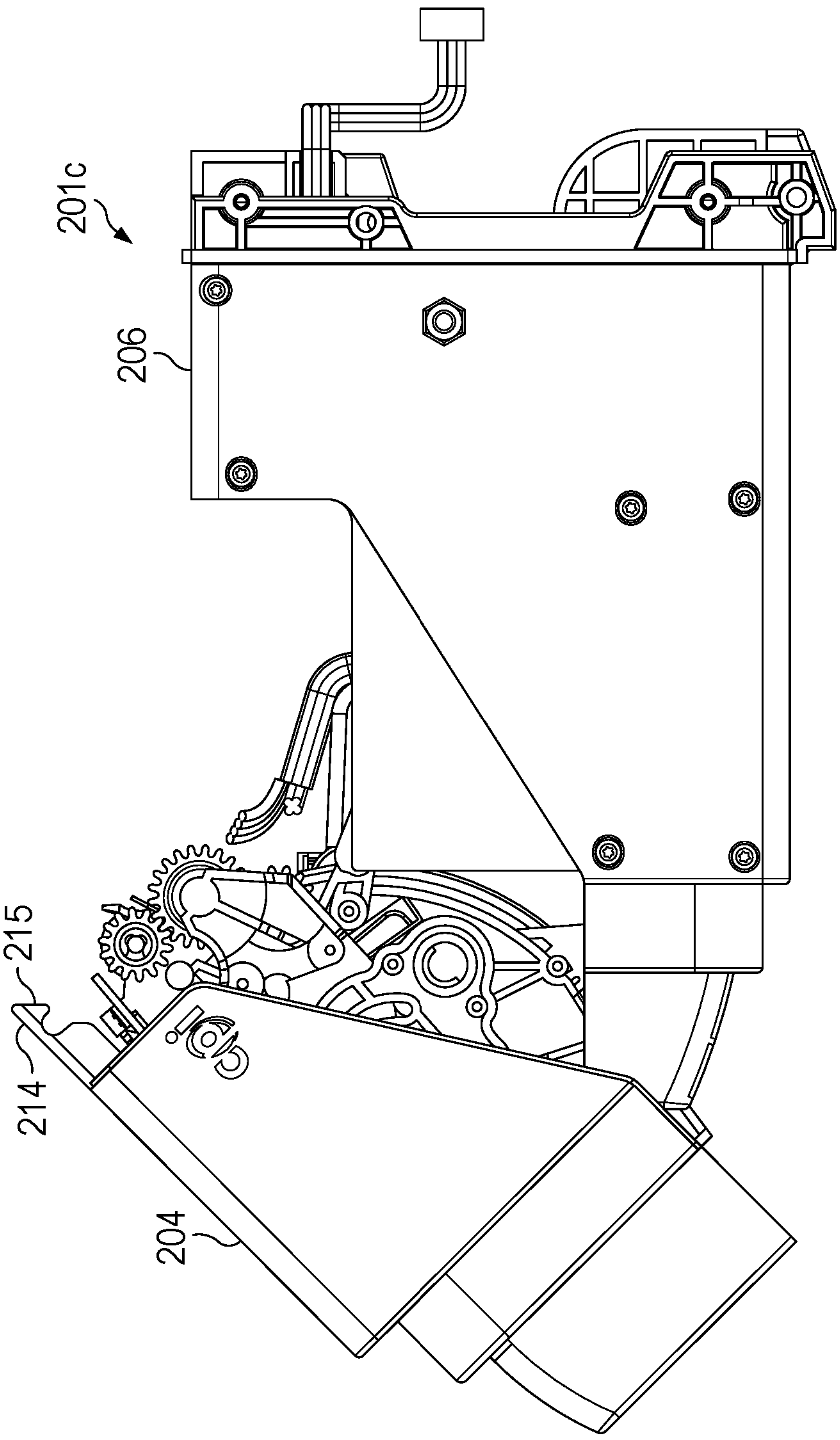
Figure 4E:
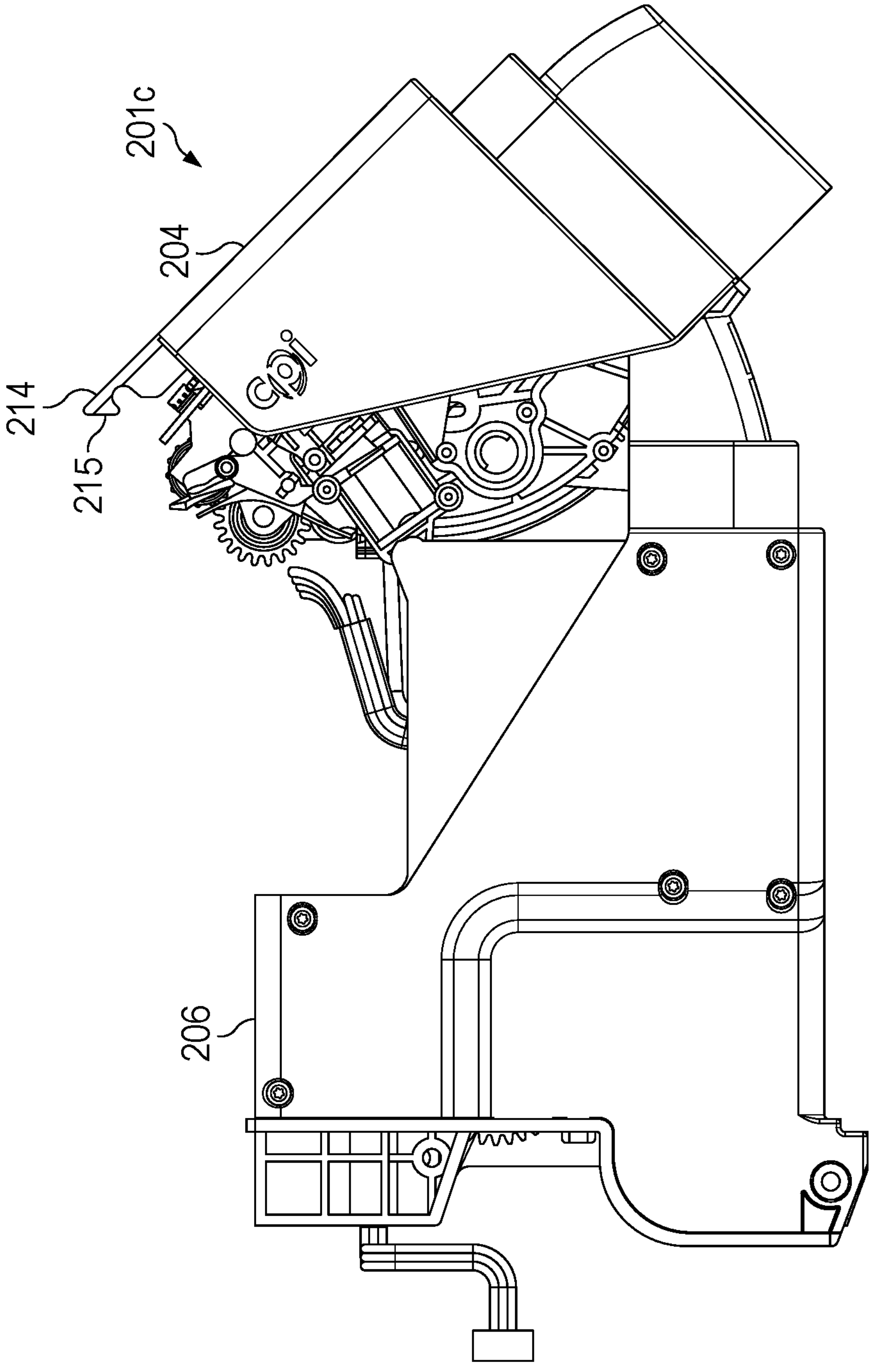
Figure 4G:
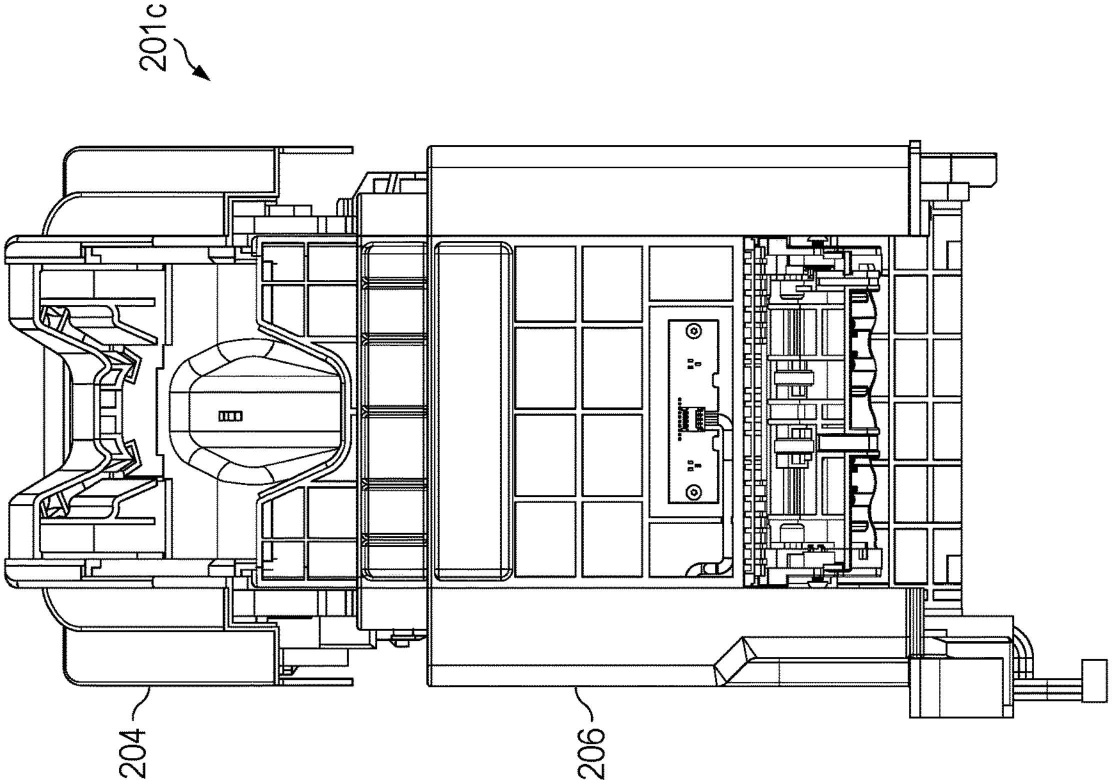
Figure 4F:
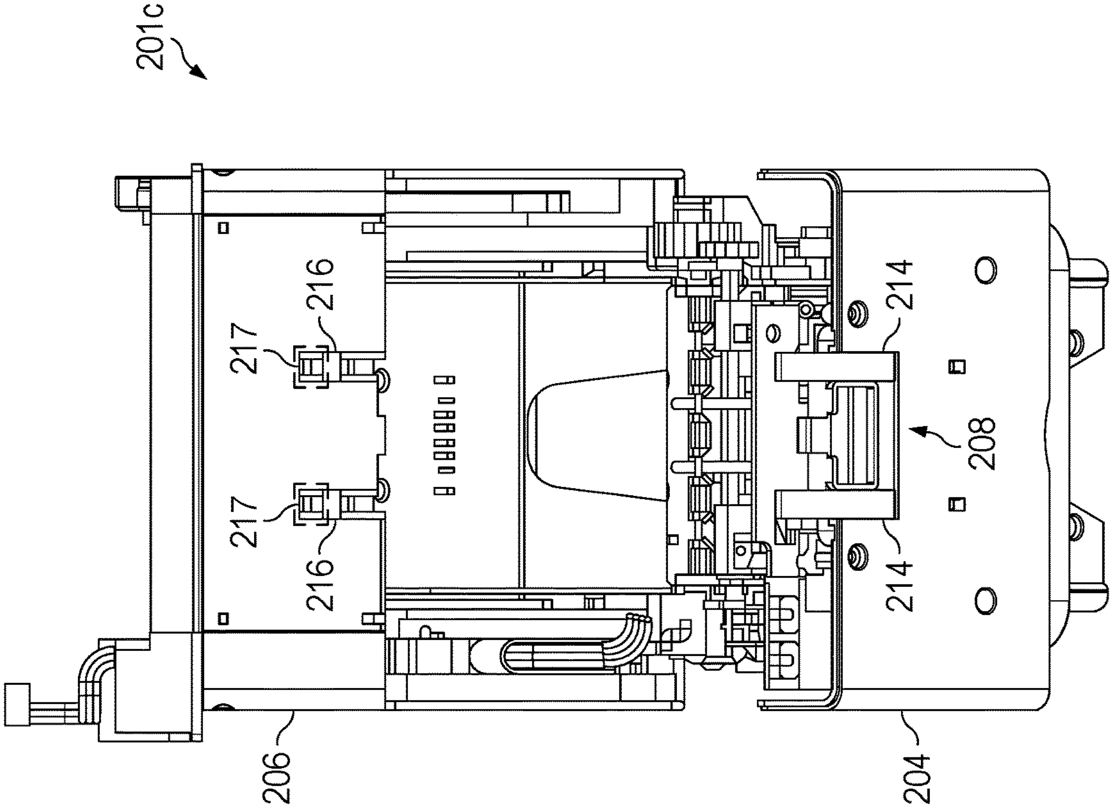
Figure 4H:
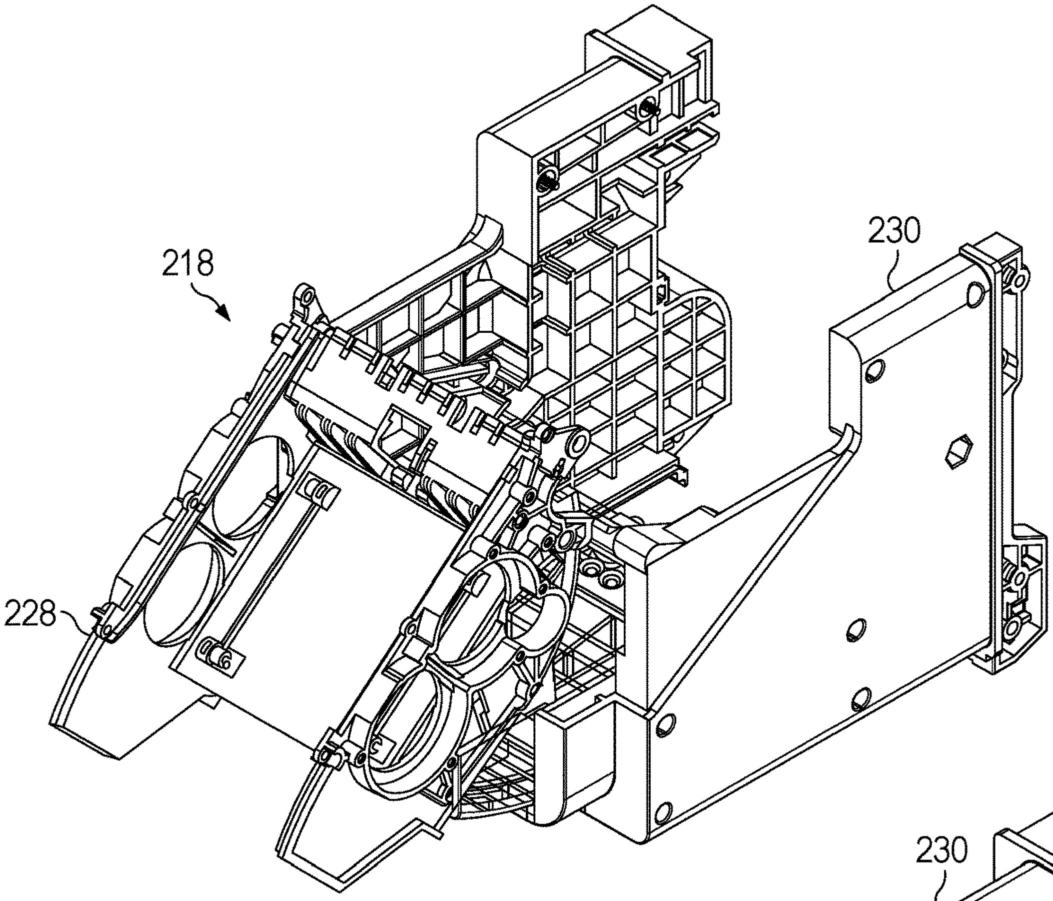
Figure 4I:
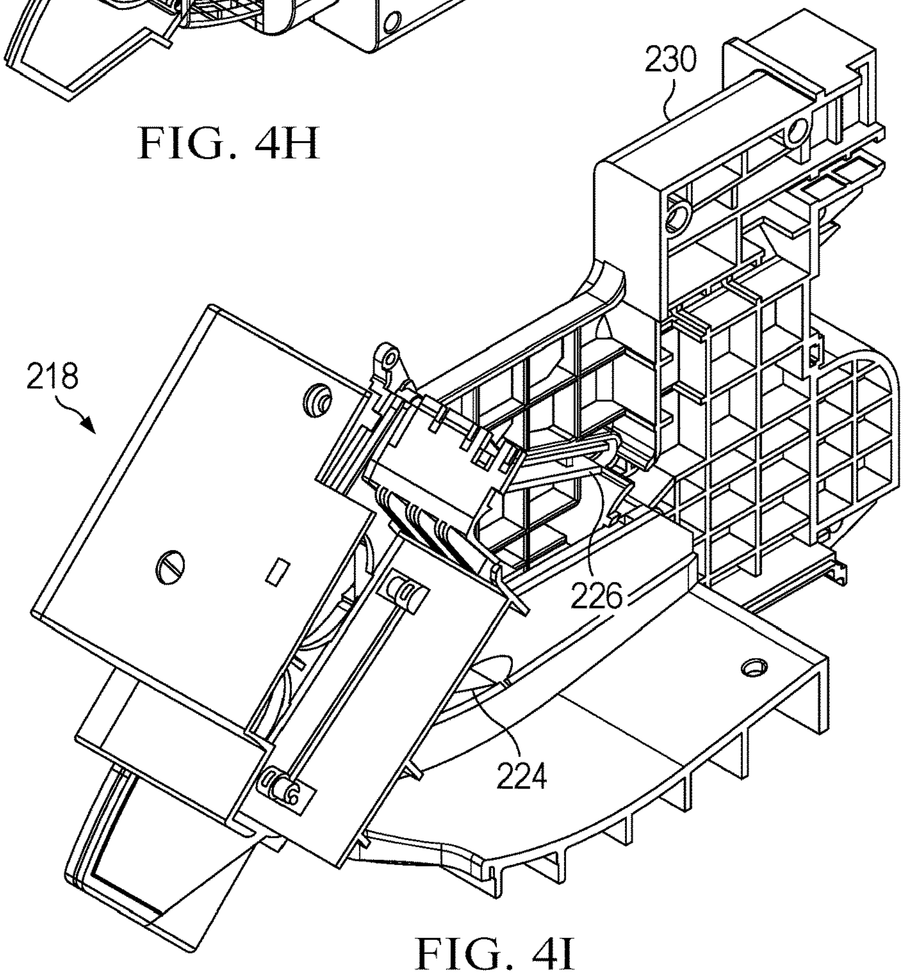
Figure 4J:
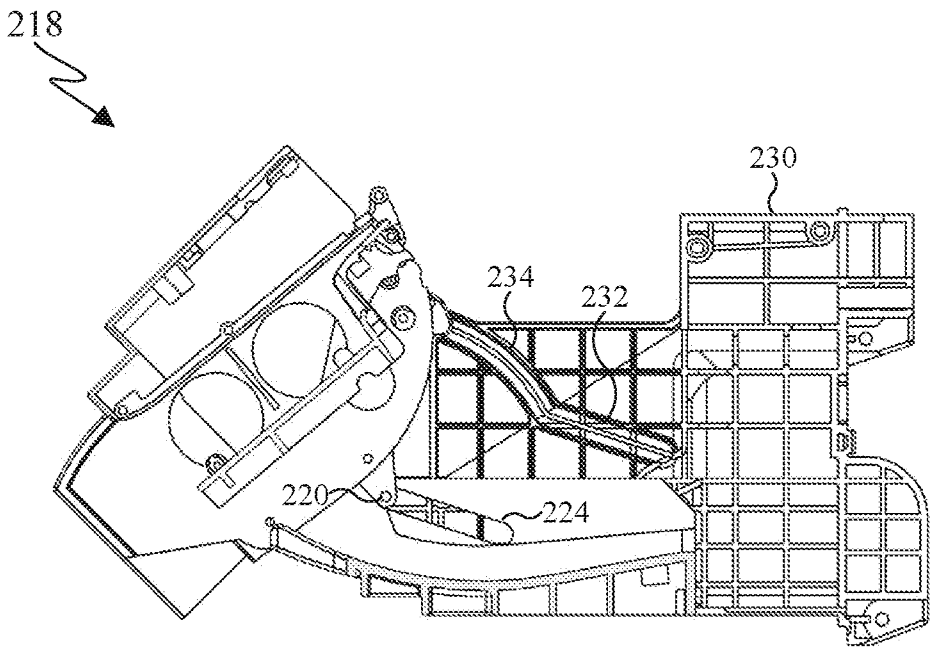
Figure 4K:
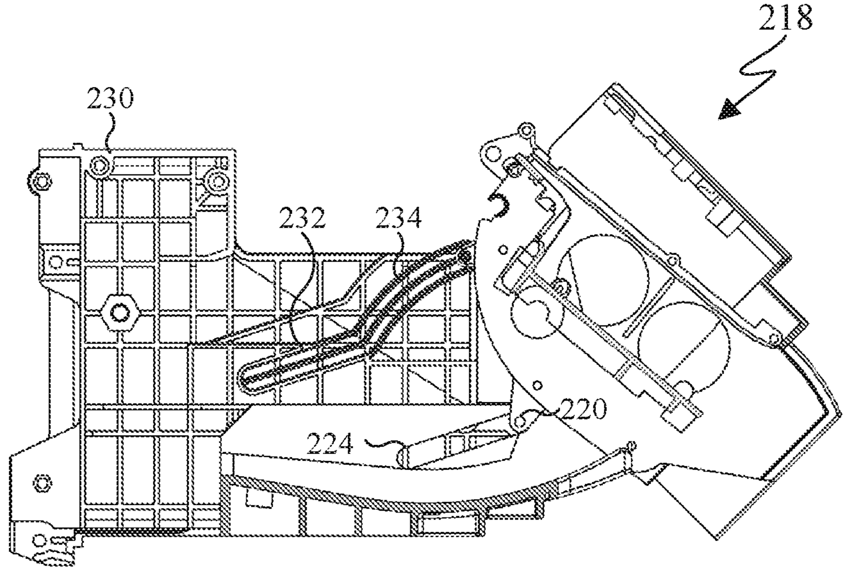

FIGS. 4A through 4K illustrate schematic views of proposed embodiments of a banknote feeder 200 in a hinged position 201*c* in accordance with various embodiments of the present disclosure. FIG. 4A illustrates an example of a banknote feeder 200 in a pulled and hinged position 201*c* from an isometric perspective in accordance with various embodiments of the present disclosure. FIG. 4B illustrates an example of a banknote feeder 200 in a pulled and hinged position 201*c* from a front perspective in accordance with various embodiments of the present disclosure. FIG. 4C illustrates an example of a banknote feeder 200 in a pulled and hinged position 201*c* from a back perspective in accordance with various embodiments of the present disclosure. FIG. 4D illustrates an example of a banknote feeder 200 in a pulled and hinged position 201*c* from a first side perspective in accordance with various embodiments of the present disclosure. FIG. 4E illustrates an example of a banknote feeder 200 in a pulled and hinged position 201*c* from a second side perspective in accordance with various embodiments of the present disclosure. FIG. 4F illustrates an example of a banknote feeder 200 in a pulled and hinged position 201*c* from a top perspective in accordance with various embodiments of the present disclosure. FIG. 4G illustrates an example of a banknote feeder 200 in a pulled and hinged position 201*c* from a bottom perspective in accordance with various embodiments of the present disclosure. FIG. 4H illustrates an example of a banknote feeder 200 in a pulled and hinged position 201*c* with a cover 204 removed from an isometric perspective in accordance with various embodiments of the present disclosure. FIG. 4I illustrates an example cross section of a banknote feeder 200 in a pulled and hinged position 201*c* with a cover 204 removed from an isometric perspective in accordance with various embodiments of the present disclosure. FIG. 4J illustrates an example cross section of a banknote feeder 200 in a pulled and hinged position 201*c* with a cover 204 removed from a first side perspective in accordance with various embodiments of the present disclosure. FIG. 4K illustrates an example cross section of a banknote feeder 200 in a pulled and hinged position 201*c* with a cover 204 removed from a second side perspective in accordance with various embodiments of the present disclosure.

Figure 6A:
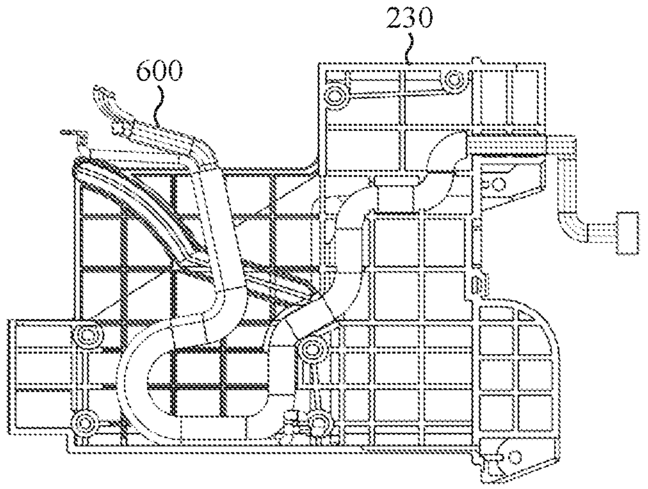
FIGS. 6A through 6C illustrate schematic views of proposed embodiments of wires in the banknote feeder in each position in accordance with various embodiments of the present disclosure.
Figure 6B:
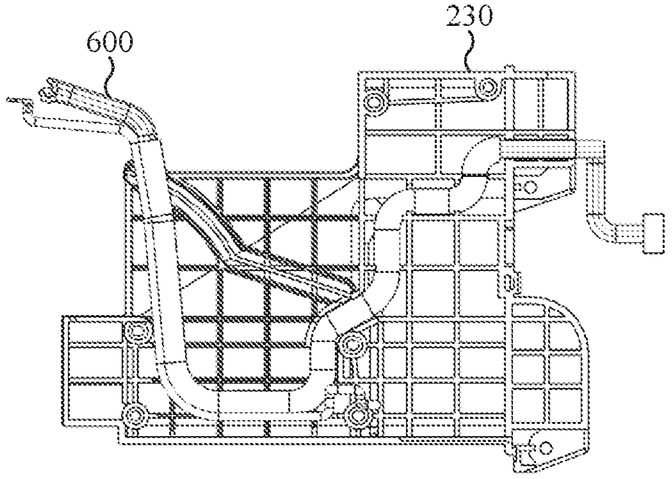
Figure 6C:
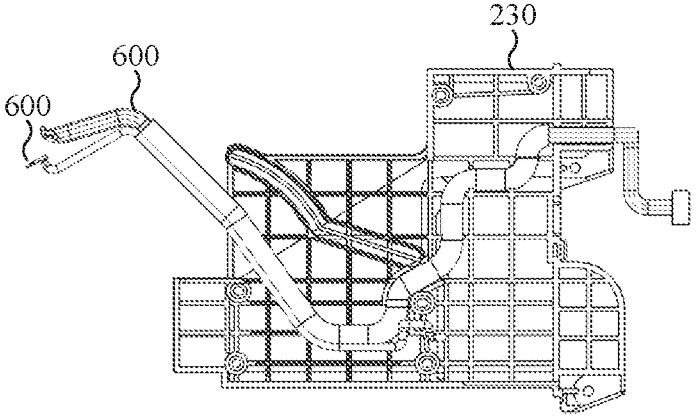

As shown in FIGS. 4A through 4G, the cover 204 of the body has been rotated about a base where the second pins extend into the second slots 224 and act as hinges. When the cover 204 is in the pulled position 201*b* and a jam has been identified, the cover 204 can have an additional movement of rotation applied about the second pins acting as hinges and guided by the first pins 222 through the arc portion of the combination linear and arc slot. In the hinged position 201*c*, complete access is available to the banknote path. In this configuration, the cover 204 could be optionally removed by a technician, which will be described in greater detail in regard to FIGS. 6A through 6C showing the wire configurations. However, the walls that the pins extend from the guide assembly 218 can be made flexible in order for removing the pins for the respective slots. In certain embodiments, the pins can be retractable. In yet other embodiments, an intermediate portion of the slots can have extra width for the pins to be removed in a perpendicular direction to the slot.

As shown in FIG. 4H through 4K, the first slots 226 can have a linear portion 232 and a curved portion 234. The second pins 220 in the rotated position remain at the same location of the second slots 224 as in the pulled position 201*b*. However, the first pins 222 travel to an end of the second portion that is arced of the first slots 226. The rotation of the cover 204 is limited by the arc portion of the first slots 226.

Figure 5A:
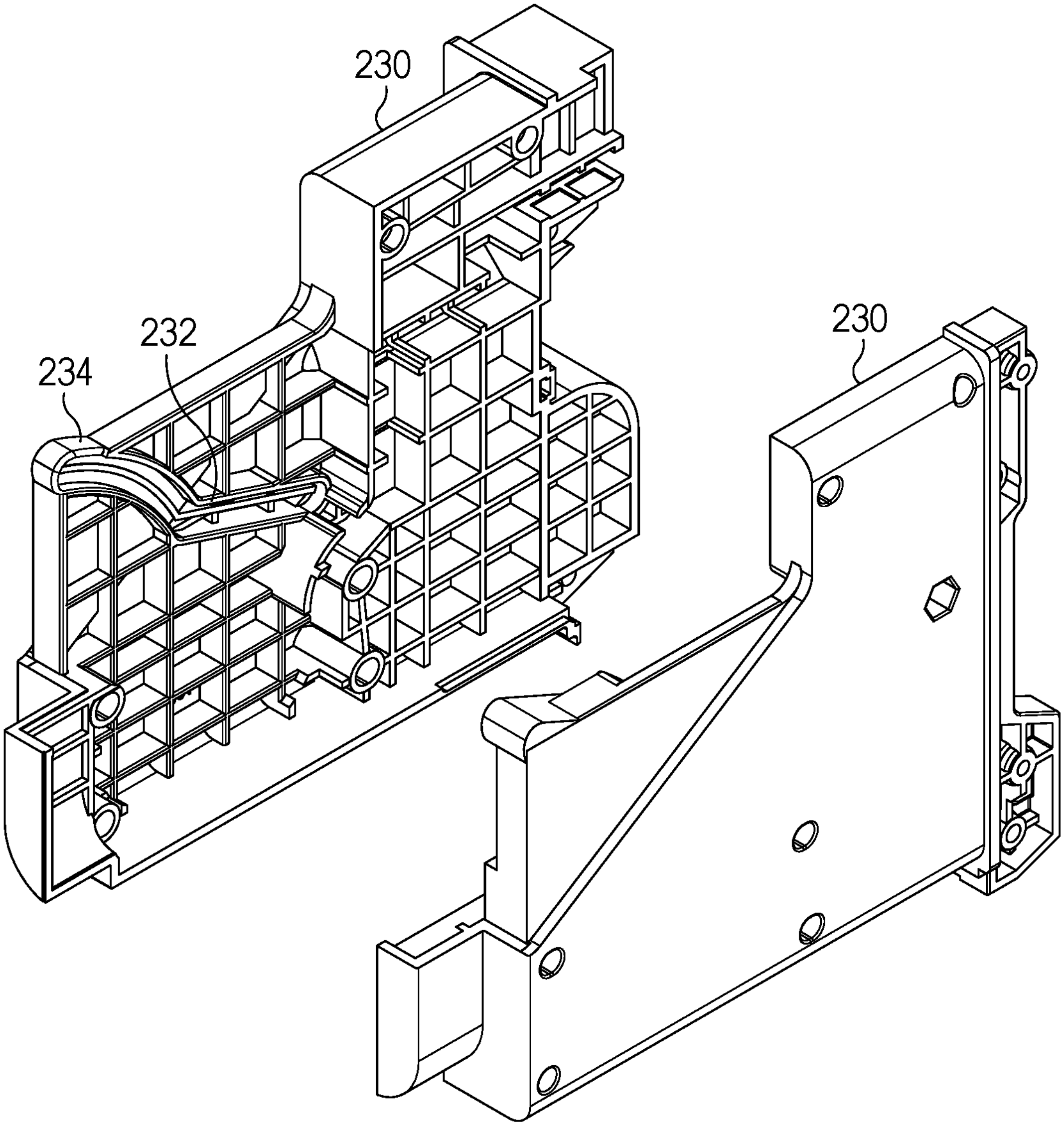
FIGS. 5A through 5C illustrate schematic views of proposed embodiments of jam clearance mechanism for a banknote feeder in accordance with various embodiments of the present disclosure.
Figure 5B:
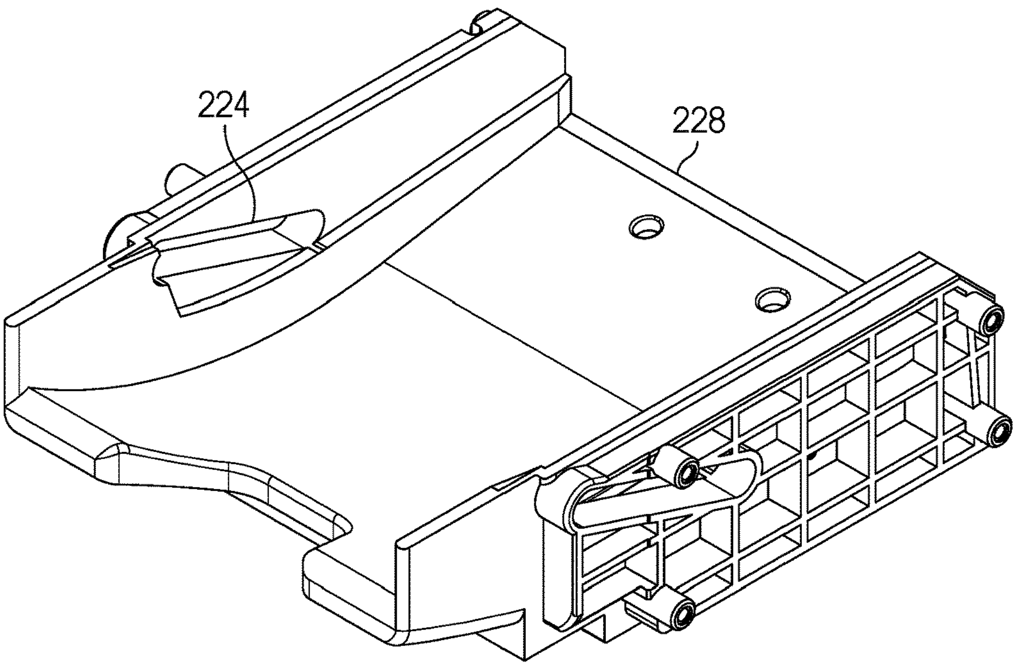
Figure 5C:
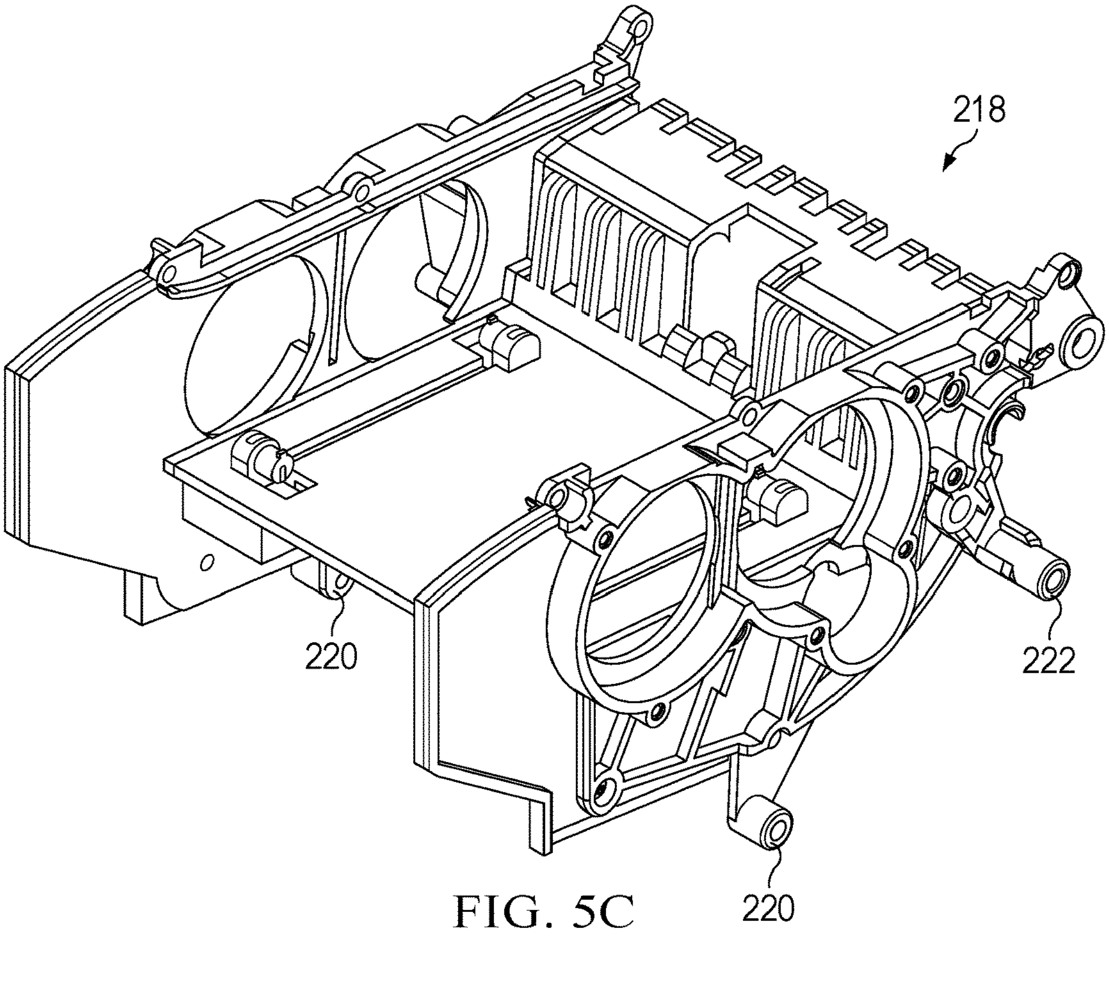

FIGS. 5A through 5C illustrate schematic views of proposed embodiments of jam clearance mechanism for a banknote feeder 200 in accordance with various embodiments of the present disclosure. In particular, FIG. 5A illustrates a linear and arc slot, FIG. 5B illustrates a second slot 224, and FIG. 5C illustrates first pins 222 and second pins 220 that are guided by the second slot 224 and the first slot 226.

As shown in FIGS. 5A through 5C, the jam clearance mechanism can include three components for controlling a movement of the cover 204 to allow access to the banknote path within the banknote feeder 200. FIG. 5A shows the first slots 226 in the side walls 230 of the body 206. FIG. 5B shows the second slot 224 in the side walls 228 of the banknote accept inlet 210. FIG. 5C shows the second pins 220 and the first pins 222 extending from the guide assembly 218. FIGS. 2A through 2K illustrate a jam clearance mechanism in the operational position. FIGS. 3A through 3K illustrate a jam clearance mechanism in the pulled position 201*b*. FIGS. 4A through 4K illustrate a jam clearance mechanism in the pulled and hinged position 201*c*.

FIGS. 6A through 6C illustrate schematic views of proposed embodiments of wires 600 in the banknote feeder 200 in each position in accordance with various embodiments of the present disclosure. In particular, FIG. 6A illustrates an arrangement of wire 600 when the banknote feeder 200 is in an operation position 201*a;* FIG. 6B illustrates an arrangement of wire 600 when the banknote feeder 200 is in a pulled position 201*b;* and FIG. 6C illustrates an arrangement of wire 600 when the banknote feeder 200 is in a pulled and hinged position 201*c*.

As shown in FIGS. 6A through 6C, the wires 600 for the banknote feeder 200 can extend from the body 206 to the cover 204. The wires 600 can extend along a bottom of the body 206 until reaching the guide assembly 218 of the cover 204. The wire 600 can include an excess located in a space between the side wall 228 of the banknote accept inlet 210 and the side walls 230 of the body 206. When the cover 204 is in the hinged position 201*c,* the excess wire 600 can be utilized in order for the wire 600 to extend completely with the movement of the cover 204. In the hinge positioned, a technician can access and remove the wires 600 from the connection in the cover 204 before removing the cover 204. The banknote feeder 200 can be detached from the banknote accepting apparatus if the technician needs to replace the banknote feeder 200. The technician can remove the top cover 204, disconnect the harness that connects the banknote feeder 200 with the banknote accepting apparatus. The repair technician then can position the banknote feeder 200 such that the lower pivot pins are at the pivot position, lift the banknote feeder 200 to disengage the second pins 220 from the second slots 224. The first pins 222 can be disengaged and swiveled out of the first slots 226.

Figure 7:
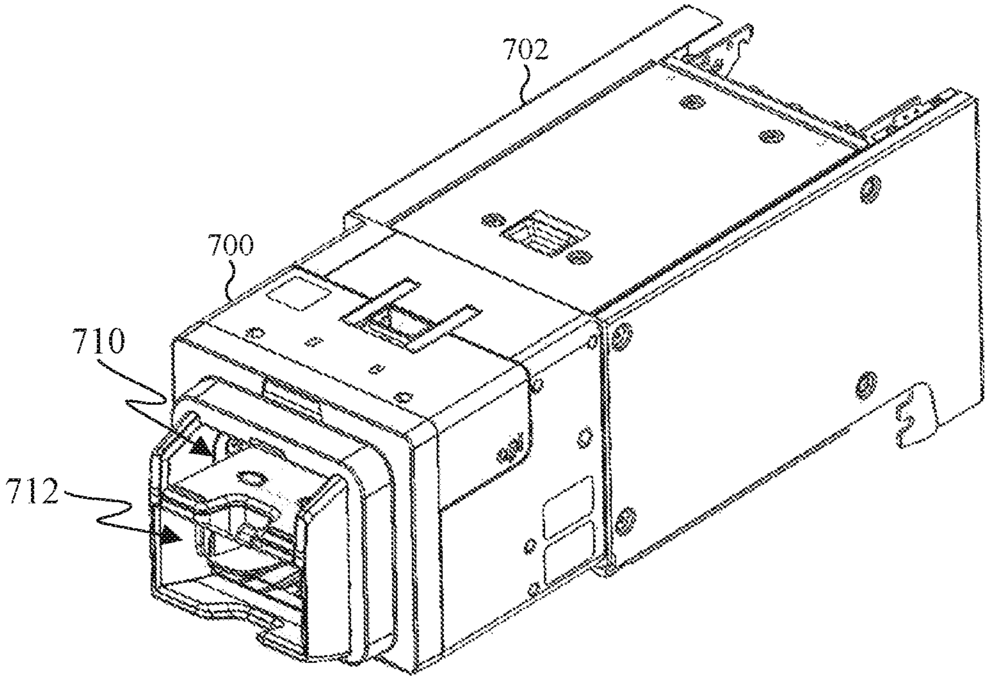
FIG. 7 illustrates schematic view of proposed embodiment of a banknote feeder in accordance with various embodiments of the present disclosure.
Figure 7A:
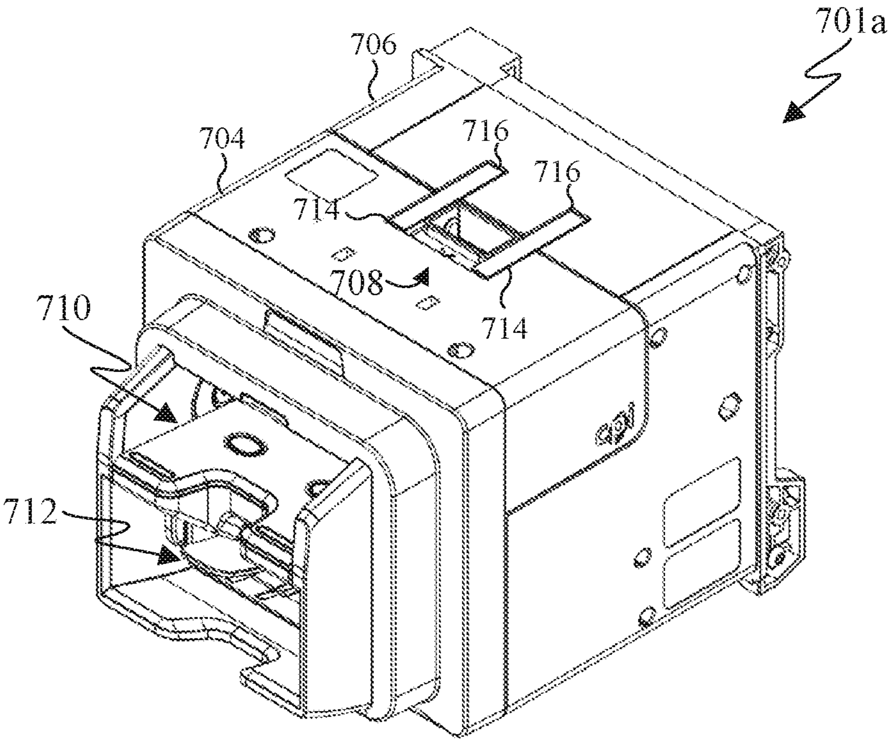
FIGS. 7A through 7K illustrate schematic views of proposed embodiments of a banknote feeder in an operation position in accordance with various embodiments of the present disclosure.
Figure 7B:
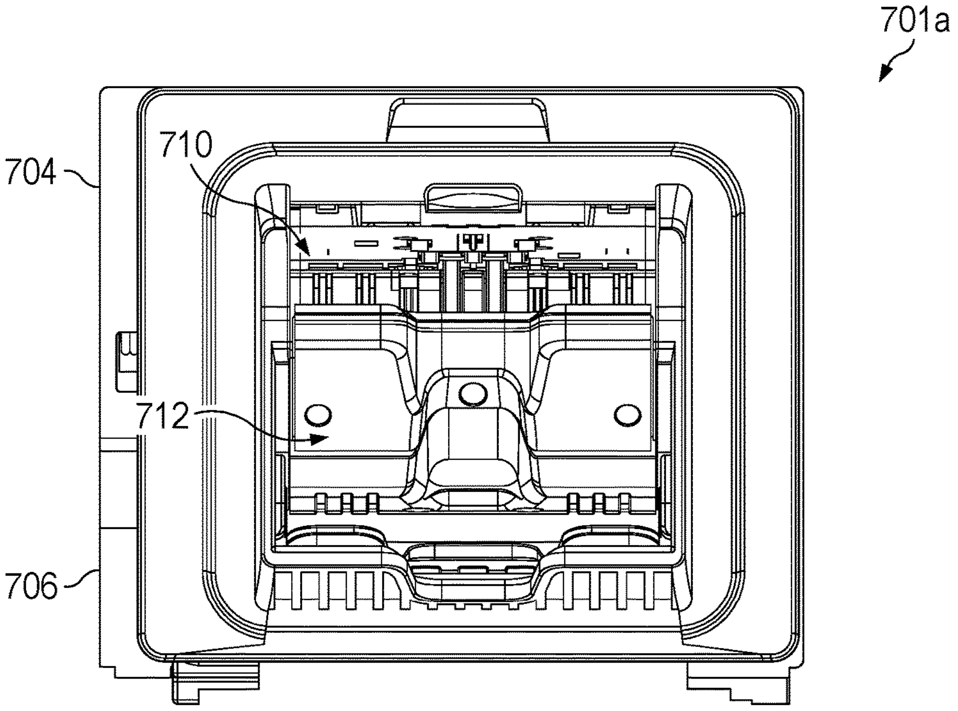
Figure 7C:
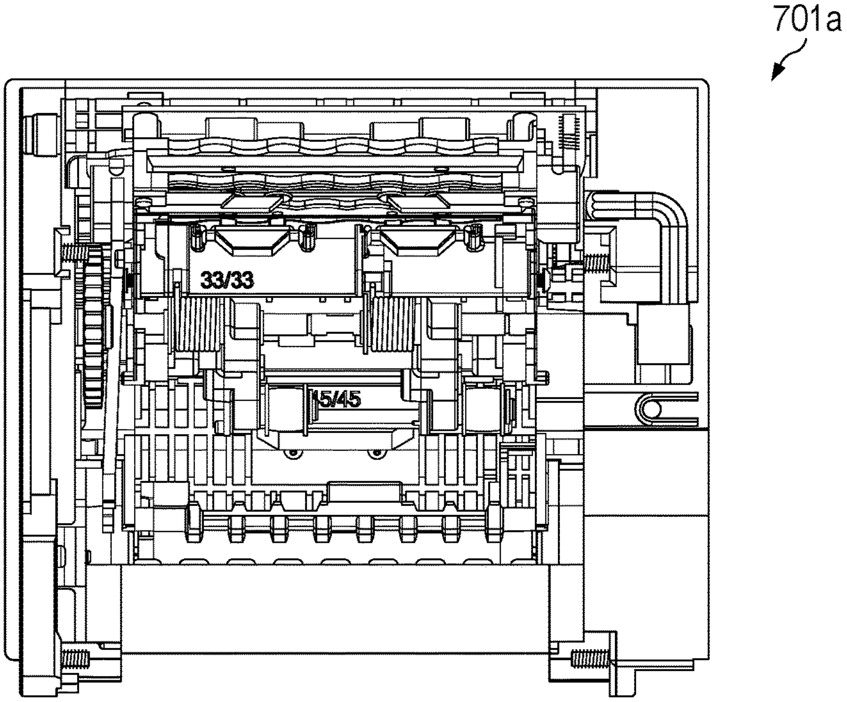
Figure 7D:
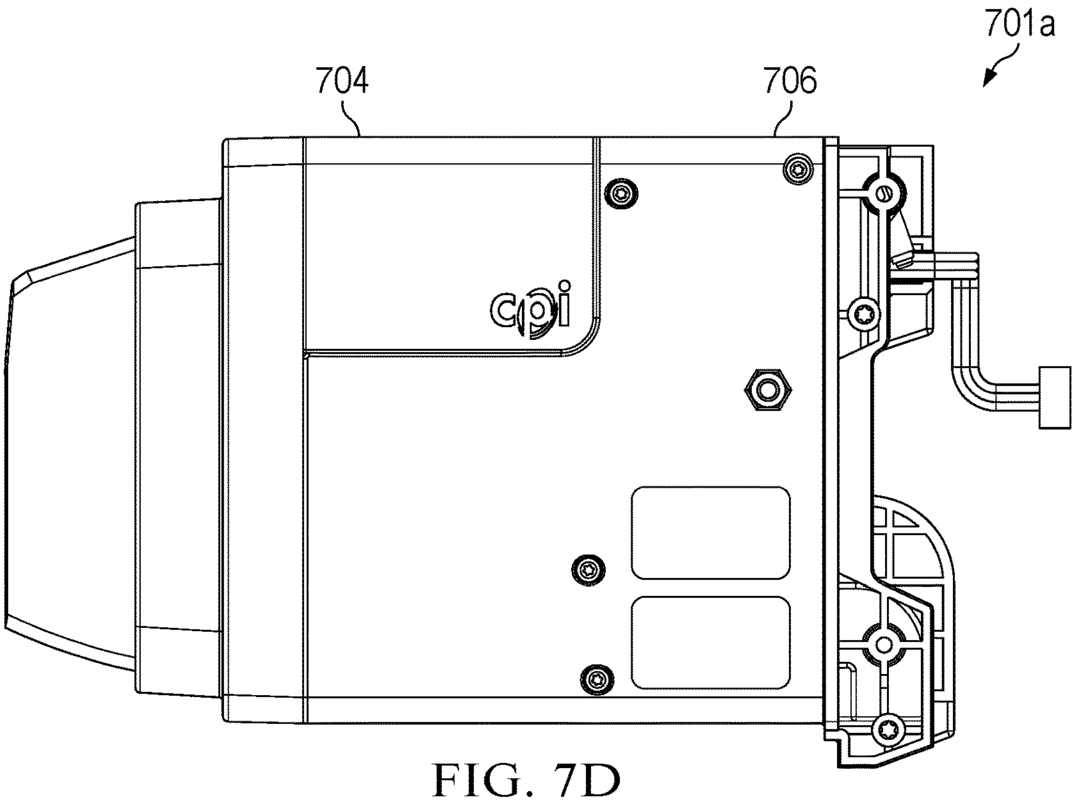
Figure 7E:
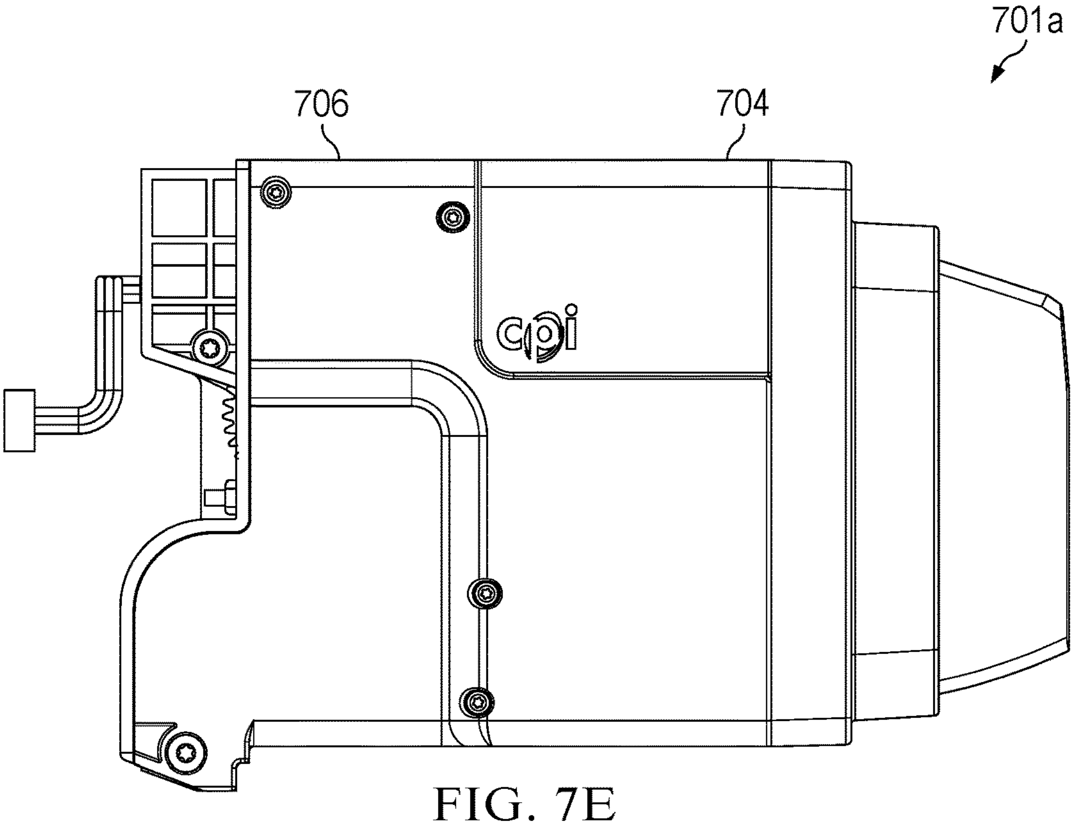
Figure 7G:
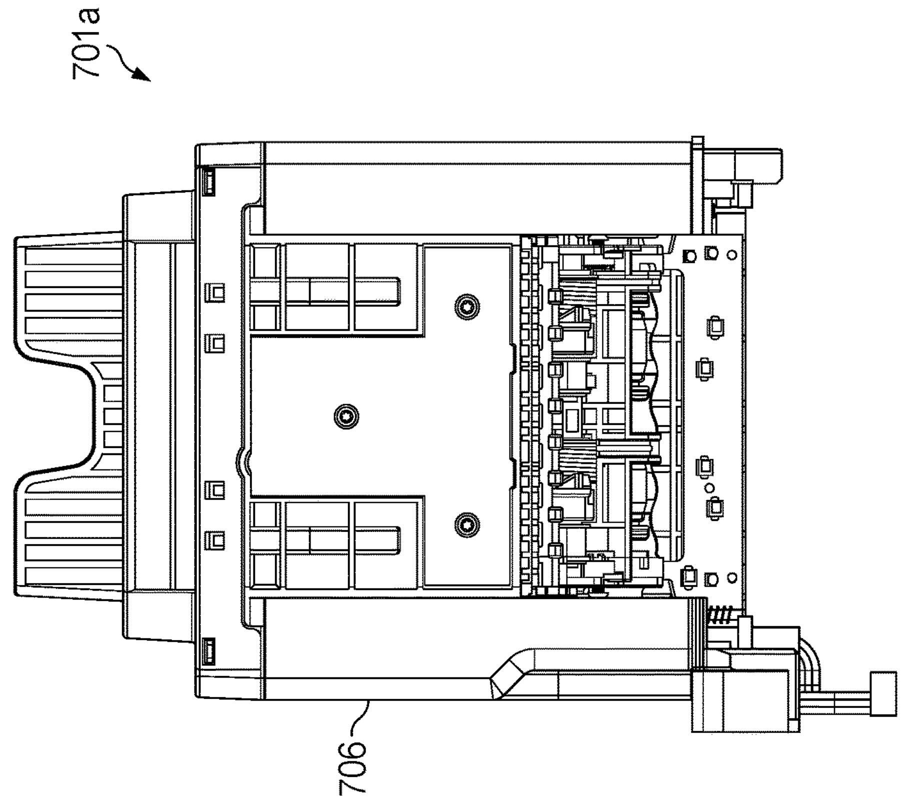
Figure 7F:
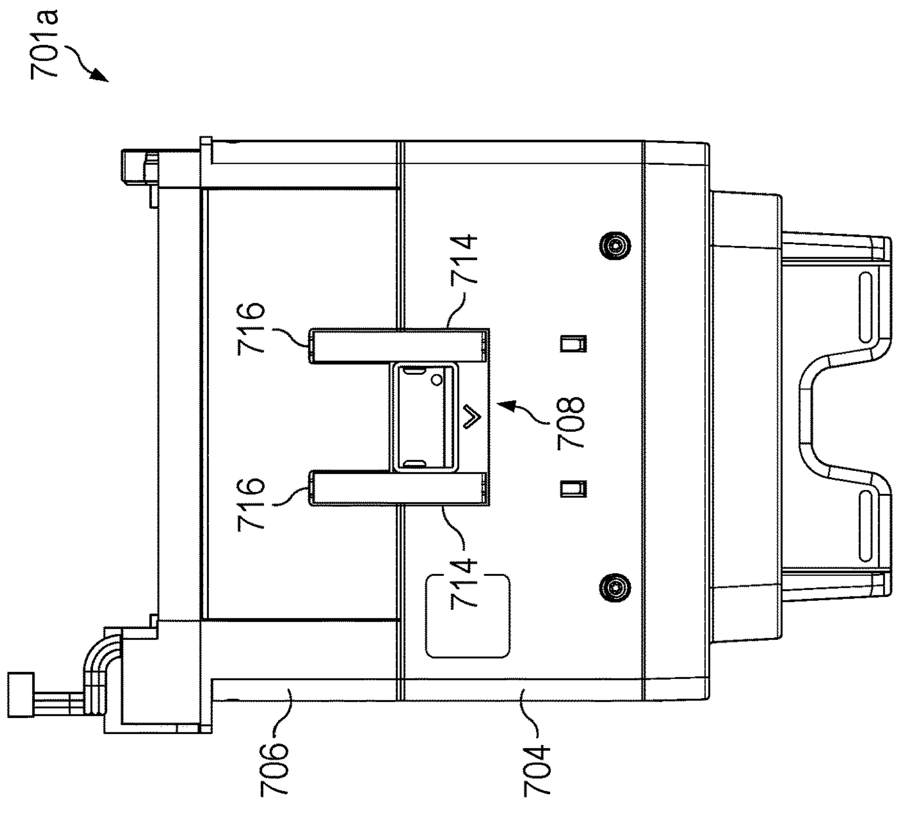
Figure 7H:
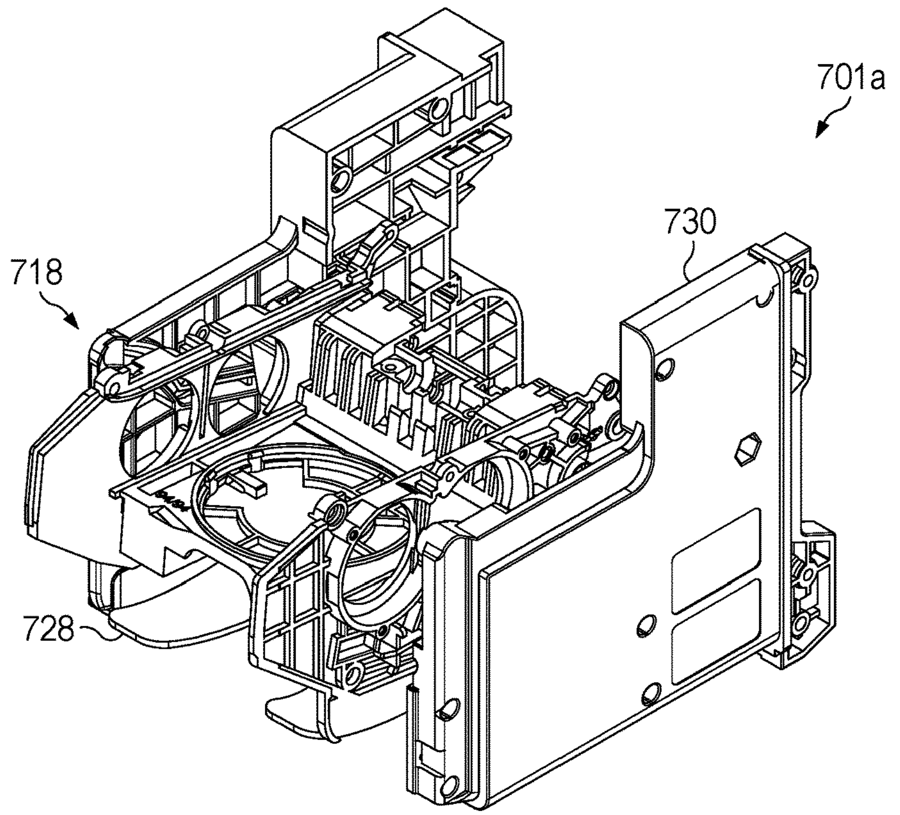
Figure 7I:
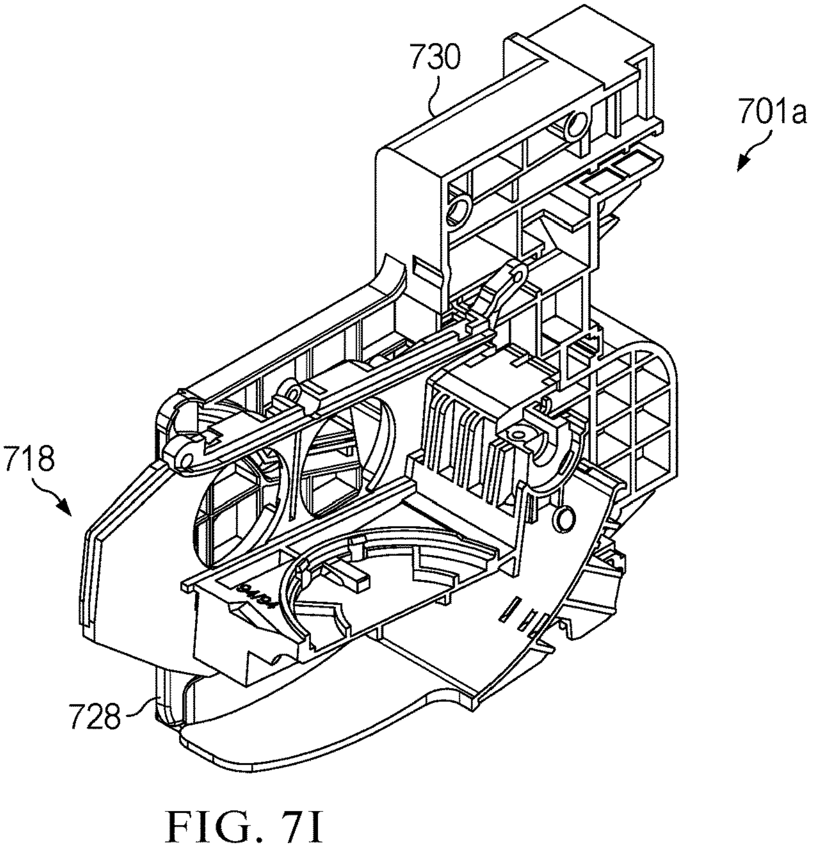
Figure 7J:
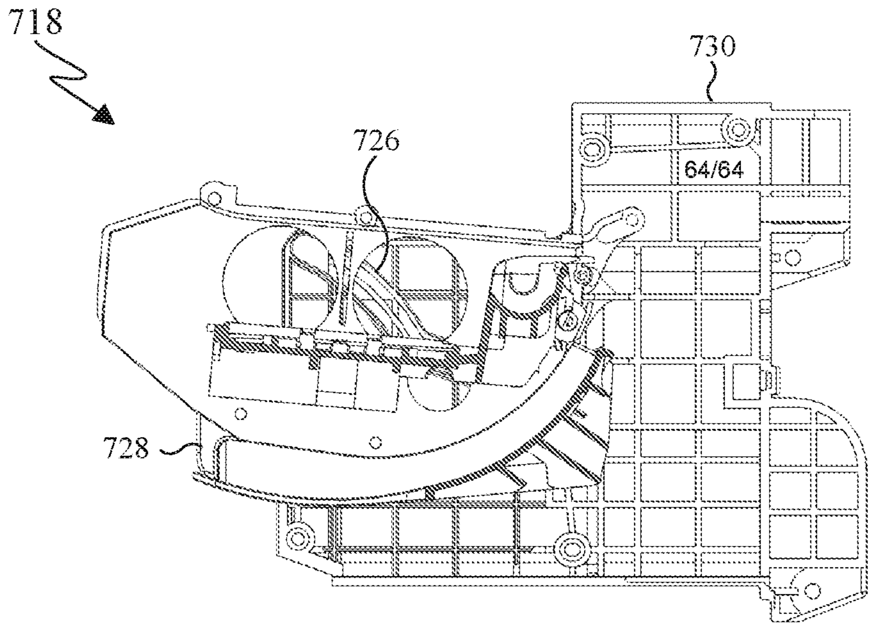
Figure 7K:
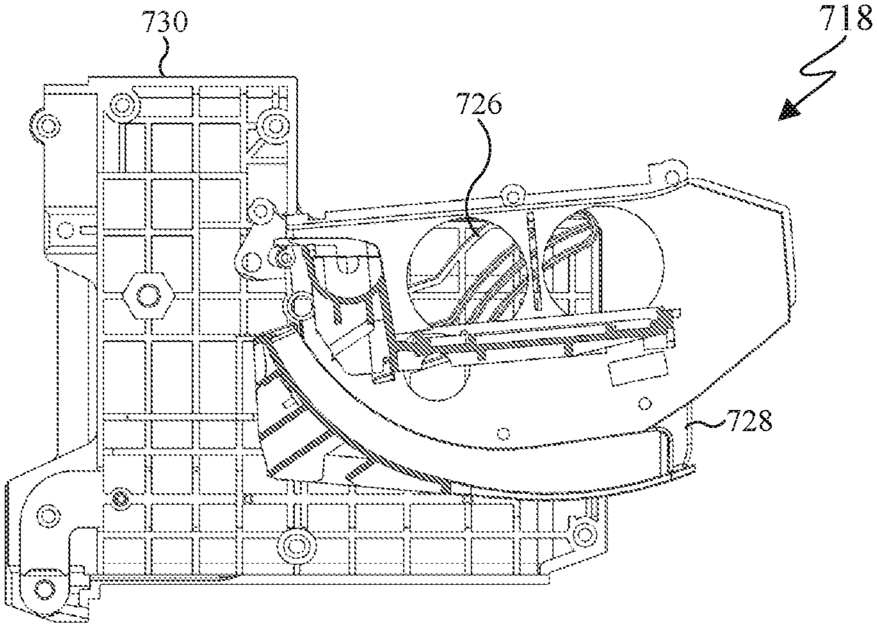

FIGS. 7 and 7A through 7K illustrate schematic views of proposed embodiments of a banknote feeder 700 in an operation position 701*a* in accordance with various embodiments of the present disclosure. FIG. 7 illustrates an example banknote feeder 700 and a banknote receiver 702 in an operation position 701*a* from an isometric perspective in accordance with various embodiments of the present disclosure. FIG. 7A illustrates an example of a banknote feeder 700 in an operation position 701*a* from an isometric perspective in accordance with various embodiments of the present disclosure. FIG. 7B illustrates an example of a banknote feeder 700 in an operation position 701*a* from a front perspective in accordance with various embodiments of the present disclosure. FIG. 7C illustrates an example of a banknote feeder 700 in an operation position 701*a* from a back perspective in accordance with various embodiments of the present disclosure. FIG. 7D illustrates an example of a banknote feeder 700 in an operation position 701*a* from a first side perspective in accordance with various embodiments of the present disclosure. FIG. 7E illustrates an example of a banknote feeder 700 in an operation position 701*a* from a second side perspective in accordance with various embodiments of the present disclosure. FIG. 7F illustrates an example of a banknote feeder 700 in an operation position 701*a* from a top perspective in accordance with various embodiments of the present disclosure. FIG. 7G illustrates an example of a banknote feeder 700 in an operation position 701*a* from a bottom perspective in accordance with various embodiments of the present disclosure. FIG. 7H illustrates an example of a banknote feeder 700 in an operation position 701*a* with a cover 704 removed from an isometric perspective in accordance with various embodiments of the present disclosure. FIG. 7I illustrates an example cross section of a banknote feeder 700 in an operation position 701*a* with a cover 704 removed from an isometric perspective in accordance with various embodiments of the present disclosure. FIG. 7J illustrates an example cross section of a banknote feeder 700 in an operation position 701*a* with a cover 704 removed from a first side perspective in accordance with various embodiments of the present disclosure. FIG. 7K illustrates an example cross section of a banknote feeder 700 in an operation position 701*a* with a cover 704 removed from a second side perspective in accordance with various embodiments of the present disclosure.

As shown in FIG. 7, a banknote feeder 700 can be installed on a front of a banknote receiver 702. Banknotes can be inserted into an accept inlet 710 and returned through a return outlet 712. The return outlet 712 can be used for rejected banknotes, unauthenticated banknotes, change banknotes, etc. The banknote feeder 700 can separate a stack of banknotes and transport each banknote separately to the banknote receiver 702. The banknote receiver 702 can perform different verifications and authentications of banknotes. The banknote receiver 702 can also transport the banknotes further into banknote systems 100-107. The cover 704 can be removably coupled to the body 706 using a guide assembly 718. The banknote feeder 700 is shown in the operation position 701*a* where the cover 704 is latched to the body 706. The cover 704 of the banknote feeder 700 can protect internal components of the banknote feeder 700 from external interferences. The latch 708 on the cover 704 keeps the cover 704 from accidentally being opened and exposing the internal components. Once a banknote jam is detected, the latch 708 can be detached from the body 706 to allow the cover 704 to move away from the body 706.

As shown in FIGS. 7A through 7G, a housing of the banknote feeder 700 can completely enclose the internal components except for a banknote accept inlet 710 that accepts one or more banknotes and a banknote return outlet 712 that returns one or more banknotes. The housing can include a cover 704 and a body 706. The body 706 can be fixedly or removably coupled to a banknote receiver. The cover 704 can include a latch 708 that secures the cover 704 onto the body 706 in a manner that the cover 704 cannot be accidentally opened exposing internal components of the banknote feeder 700. Any type of latching mechanism can be used to secure the cover 704 to the body 706. In certain embodiments, the latch 708 has two prongs 714 that extend into grooves 716 of the body 706. Each prong 714 can include an extra protrusion 715 that extends downward that interacts with a depression 717 on a lower surface of the groove 716 in the body 706 or can each include a depression on a lower surface that interacts with a protrusion from a lower surface of the groove 716 in the body 706. The latch 708 can be lifted or depressed to move the entire latch 708 in a manner that the prongs 714 are separated from the grooves 716 of the body 706. In certain embodiments, the protrusions can be retractable when a button of the latch 708 or body 706 is pressed. While illustrated on the cover 704, the latch 708 can also be positioned on the body 706 to latch on to the cover 704.

As shown in FIGS. 7H through 7K, the cover 704 can include a guide assembly 718 that includes two second pins 720 and two first pins 722. The body 706 of the banknote feeder 700 includes a second slot 724 that is a second slot 724 on the each of the side walls 728 of the banknote inlet and a first slot 726 that is a combination linear and arc slot on each side wall 730 of the body 706. Each of the second pins 720 can be inserted into a respective second slot 724 and each of the first pins 722 can be inserted into a respective first slot 726. In the orientation where the cover 704 is latched onto the body is referred to as the operational position when the banknote feeder 700 is able to receive banknotes. Movement of the guide assembly 718 is guided by the respective slots. The second pins 720 can move linearly in the second slot 724. The first pins 722 can move linearly in the linear portion of the first slot 726 along with the second pins 720 in the second slot 724. The first pins 722 can guide a rotation of the guide assembly 718 once the second pins 720 have reached an end of the respective second slots 724. The movement of the second pins 720 do not allow rotation of the cover 704 through the linear motion of the cover 704 from the operational position 701*a* to the pulled position 701*b*. In the second motion, the second pins 720 can act as hinges. The linear movement of the cover 704 is referred to as a pulled position 701*b* and the arc or rotational movement of the cover 704 is referred to as a rotated or hinged position 201*c*. The second pins 720 do not allow linear motion of the cover 704 through the rotation motion of the cover 704 from the pulled position 701*b* to the hinged position 701*c*.

Figure 8A:
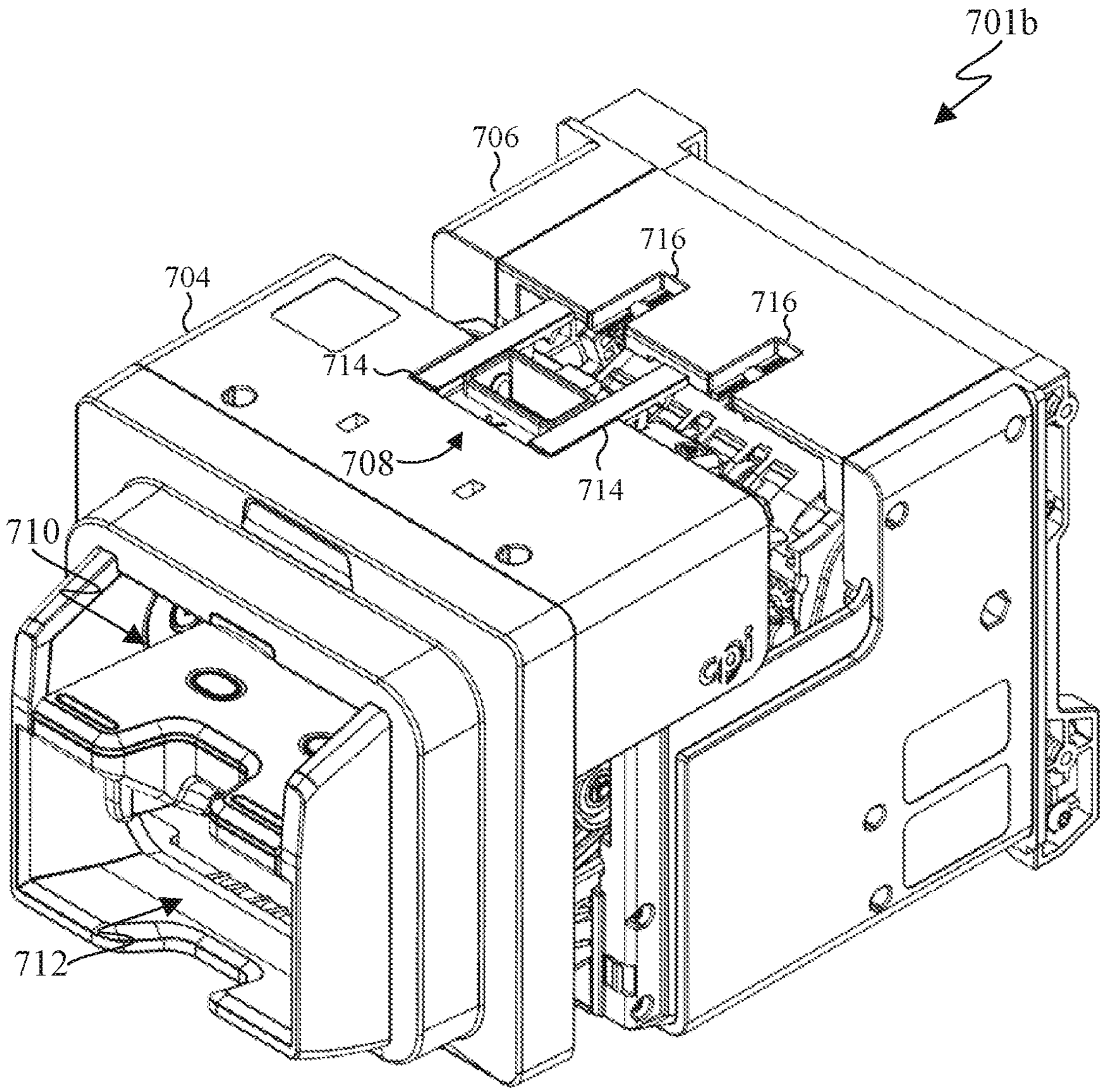
FIGS. 8A through 8K illustrate schematic views of proposed embodiments of a banknote feeder in a pulled position in accordance with various embodiments of the present disclosure.
Figure 8B:
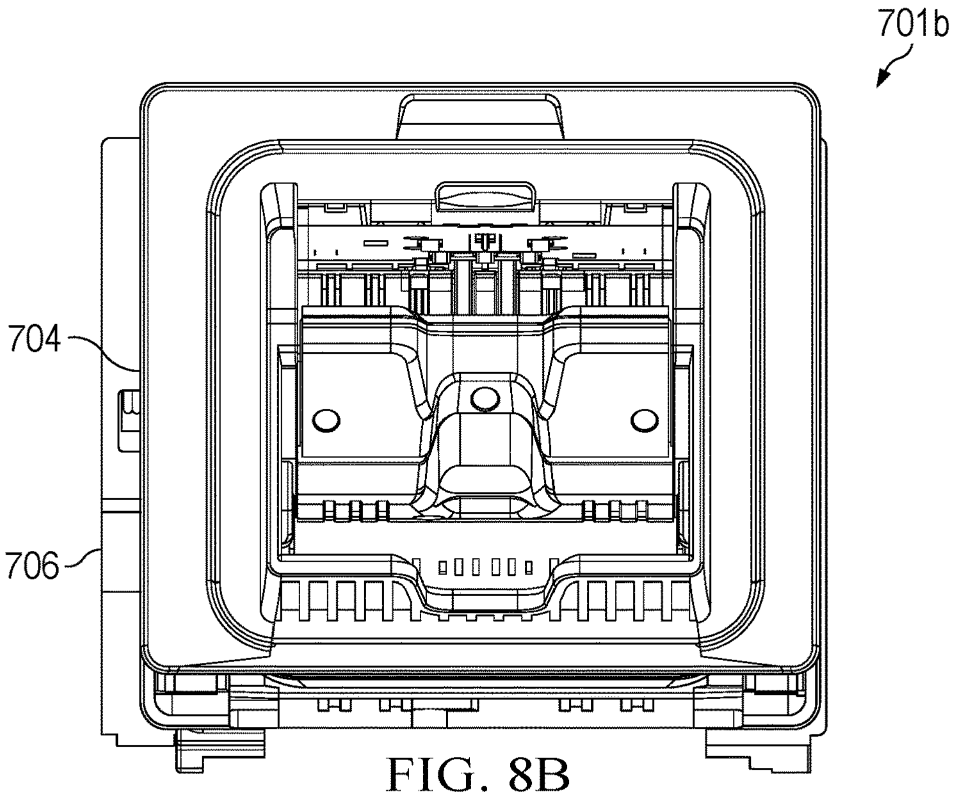
Figure 8C:
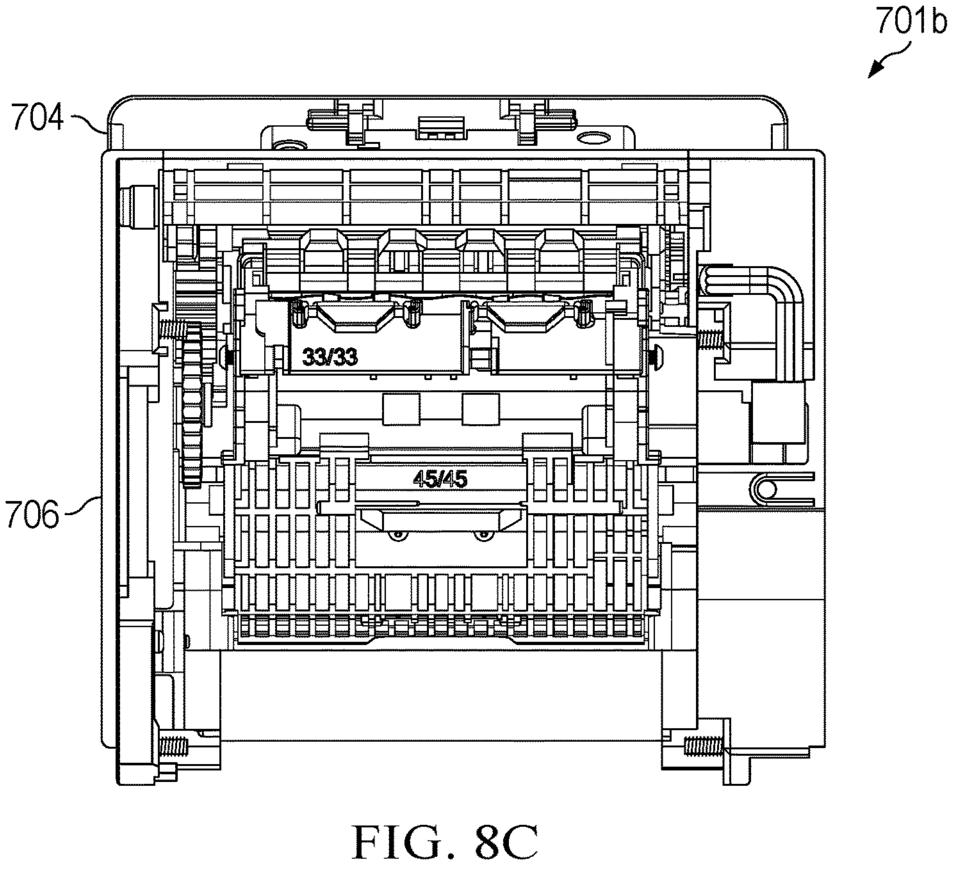
Figure 8D:
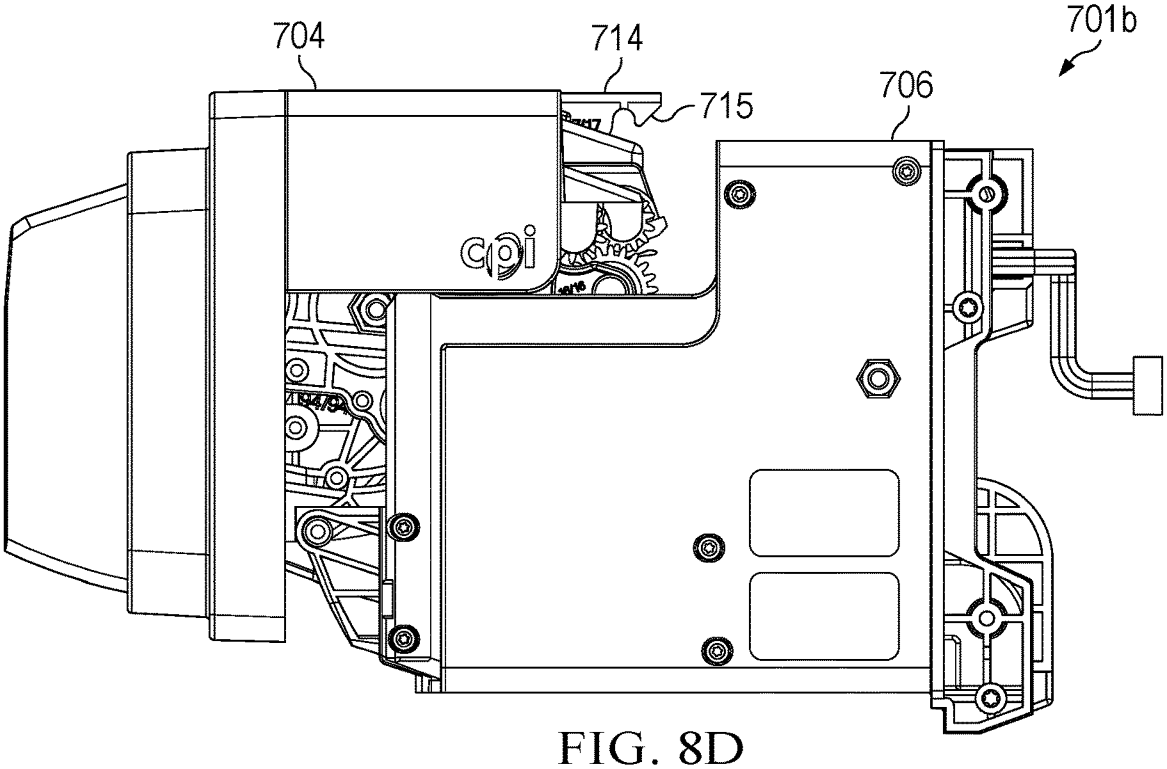
Figure 8E:
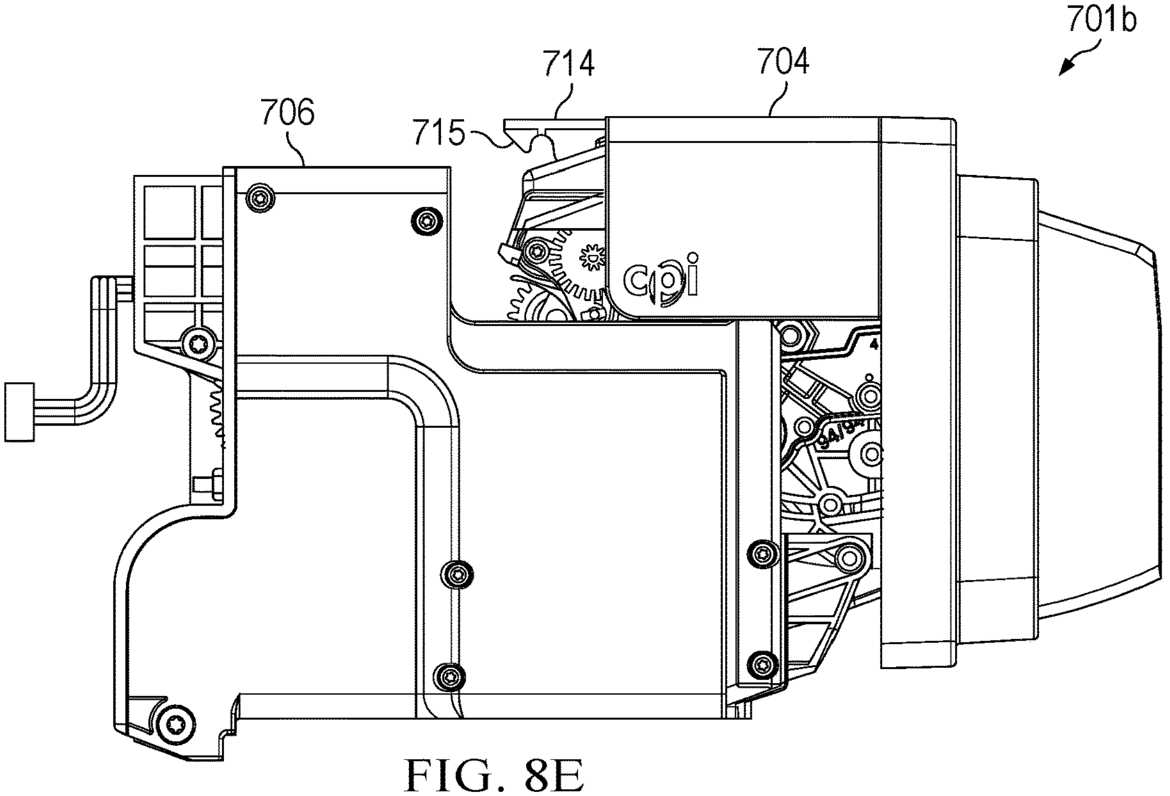
Figure 8G:
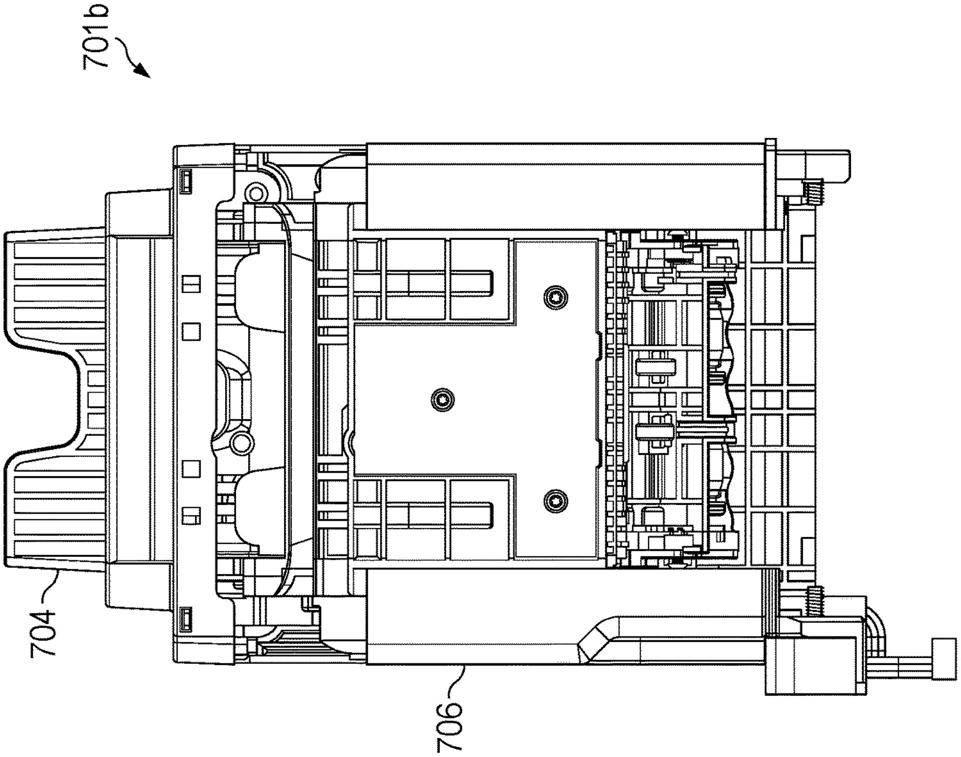
Figure 8F:
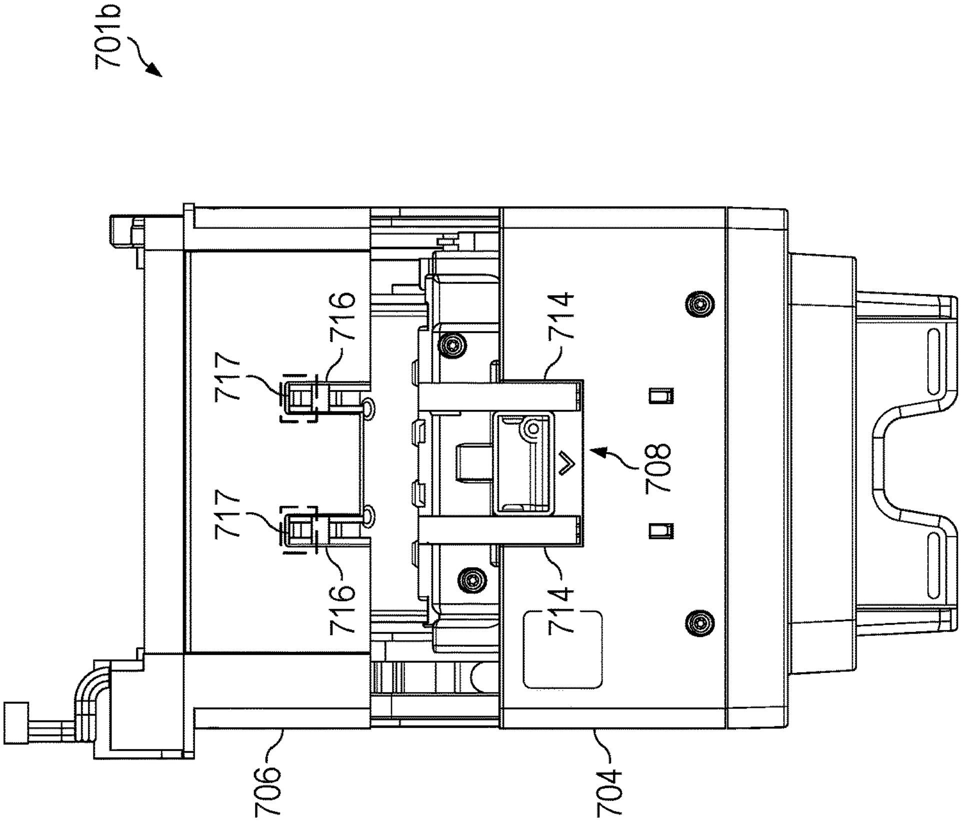
Figure 8H:
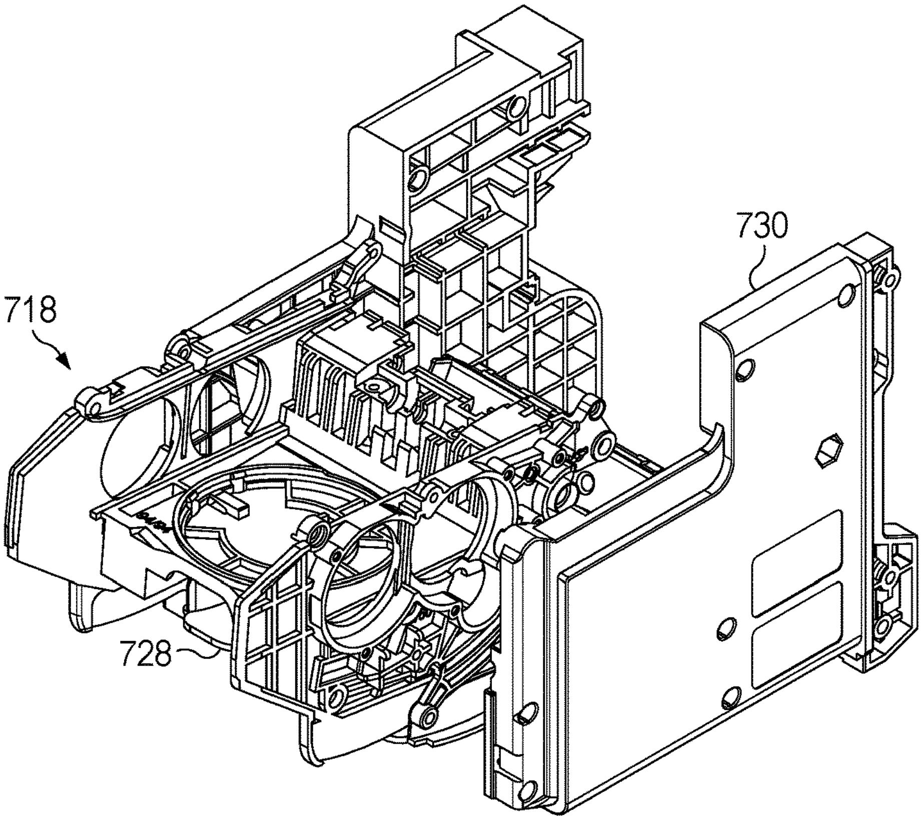
Figure 8I:
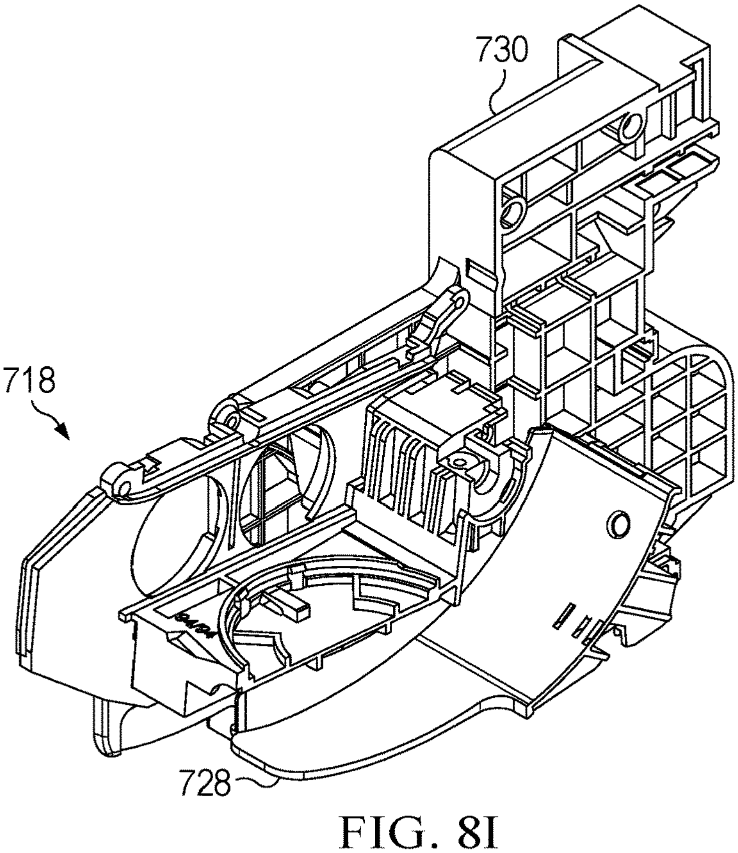
Figure 8J:
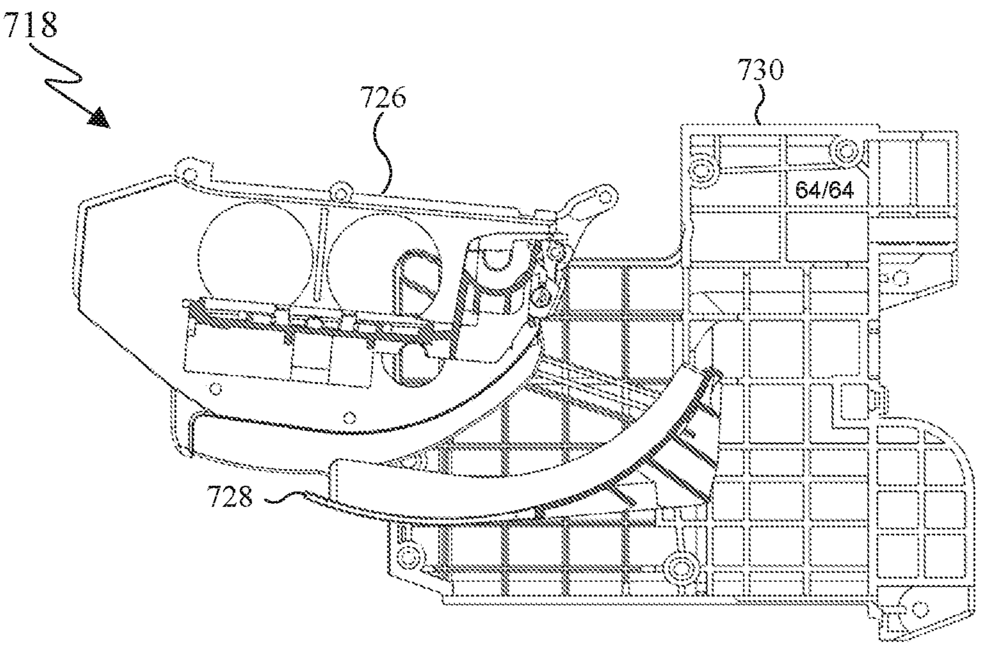
Figure 8K:
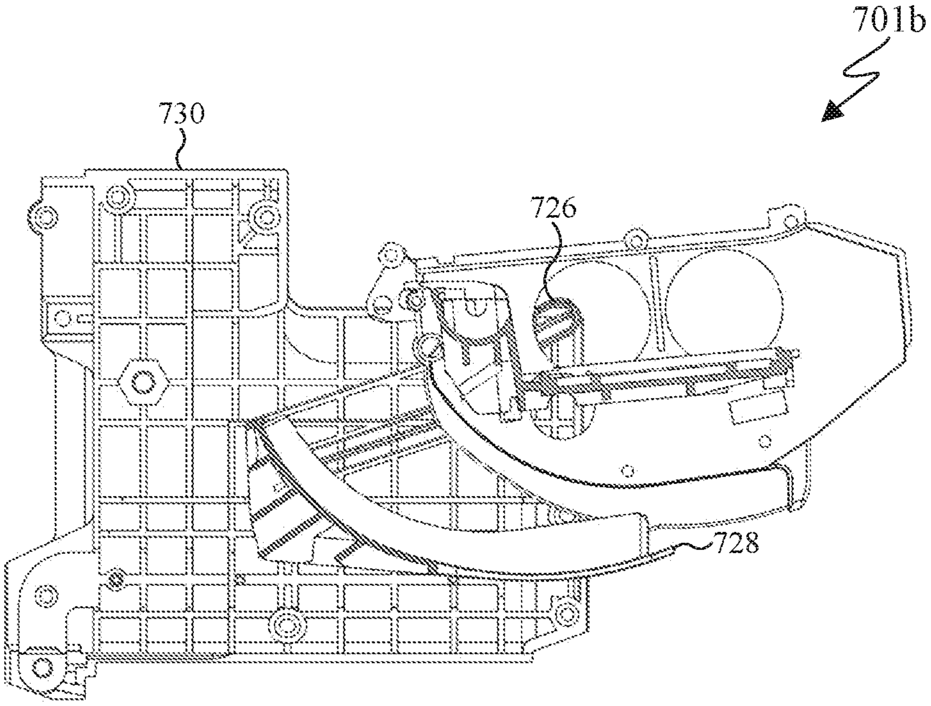

FIGS. 8A through 8K illustrate schematic views of proposed embodiments of a banknote feeder 700 in a pulled position 701*b* in accordance with various embodiments of the present disclosure. FIG. 8A illustrates an example of a banknote feeder 700 in a pulled position 701*b* from an isometric perspective in accordance with various embodiments of the present disclosure. FIG. 8B illustrates an example of a banknote feeder 700 in a pulled position 701*b* from a front perspective in accordance with various embodiments of the present disclosure. FIG. 8C illustrates an example of a banknote feeder 700 in a pulled position 701*b* from a back perspective in accordance with various embodiments of the present disclosure. FIG. 8D illustrates an example of a banknote feeder 700 in a pulled position 701*b* from a first side perspective in accordance with various embodiments of the present disclosure. FIG. 8E illustrates an example of a banknote feeder 700 in a pulled position 701*b* from a second side perspective in accordance with various embodiments of the present disclosure. FIG. 8F illustrates an example of a banknote feeder 700 in a pulled position 701*b* from a top perspective in accordance with various embodiments of the present disclosure. FIG. 8G illustrates an example of a banknote feeder 700 in a pulled position 701*b* from a bottom perspective in accordance with various embodiments of the present disclosure. FIG. 8H illustrates an example of a banknote feeder 700 in a pulled position 701*b* with a cover 704 removed from an isometric perspective in accordance with various embodiments of the present disclosure. FIG. 8I illustrates an example cross section of a banknote feeder 700 in a pulled position 701*b* with a cover 704 removed from an isometric perspective in accordance with various embodiments of the present disclosure. FIG. 8J illustrates an example cross section of a banknote feeder 700 in a pulled position 701*b* with a cover 704 removed from a first side perspective in accordance with various embodiments of the present disclosure. FIG. 8K illustrates an example cross section of a banknote feeder 700 in a pulled position 701*b* with a cover 704 removed from a second side perspective in accordance with various embodiments of the present disclosure.

As shown in FIGS. 8A through 8G, the cover 704 of the banknote feeder 700 has been unlatched from the body 706 and has been pulled away from the body 706 in a linear movement. The pulled position 701*b* allows for viewing of the internal components and any potential jams within the body 706.

As shown in FIGS. 8H through 8K, the second pins 720 and first pins 722 of the cover 704 are guided along the second slot and the linear portion of the first slot 726. The second slot 724 limits a linear movement of the cover 704 away from the body 706. The second pins 720 contact an outer edge of the second slot 724. The first pins 722 reach an end of the linear portion of the first slot 726 but are not necessarily restricted for moving along the first slot 726 due to the curved portion of the first slot 726.

Figure 9A:
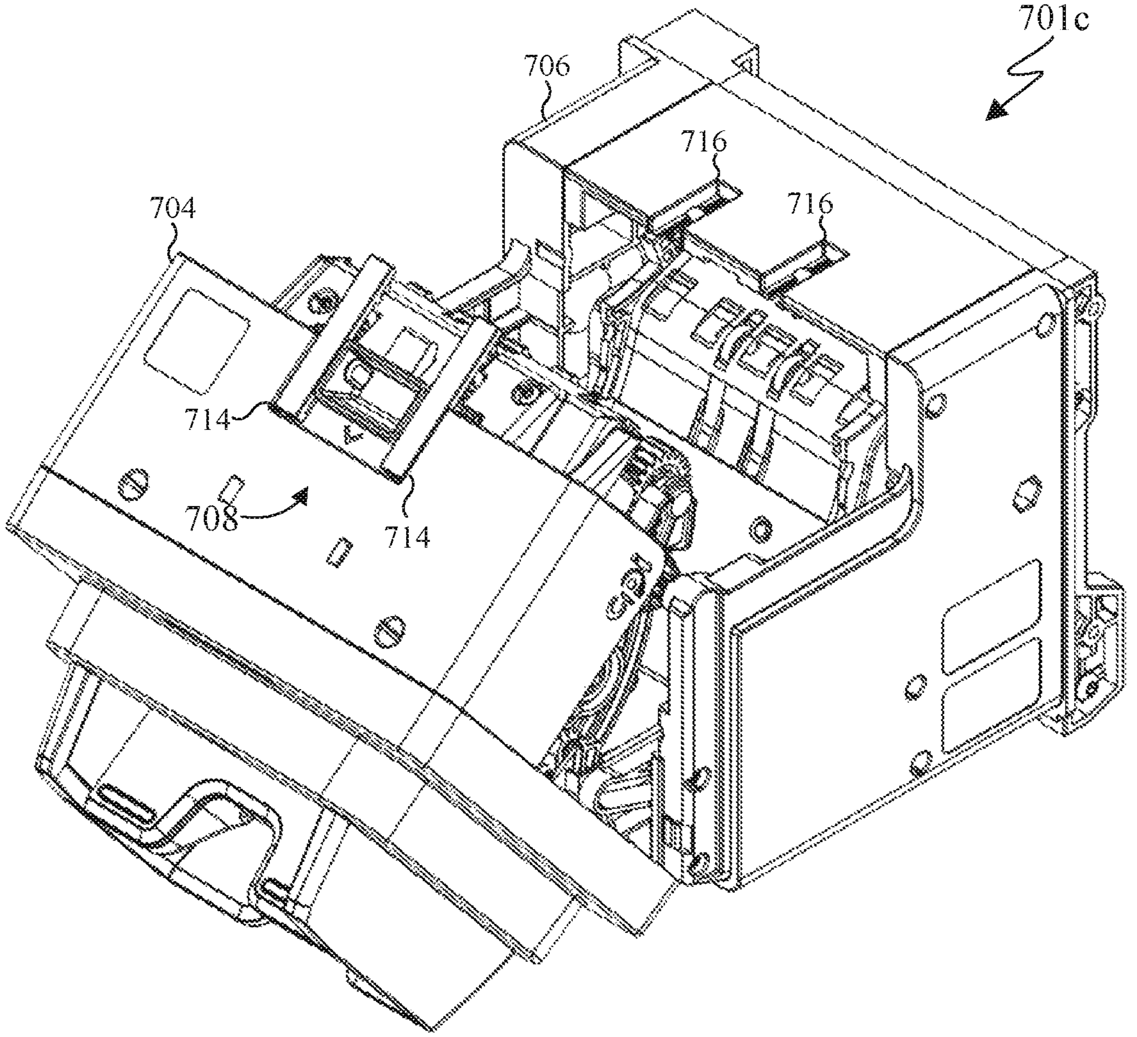
FIGS. 9A through 9K illustrate schematic views of proposed embodiments of a banknote feeder in a pulled and hinged position in accordance with various embodiments of the present disclosure.
Figure 9C:
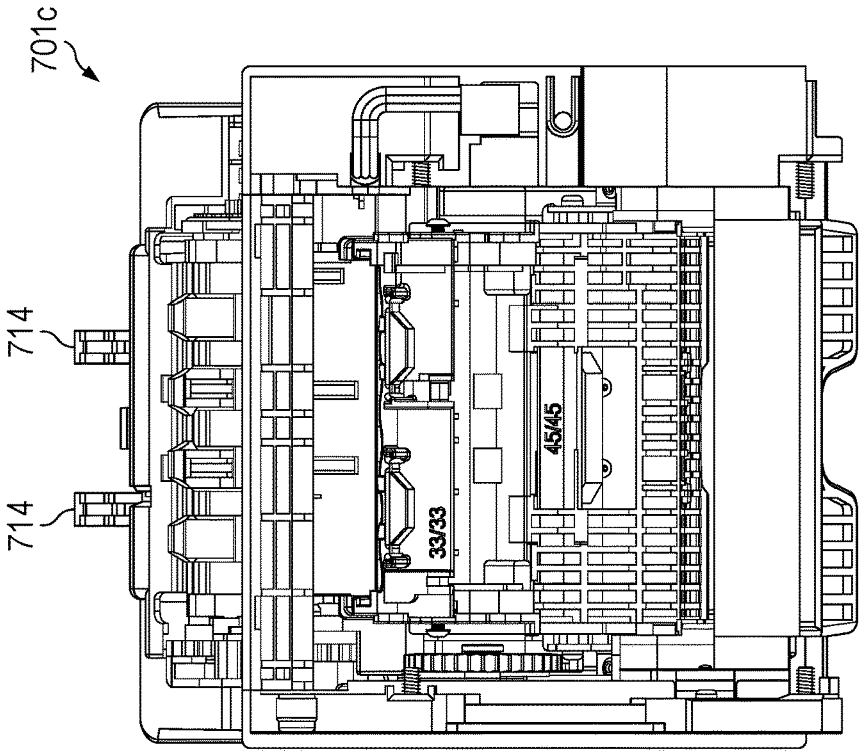
Figure 9B:
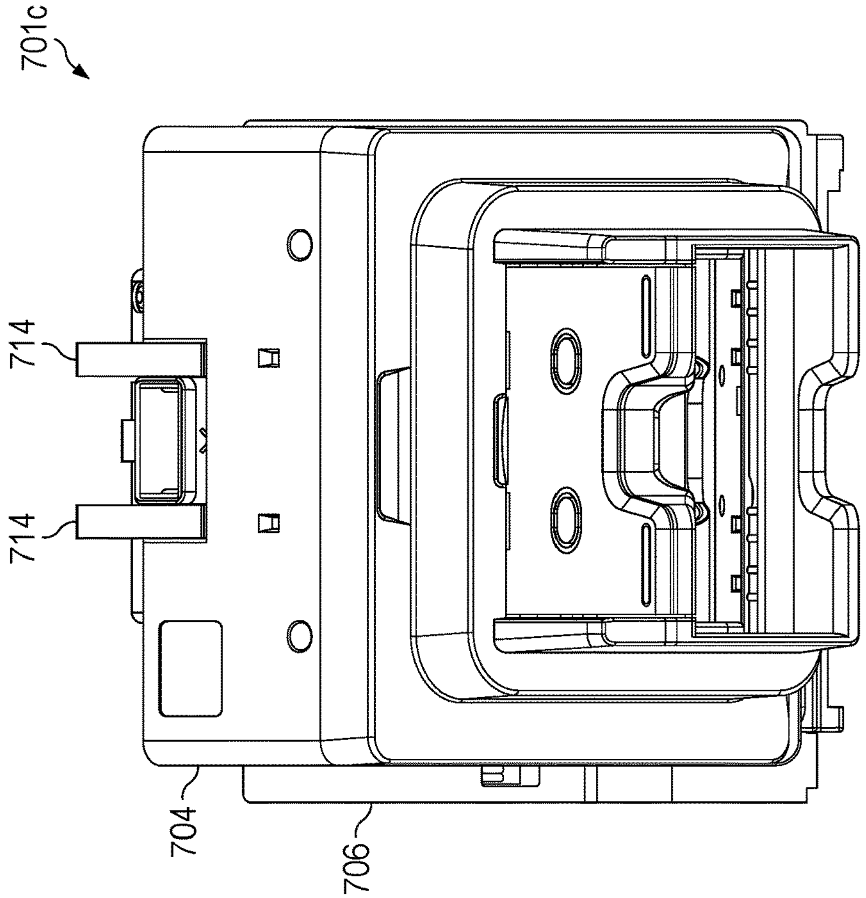
Figure 9D:
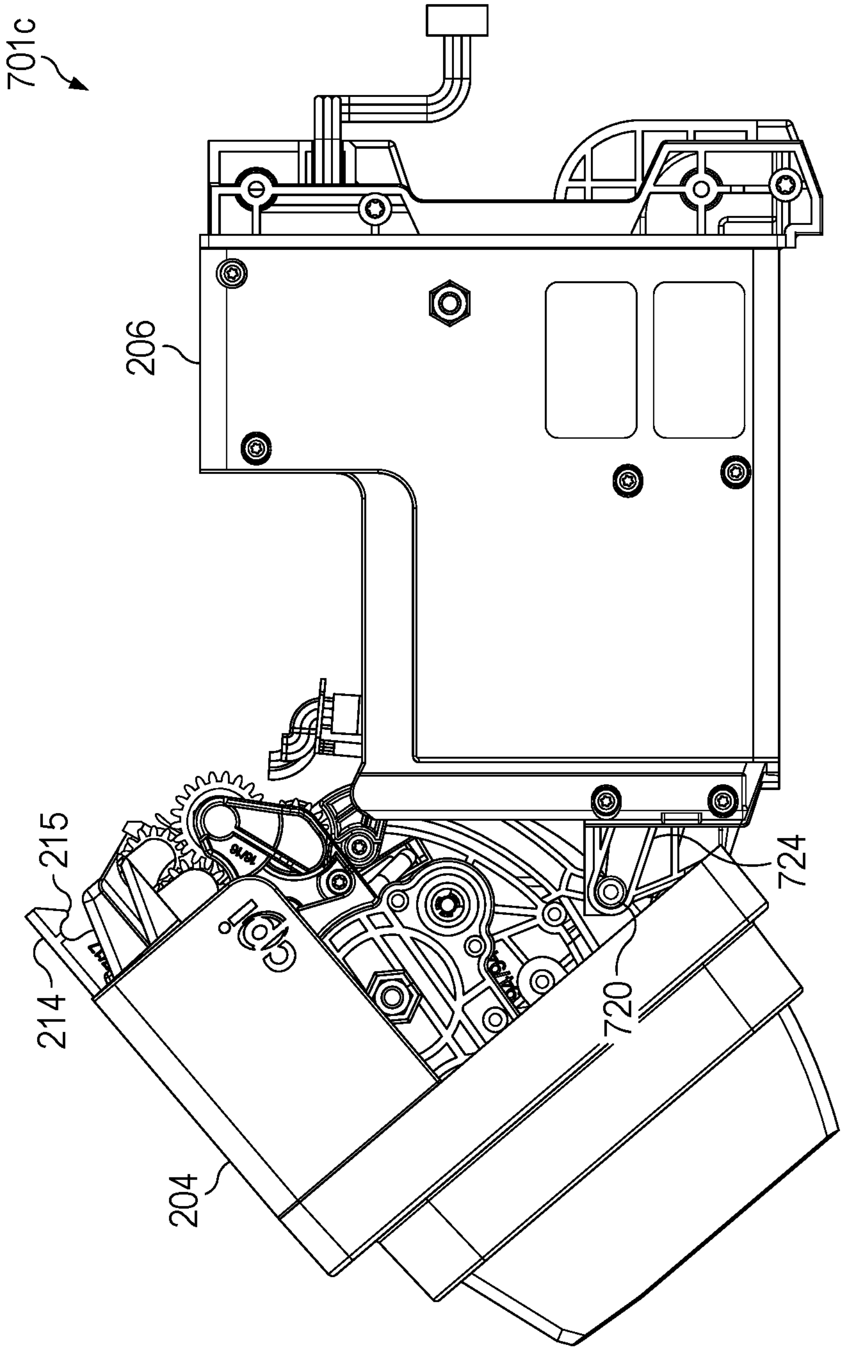
Figure 9E:
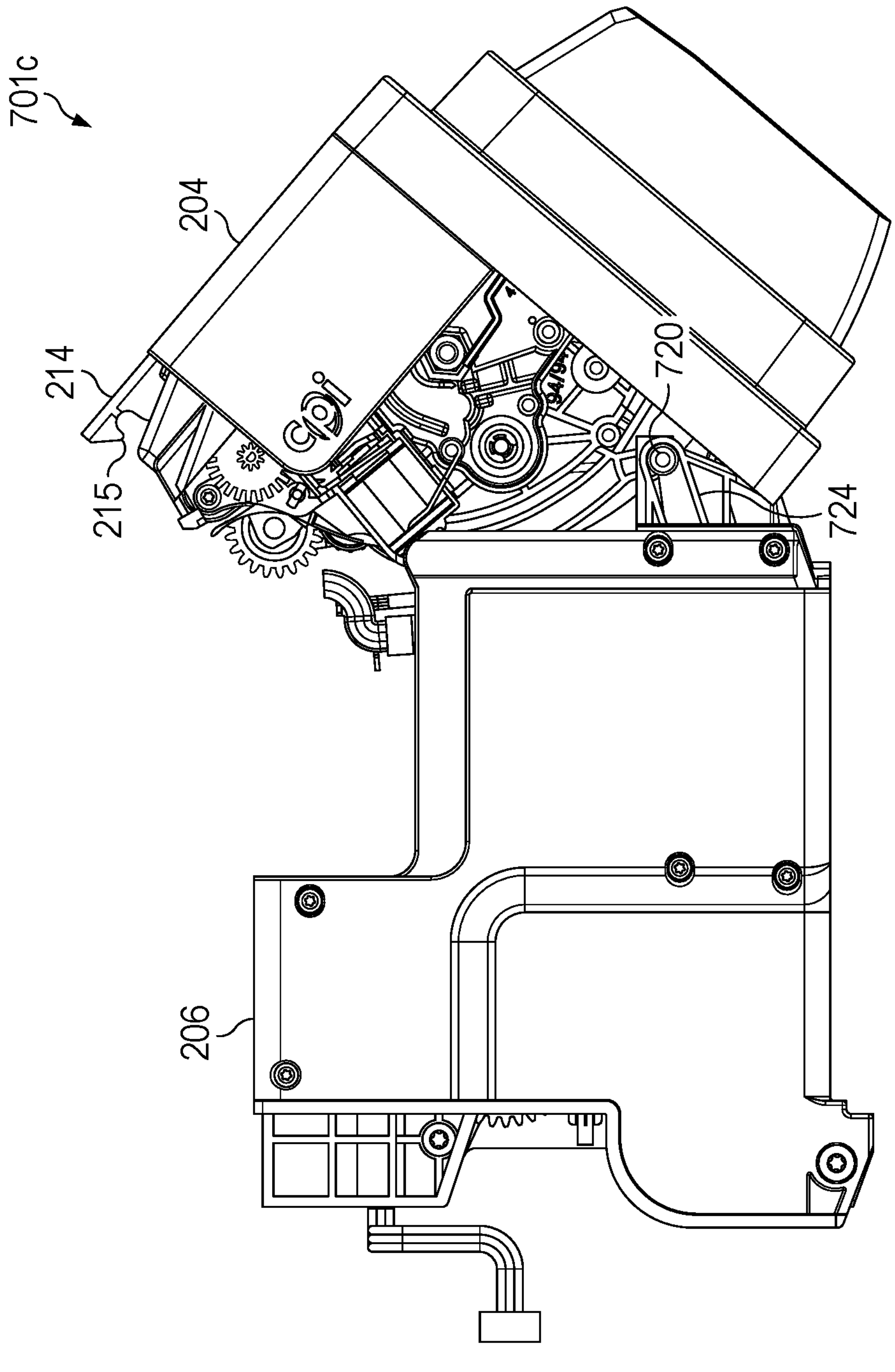
Figure 9G:
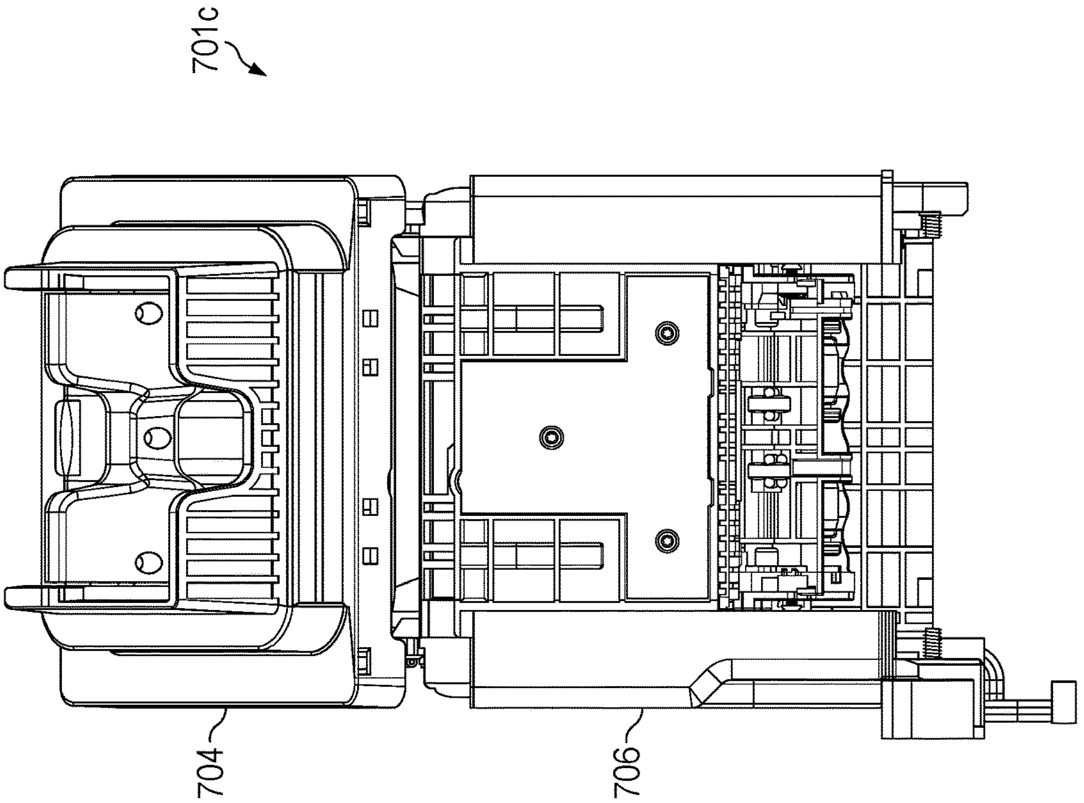
Figure 9F:
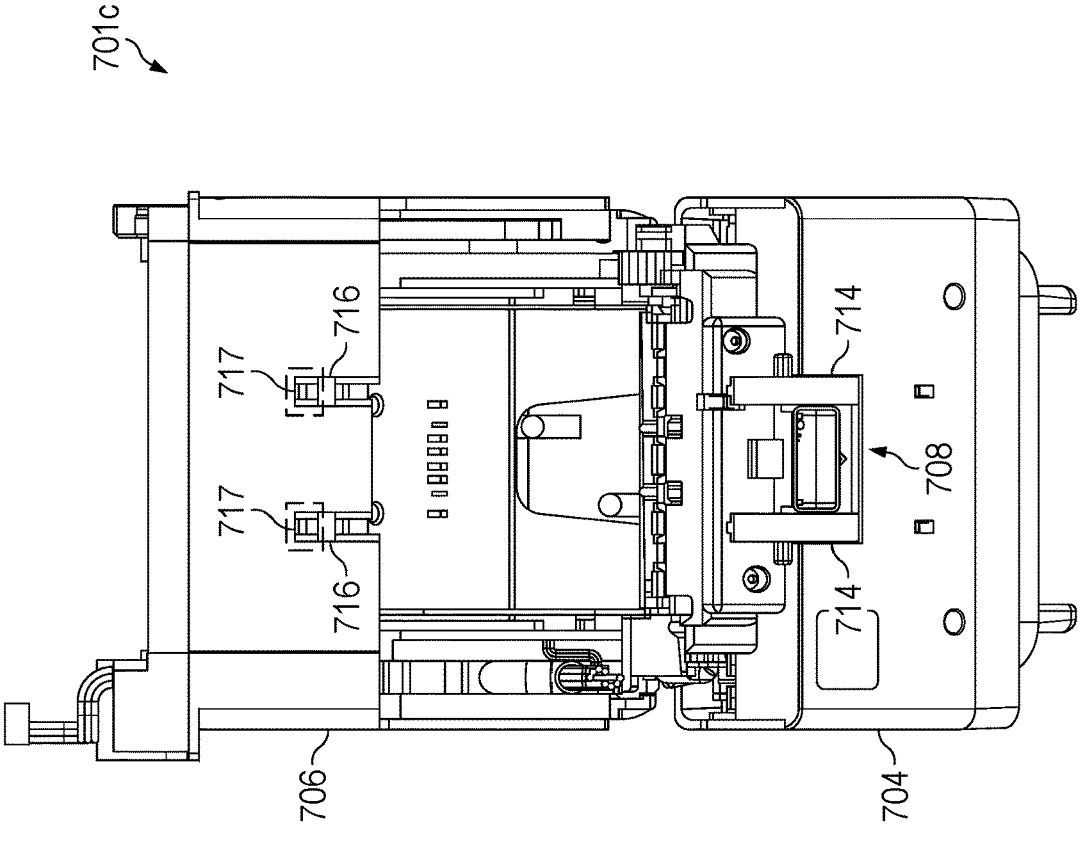
Figure 9H:
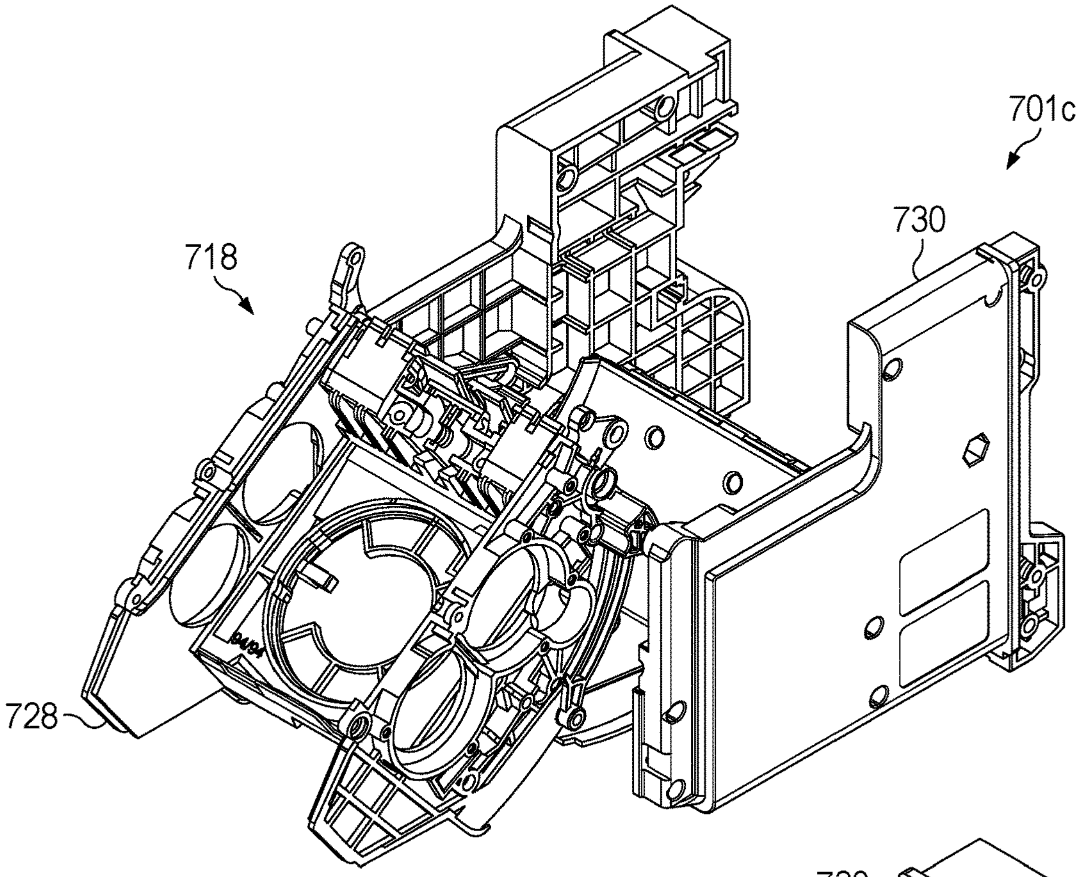
Figure 9I:
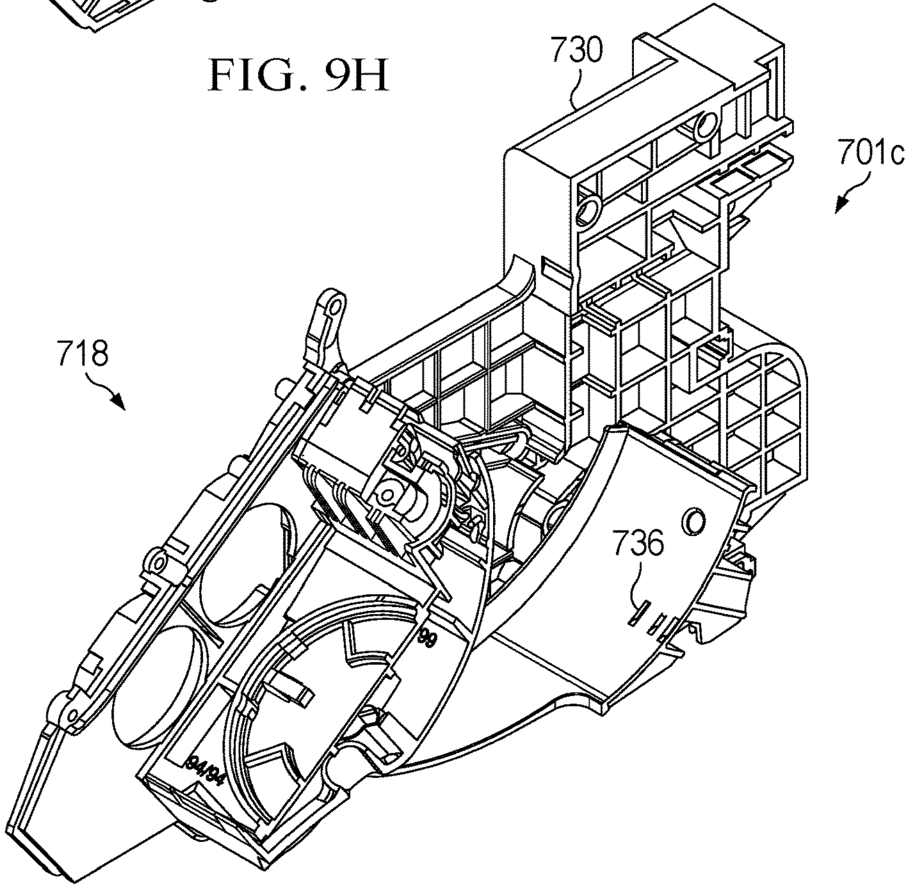
Figure 9J:
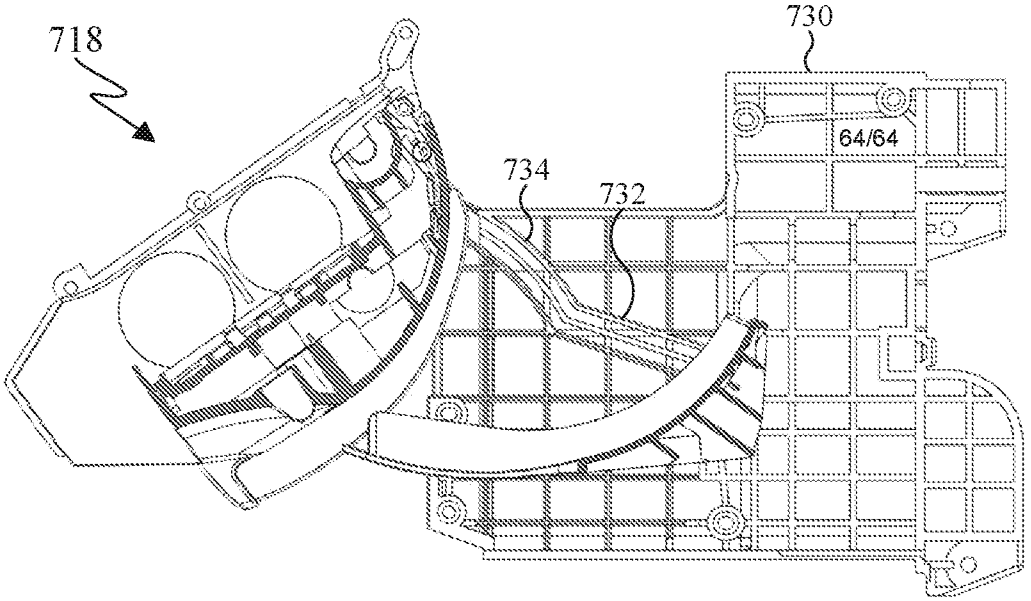
Figure 9K:
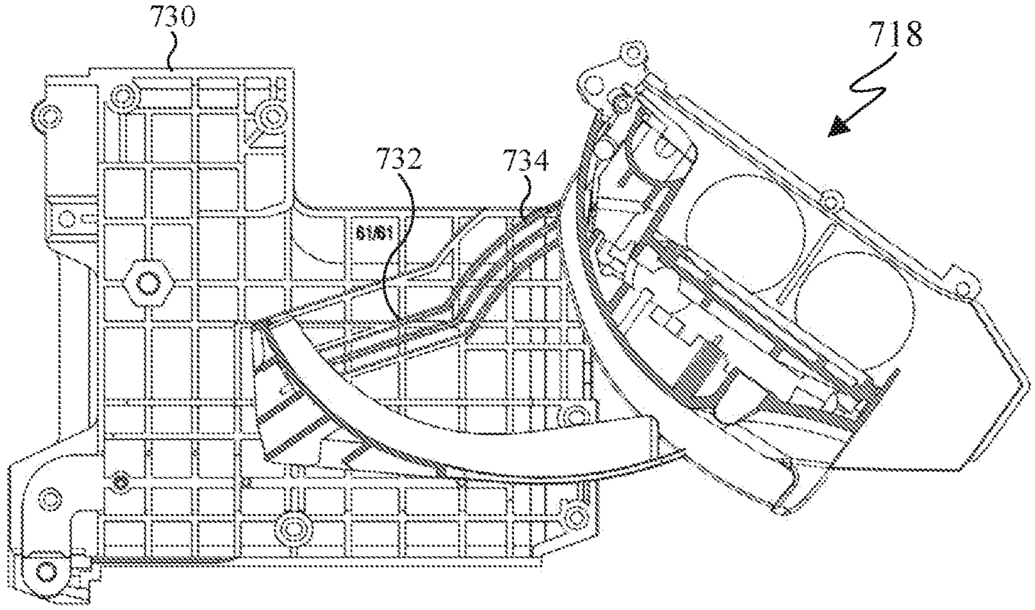

FIGS. 9A through 9K illustrate schematic views of proposed embodiments of a banknote feeder 700 in a hinged position 701*c* in accordance with various embodiments of the present disclosure. FIG. 9A illustrates an example of a banknote feeder 700 in a pulled and hinged position 701*c* from an isometric perspective in accordance with various embodiments of the present disclosure. FIG. 9B illustrates an example of a banknote feeder 700 in a pulled and hinged position 701*c* from a front perspective in accordance with various embodiments of the present disclosure. FIG. 9C illustrates an example of a banknote feeder 700 in a pulled and hinged position 701*c* from a back perspective in accordance with various embodiments of the present disclosure. FIG. 9D illustrates an example of a banknote feeder 700 in a pulled and hinged position 701*c* from a first side perspective in accordance with various embodiments of the present disclosure. FIG. 9E illustrates an example of a banknote feeder 700 in a pulled and hinged position 701*c* from a second side perspective in accordance with various embodiments of the present disclosure. FIG. 9F illustrates an example of a banknote feeder 700 in a pulled and hinged position 701*c* from a top perspective in accordance with various embodiments of the present disclosure. FIG. 9G illustrates an example of a banknote feeder 700 in a pulled and hinged position 701*c* from a bottom perspective in accordance with various embodiments of the present disclosure. FIG. 9H illustrates an example of a banknote feeder 700 in a pulled and hinged position 701*c* with a cover 704 removed from an isometric perspective in accordance with various embodiments of the present disclosure. FIG. 9I illustrates an example cross section of a banknote feeder 700 in a pulled and hinged position 701*c* with a cover 704 removed from an isometric perspective in accordance with various embodiments of the present disclosure. FIG. 9J illustrates an example cross section of a banknote feeder 700 in a pulled and hinged position 701*c* with a cover 704 removed from a first side perspective in accordance with various embodiments of the present disclosure. FIG. 9K illustrates an example cross section of a banknote feeder 700 in a pulled and hinged position 701*c* with a cover 704 removed from a second side perspective in accordance with various embodiments of the present disclosure.

Figure 10A:
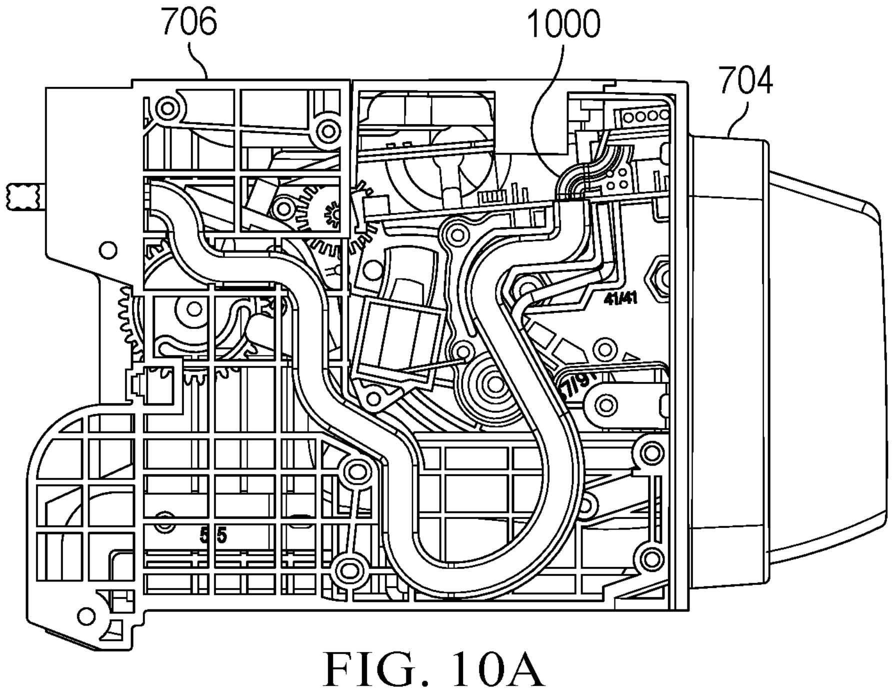
FIGS. 10A through 10C illustrate an example cable arrangement while a banknote feeder is in various positions in accordance with various embodiments of the present disclosure.
Figure 10B:
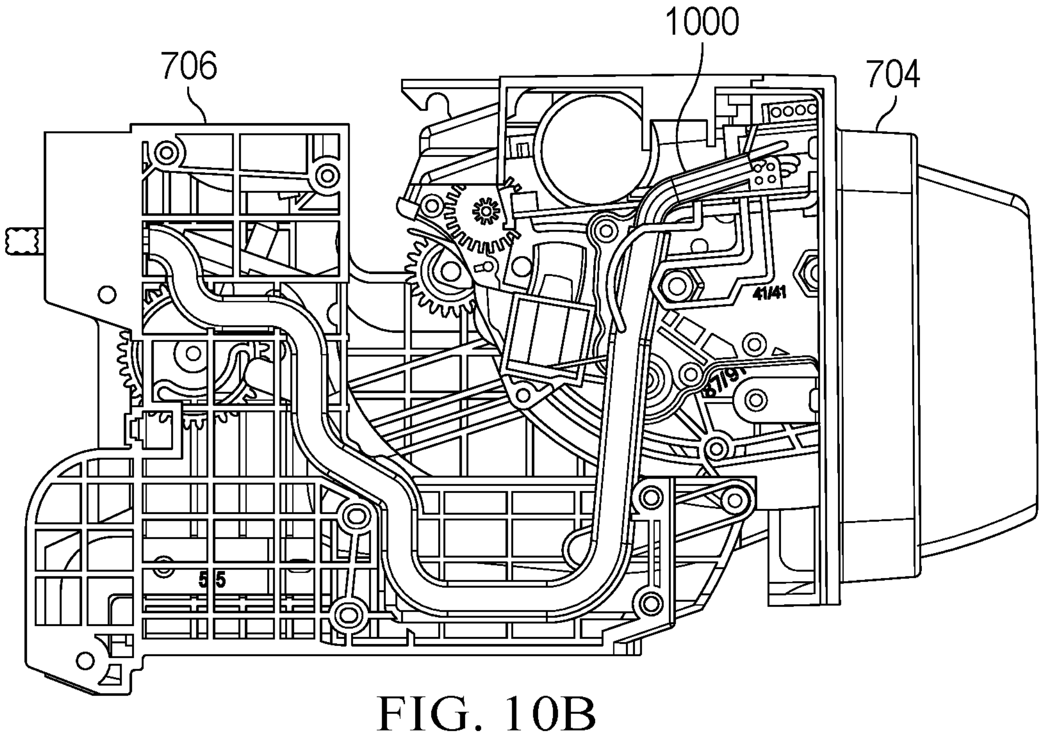
Figure 10C:
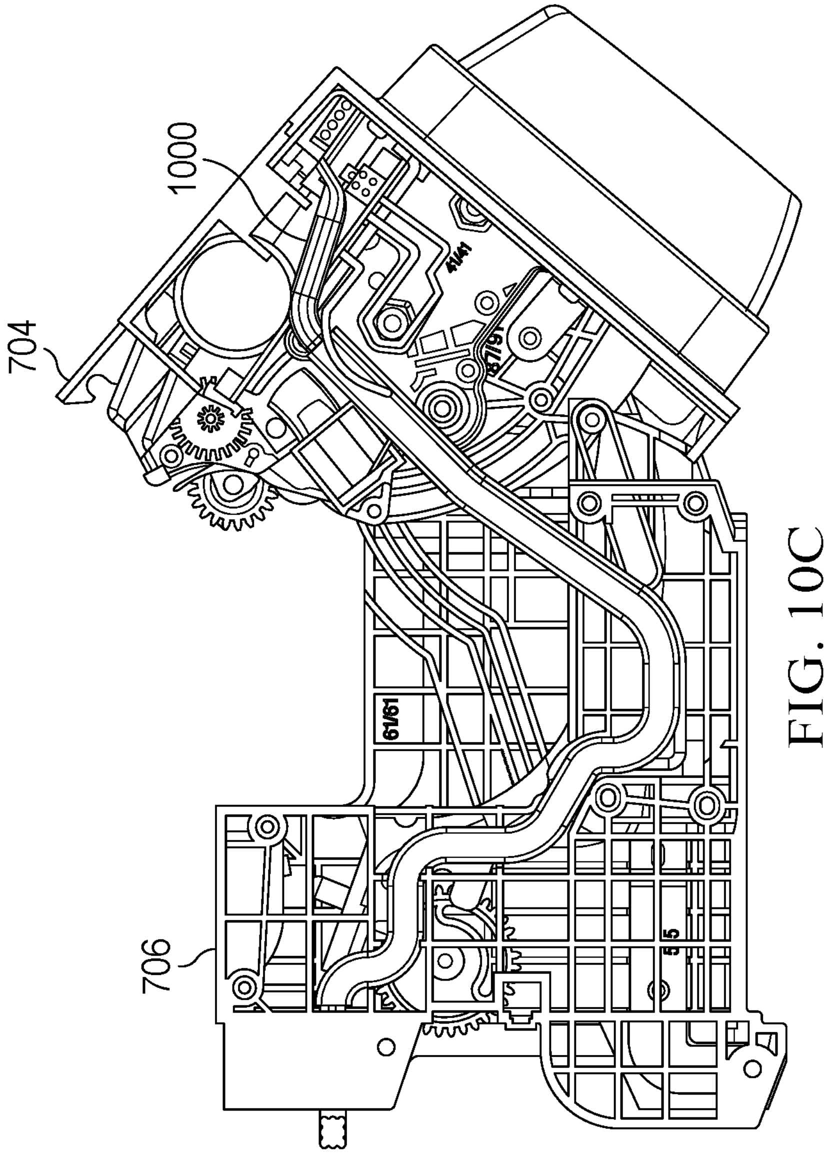

As shown in FIGS. 9A through 9G, the cover 704 of the body has been rotated about a base where the second pins 720 extend into the second slots 724 and act as hinges. When the cover 704 is in the pulled position 701*b* and a jam has been identified, the cover 704 can have an additional movement of rotation applied about the second pins 720 acting as hinges and guided by the first pins 722 through the arc portion 734 of the combination linear and arc slot. In the hinged position 701*c,* complete access is available to the banknote path. In this configuration, the cover 704 could be optionally removed by a technician, which will be described in greater detail in regard to FIGS. 10A through 10C showing the wire configurations. However, the walls that the pins extend from the guide assembly 718 can be made flexible in order for removing the pins for the respective slots. In certain embodiments, the pins can be retractable. In yet other embodiments, an intermediate portion of the slots can have extra width for the pins to be removed in a perpendicular direction to the slot.

As shown in FIGS. 9H through 9K, the first slots 726 can have a linear portion 732 and an arc portion 734. The second pins 720 in the rotated position remain at the same location of the second slots 724 as in the pulled position 701*b.* However, the first pins 722 travel to an end of the second portion that is arced of the first slots 726. The rotation of the cover 704 is limited by the arc portion of the first slots 726.

The banknote cover 204 can include water ingress slits 736. The water ingress slits 736 can be included throughout an interior of the banknote feeder 700 to guide water or other fluid that is introduced into the banknote feeder 700. For example, if water or other fluid is introduced through one of the banknote feeder inlet 710 or the banknote return outlet 712, the series of water ingress slits 736 can guide the water to a water outlet of the banknote feeder 700. The water ingress slits 736 and path of the water ingress is described in greater detail in the description of FIG. 11.

FIGS. 10A through 10C illustrate schematic views of proposed embodiments of wires 1000 in the banknote feeder 700 in each position in accordance with various embodiments of the present disclosure. In particular, FIG. 10A illustrates an arrangement of wire 1000 when the banknote feeder 700 is in an operation position 701*a;* FIG. 10B illustrates an arrangement of wire 1000 when the banknote feeder 700 is in a pulled position 701*b;* and FIG. 10C illustrates an arrangement of wire 1000 when the banknote feeder 700 is in a pulled and hinged position 701*c.*

As shown in FIGS. 10A through 10C, the wires 1000 for the banknote feeder 700 can extend from the body 706 to the cover 704. The wires 1000 can extend along a bottom of the body 706 until reaching the guide assembly 718 of the cover 704. The wire 1000 can include an excess located in a space between the side wall 728 of the banknote accept inlet 710 and the side walls 730 of the body 706. When the cover 704 is in the hinged position 701*c,* the excess wire 1000 can be utilized in order for the wire 1000 to extend completely with the movement of the cover 704. In the hinge positioned, a technician can access and remove the wires 1000 from the connection in the cover 704 before removing the cover 704. The banknote feeder 700 can be detached from the banknote accepting apparatus if the technician needs to replace the banknote feeder 700. The technician can remove the top cover 704, disconnect the harness that connects the banknote feeder 700 with the banknote accepting apparatus. The repair technician then can position the banknote feeder 700 such that the lower pivot pins are at the pivot position, lift the banknote feeder 700 to disengage the second pins 720 from the second slots 724. The first pins 722 can be disengaged and swiveled out of the first slots 726.

Figure 11:
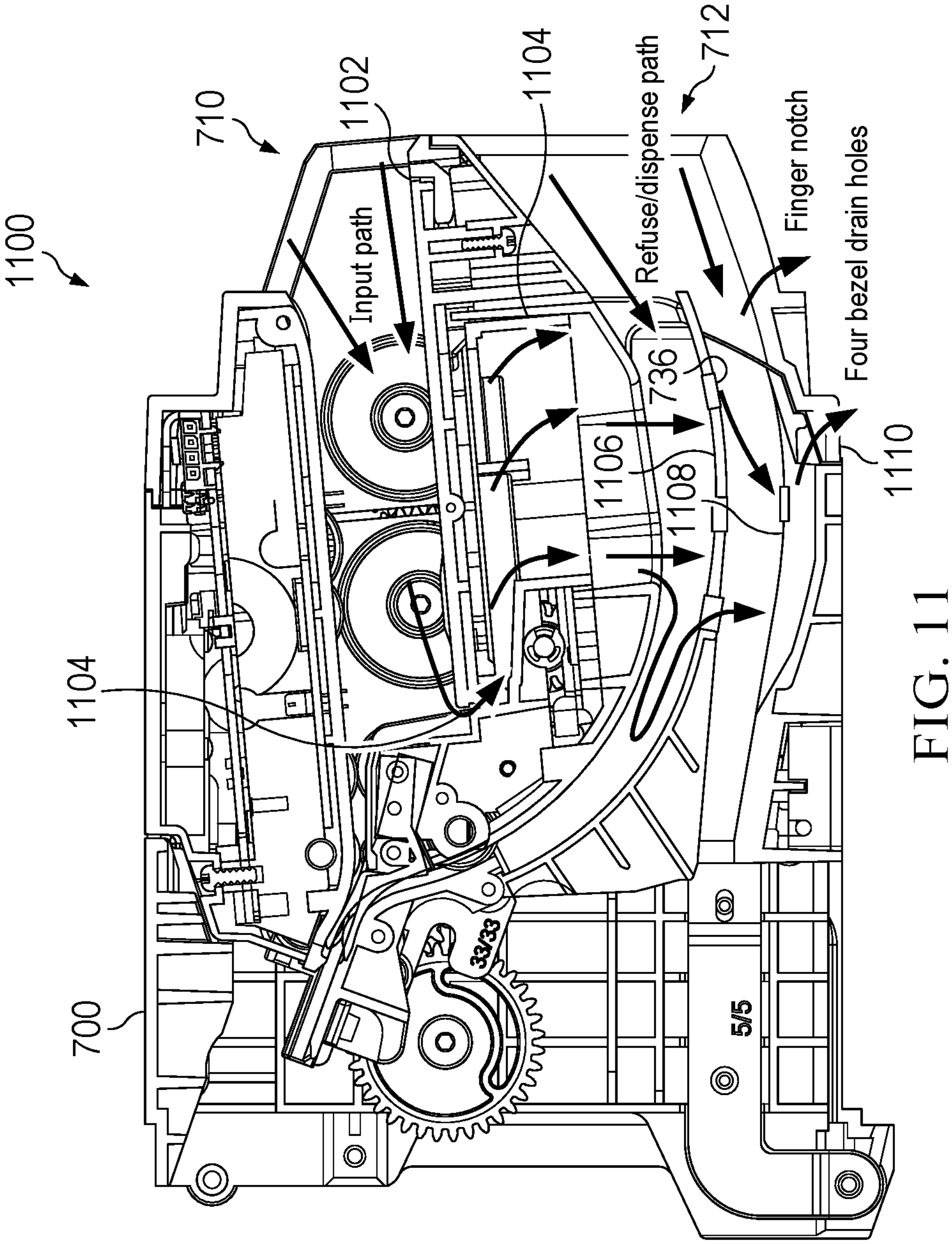
FIG. 11 illustrates example water ingress through a banknote feeder in accordance with various embodiments of the present disclosure.

FIG. 11 illustrates an example of water ingress 1100 through a banknote feeder 700 in accordance with various embodiments of the present disclosure. While described as water, the water ingress 1100 can route and output any fluid through the banknote feeder 700.

When water is introduced into the banknote feeder 700, the water ingress 1100 can properly route the water to an output from the banknote feeder 700. For example, when water is introduced into the accept inlet 710, the water can travel along an angled banknote receiving tray 1102 to a gap or water ingress passage 1104 between the banknote receiving tray 1102 and an interior of the cover 704. A water ingress passage 1104 located within the cover 704 guides the water to a refuse tray 1106 in the return outlet 712. The refuse tray 1106 includes at least one water ingress slit 736 for draining the water introduced to the refuse tray 1106 from the water ingress passage 1104 or directly through the return outlet 712. The water ingress slit 736 can be located at the lowest point of the refuse tray 1106 when installed in the banknote feeder 700 for operation. In embodiments with a curved refuse tray 1106 that is linear in a direction perpendicular to the curve, a series of water ingress slits 736 can be formed into the refuse tray 1106. Additional water ingress slits 736 can be included at various locations away from the lowest point of the curved refuse tray 1106.

The water drained from through the water ingress slit 736 is introduced onto a dispense tray 1108 in the return outlet 712. The dispense tray 1108 includes at least one water ingress slit 736 for draining the water introduced to the dispense tray 1108 from the refuse tray 1106 or directly through the return outlet 712. The water ingress slit 736 can be located at the lowest point of the dispense tray 1108 when installed in the banknote feeder 700 for operation. In embodiments with a curved dispense tray 1108 that is linear in a direction perpendicular to the curve, a series of water ingress slits 736 can be formed into the dispense tray 1108. Additional water ingress slits 736 can be included at various locations away from the lowest point of the curved dispense tray 1108. The water that passes through the water ingress slits 736 of the dispense tray 1108 are guided to a water ingress outlet 1110.

Although FIG. 11 illustrates an example of water ingress 1100 in a banknote feeder 700, various changes may be made to FIG. 11. For example, the water ingress 1100 could be used in banknote feeder 200.

Figure 12:
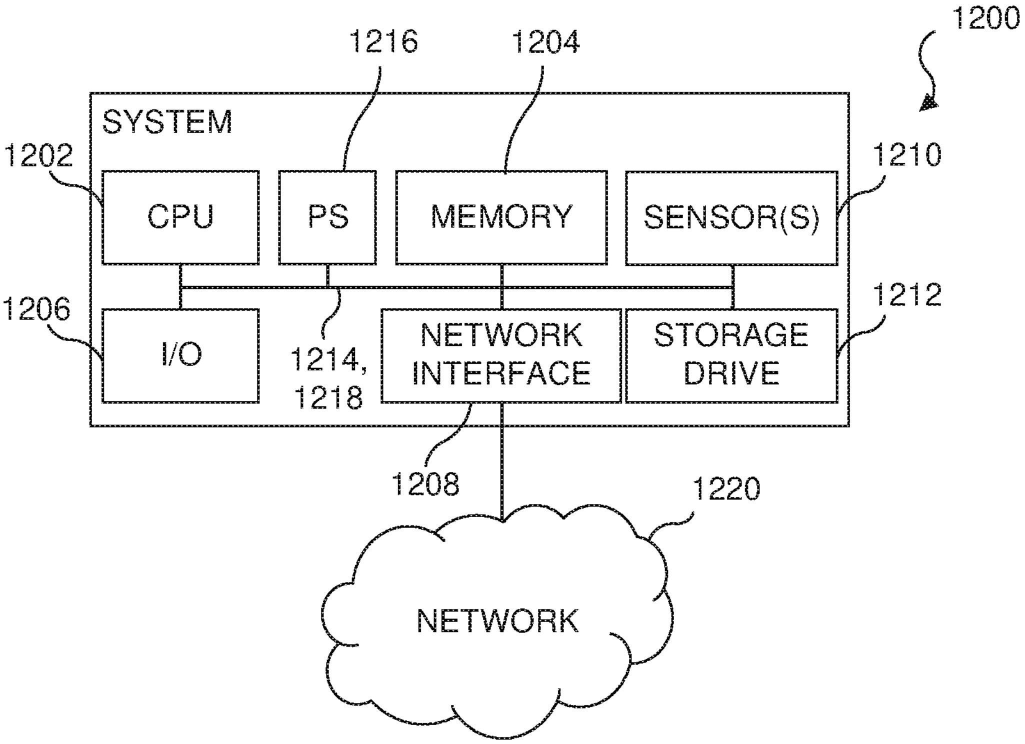
FIGS. 12 and 13 illustrate example electronic systems in accordance with various embodiments of this disclosure.

FIG. 12 illustrates an example electronic device 1200 in accordance with various embodiments of this disclosure. The device 1200 can be one example of a banknote feeder system. The system 1200 can include a controller (e.g., a processor/central processing unit ("CPU")) 1202, a memory unit 1204, and an input/output ("I/O") device 1206. The device 1200 also includes at least one network interface 1208, or network interface controllers (NICs). The device 1200 further includes at least one capture device 1210 for capturing media or inputs to the system through an I/O device. In some embodiments, the capture device is not included. The device 1200 also includes a storage drive 1212 used for storing content such as PIN inputs. The components 1202, 1204, 1206, 1208, 1210, and 1212 are interconnected by a data transport system (e.g., a bus) 1214. A power supply unit (PSU) 1216 provides power to components of the system 1200 via a power transport system 1218 (shown with data transport system 1214, although the power and data transport systems may be separate).

It is understood that the system 1200 may be differently configured and that each of the listed components may actually represent several different components. For example, the CPU 1202 may actually represent a multi-processor or a distributed processing system; the memory unit 1204 may include different levels of cache memory, and main memory; the I/O device 1206 may include monitors, keyboards, touchscreens, and the like; the at least one network interface 1208 may include one or more network cards providing one or more wired and/or wireless connections to a network 1220; and the storage drive 1212 may include hard disks and remote storage locations. Therefore, a wide range of flexibility is anticipated in the configuration of the system 1200, which may range from a single physical platform configured primarily for a single user or autonomous operation to a distributed multi-user platform such as a cloud computing system.

The system 1200 may use any operating system (or multiple operating systems), including various versions of operating systems provided by Microsoft (such as WINDOWS), Apple (such as Mac OS X), UNIX, RTOS, and LINUX, and may include operating systems specifically developed for handheld devices (e.g., iOS, Android, RTOS, Blackberry, and/or Windows Phone), personal computers, servers, and other computing platforms depending on the use of the system 1200. In some embodiments, the system 1200 can be a compact system such as a Raspberry Pi running a Linux-based operating system such as Debian. The operating system, as well as other instructions (e.g., for telecommunications and/or other functions provided by the device 1200), may be stored in the memory unit 1204 and executed by the processor 1202. For example, if the system 1200 is, or is part of, the device 200, the memory unit 1204 may include instructions for performing some or all of the steps, process, and methods described herein.

The network 1220 may be a single network or may represent multiple networks, including networks of different types, whether wireless or wired. For example, the device 1200 may be coupled to external devices via a network that includes a cellular link coupled to a data packet network or may be coupled via a data packet link such as a wide local area network (WLAN) coupled to a data packet network or a Public Switched Telephone Network (PSTN). Accordingly, many different network types and configurations may be used to couple the device 1200 with external devices.

Figure 13:
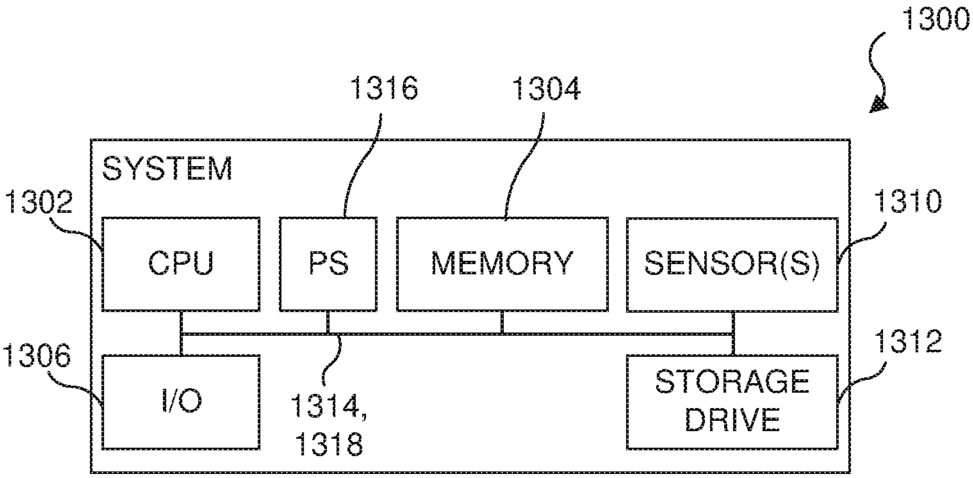

FIG. 13 illustrates an example electronic device 1300 in accordance with various embodiments of this disclosure. The device 1300 can be one example of a banknote feeder device. The system 1300 includes a controller (e.g., a processor/central processing unit ("CPU")) 1302, a memory unit 1304, and an I/O device 1306. The device 1300 further includes at least one capture device 1310 for capturing media or inputs to the system through an I/O device. In some embodiments, the capture device is not included. The device 1300 also includes a storage drive 1312 used for storing content such as PIN inputs. The components 1302, 1304, 1306, 1310, and 1312 are interconnected by a data transport system (e.g., a bus) 1314. A PSU 1316 provides power to components of the system 1300 via a power transport system 1318 (shown with data transport system 1314, although the power and data transport systems may be separate).

It is understood that the system 1300 may be differently configured and that each of the listed components may actually represent several different components. For example, the CPU 1302 may actually represent a multi-processor or a distributed processing system; the memory unit 1304 may include different levels of cache memory, and main memory; the I/O device 1306 may include monitors, keyboards, touchscreens, and the like; and the storage drive 1312 may include hard disks and remote storage locations. Therefore, a wide range of flexibility is anticipated in the configuration of the system 1300, which may range from a single physical platform configured primarily for a single user or autonomous operation to a distributed multi-user platform such as a cloud computing system.

The system 1300 may use any operating system (or multiple operating systems), including various versions of operating systems provided by Microsoft (such as WINDOWS), Apple (such as Mac OS X), UNIX, RTOS, and LINUX, and may include operating systems specifically developed for handheld devices (e.g., iOS, Android, RTOS, Blackberry, and/or Windows Phone), personal computers, servers, and other computing platforms depending on the use of the system 1300. In some embodiments, the system 1300 can be a compact system such as a Raspberry Pi running a Linux-based operating system such as Debian. The operating system, as well as other instructions (e.g., for telecommunications and/or other functions provided by the device 1300), may be stored in the memory unit 1304 and executed by the processor 1302. For example, if the system 1300 is, or is part of, the device 200, the memory unit 1304 may include instructions for performing some or all of the steps, process, and methods described herein.

In various embodiments, a banknote feeder can include a body 206 and a cover 204 meant to contain internal component for feeding banknotes. The cover 204 can be arranged in three different positions in relation to the body including an operational position 201*a*, a pulled position 201*b*, and a hinged position 201*c*. The operational position 201*a* is an arrangement where the cover is coupled to with a latch 208 to enclose the banknote path. The latch 208 can extend from the cover 204 or the body 206. The pulled position 201*b* exposes the banknote path in order to identify a banknote jam along the banknote path in the banknote feeder and is an arrangement where second pins on the cover are linearly moved along a second slot 224 of a banknote accept inlet positioned in the body and first pins on the cover are linearly moved along a linear portion of a combined linear and arc slot on sidewalls of the body. The hinged position 201*c* rotates the cover away from the body to allow access to remove the identified banknote jam and is an arrangement where the second pins operate as a hinge and the first pins travel along an arc portion of the combination linear and arc slot.

In various embodiments, a banknote feeder can include a body 206, a banknote accept inlet, a cover 204, and a wire 600. The body 206 can include a first slots 226 positioned in each side wall. The banknote accept inlet 210 can be positioned inside the body 206 including second slots 224 positioned in each side wall. The cover 204 can include a guide assembly 218 and a latch 208. The guide assembly 218 can connect to the body and can include a set of second pins and a set of first pins. The second pins are configured to insert into the second slots 224. The first pins are configured to insert into the first slots 226. The latch 208 is configured to secure the cover to the body. The wire can extend from the body to the cover. The cover can be arranged in an operational position, a pulled position 201*b*, and a hinged position 201*c*. The operational position is where the second pins are at a first end of the second slot 224, the first pins are at a first end of a linear portion of the first slots 226, and the latch 208 is secured to the body. The pulled position 201*b* is where the latch 208 is removed from the body, the second pins have been moved to a second end of the second slot 224, and the first pins are between the linear portion and an arc portion of the combination arc and second slot 224. The hinged position 201*c* is where the second pins remain at the second end of the second slot 224 to act as hinges as the first pins are transitioned to an end of the arc portion of the first slots 226. In the hinged position 201*c*, the second pins can be removable from the second slot 224, the first pins can be removable from the combination linear and arc slot, and the wire is accessible to be disconnected from the cover.

In various embodiments, a banknote feeder 700 includes a body 706 and a cover 704. The body 706 is configured to attach to a banknote receiver. The cover 704 is removably coupled to the body 706 using a guide assembly 718. The guide assembly 718 is configured to linearly guide the cover 704 in an operational position away from the body 706 to a pulled position 701*b*. The guide assembly 718 is also configured to rotatably guide the cover 704 away from the pulled position 701*b* to a hinged position 701*c*.

In certain embodiments, the body 706 comprises first slots 726 positioned on each side wall of the body 706. The guide assembly 718 includes first pins insert into the first slots 726 and are configured to linearly and rotatably guide the cover 704 from the operational position to the pulled position 701*b* and from the pulled position 701*b* to the hinged position 701*c*.

In certain embodiments, the first slots 726 include a linear portion configured to guide the first pins to move the cover 704 from the operational position to the pulled position 701*b*.

In certain embodiments, the first slots 726 include an arc portion configured to guide the first pins to rotate the cover 704 from the pulled position 701*b* to the hinged position 701*c*.

In certain embodiments, the body 706 includes second slots positioned on each side wall of the body 706. The guide assembly 718 includes second pins inserted into the second slots and are configured to not allow rotation of the cover 704 through a linear motion of the cover 704 from the operational position to the pulled position 701*b*.

In certain embodiments, the second pins are further configured to not allow linear movement of the cover 704 through a rotation motion of the cover 704 from the pulled position 701*b* to the hinged position 701*c*.

In certain embodiments, the banknote feeder 700 further includes a latch 708 is fixedly coupled to the cover 704 and removably coupled to the body 706 and is configured to maintain the cover 704 in the operational position while removably coupled to the body 706.

In certain embodiments, the latch 708 includes a groove and a prong. The groove is formed in the body 706. The prong is coupled to the cover 704 and configured to insert into the groove in the body 706 to maintain the cover 704 in the operational position.

In certain embodiments, the groove includes a depression on a lower surface of the groove. The prong includes a protrusion extending from a lower surface of the prong and the protrusion is configured to insert into the depression to lock the prong into the groove.

In certain embodiments, the banknote feeder 700 further includes a dispense tray in a dispense outlet. The dispense tray includes a water ingress slot configured to route a fluid introduced into the banknote feeder 700 to an exterior of the banknote feeder 700.

In various embodiments, a banknote system includes a banknote receiver and a banknote feeder 700. The banknote feeder 700 includes a body 706 and a cover 704. The body 706 is configured to attach to a banknote receiver. The cover 704 is removably coupled to the body 706 using a guide assembly 718. The guide assembly 718 is configured to linearly guide the cover 704 in an operational position away from the body 706 to a pulled position 701*b*. The guide assembly 718 is also configured to rotatably guide the cover 704 away from the pulled position 701*b* to a hinged position 701*c*.

In certain embodiments, the body 706 comprises first slots 726 positioned on each side wall of the body 706. The guide assembly 718 includes first pins inserted into the first slots 726 and configured to linearly and rotatably guide the cover 704 from the operational position to the pulled position 701*b* and from the pulled position 701*b* to the hinged position 701*c*.

In certain embodiments, the first slots 726 include a linear portion configured to guide the first pins to allow the cover 704 to move from the operational position to the pulled position 701*b*.

In certain embodiments, the first slots 726 include an arc portion configured to guide the first pins rotate the cover 704 from the pulled position 701*b* to the hinged position 701*c*.

In certain embodiments, the body 706 includes second slots positioned on each sidewall of the body 706. The guide assembly 718 includes second pins inserted into the second slots and configured to not allow rotation of the cover 704 through a linear motion of the cover 704 from the operational position to the pulled position 701*b*.

In certain embodiments, the second pins are further configured to not allow linear movement of the cover 704 through a rotation motion of the cover 704 from the pulled position 701*b* to the hinged position 701*c*.

In certain embodiments, the banknote feeder 700 further comprises a latch 708 fixedly coupled to the cover 704 and removably coupled to the body 706 and configured to maintain the cover 704 in the operational position while removably coupled to the body 706.

In certain embodiments, the latch 708 comprises a groove formed in the body 706 and a prong coupled to the cover 704 and configured to insert into the groove in the body 706 to maintain the cover 704 in the operational position.

In certain embodiments, the groove includes a depression on a lower surface of the groove. The prong includes a protrusion extending from a lower surface of the prong. The protrusion is configured to insert into the depression to lock the prong into the groove.

In certain embodiments, the banknote feeder 700 further comprises a dispense tray in a dispense outlet. The dispense tray includes a water ingress slot configured to route a fluid introduced into the banknote feeder 700 to an exterior of the banknote feeder 700.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A banknote feeder comprising:
- a body configured to removably attach to a banknote receiver, wherein the banknote feeder receives banknotes fed into the banknote feeder and transports the banknotes to the banknote receiver; and
- a cover removably coupled to the body of the banknote feeder using a guide assembly, wherein the guide assembly is configured to:
  - linearly guide the cover from an operational position to a pulled position away from the body; and
  - rotatably guide the cover away from the pulled position to a hinged position.

2. The banknote feeder of claim 1, wherein:
- the body comprises a plurality of side walls;
- the body comprises first slots positioned on each side wall of the plurality of side walls; and
- the guide assembly includes first pins inserted into the first slots and configured to linearly and rotatably guide the cover from the operational position to the pulled position and from the pulled position to the hinged position.

3. The banknote feeder of claim 2, wherein the first slots include a linear portion configured to guide the first pins to move the cover from the operational position to the pulled position.

4. The banknote feeder of claim 2, wherein the first slots include an arc portion configured to guide the first pins rotate the cover from the pulled position to the hinged position.

5. The banknote feeder of claim 2, wherein:
- the body includes second slots positioned on each side wall of the body, and
- the guide assembly includes second pins inserted into the second slots and configured to not allow rotation of the cover through a linear motion of the cover from the operational position to the pulled position.

6. The banknote feeder of claim 5, wherein the second pins are further configured to not allow linear movement of the cover through a rotation motion of the cover from the pulled position to the hinged position.

7. The banknote feeder of claim 1, further comprising a latch fixedly coupled to the cover and removably coupled to the body and configured to maintain the cover in the operational position while removably coupled to the body.

8. The banknote feeder of claim 7, wherein the latch comprises:
- a groove formed in the body, and
- a prong coupled to the cover and configured to insert into the groove in the body to maintain the cover in the operational position.

9. The banknote feeder of claim 8, wherein:
- the groove includes a depression on a lower surface of the groove, and
- the prong includes a protrusion extending from a lower surface of the prong, the protrusion configured to insert into the depression to lock the prong into the groove.

10. The banknote feeder of claim 1, further comprising:
- a dispense tray in a dispense outlet, the dispense tray including a water ingress slot configured to route a fluid introduced into the banknote feeder to an exterior of the banknote feeder.

11. A banknote system comprising:
- a banknote receiver; and
- a banknote feeder coupled to the banknote receiver, the banknote feeder comprising:
  - a body configured to removably attach to the banknote receiver, wherein the banknote feeder receives banknotes fed into the banknote feeder and transports the banknotes to the banknote receiver; and
  - a cover removably coupled to the body of the banknote feeder using a guide assembly, wherein the guide assembly is configured to:
  - linearly guide the cover from an operational position to a pulled position away from the body; and
  - rotatably guide the cover away from the pulled position to a hinged position.

12. The banknote system of claim 11, wherein:
- the body comprises a plurality of side walls;
- the body comprises first slots positioned on each side wall of the plurality of side walls; and
- the guide assembly includes first pins inserted into the first slots and configured to linearly and rotatably guide the cover from the operational position to the pulled position and from the pulled position to the hinged position.

13. The banknote system of claim 12, wherein the first slots include a linear portion configured to guide the first pins to move the cover from the operational position to the pulled position.

14. The banknote system of claim 12, wherein the first slots include an arc portion configured to guide the first pins to rotate the cover from the pulled position to the hinged position.

15. The banknote system of claim 12, wherein:
- the body includes second slots positioned on each side wall of the body, and
- the guide assembly includes second pins inserted into the second slots and configured to not allow rotation of the cover through a linear motion of the cover from the operational position to the pulled position.

16. The banknote system of claim 15, wherein the second pins are further configured to not allow linear movement of the cover through a rotation motion of the cover from the pulled position to the hinged position.

17. The banknote system of claim 11, wherein the banknote feeder further comprises a latch fixedly coupled to the cover and removably coupled to the body and configured to maintain the cover in the operational position while removably coupled to the body.

18. The banknote system of claim 17, wherein the latch comprises:

a groove formed in the body, and a prong coupled to the cover and configured to insert into the groove in the body to maintain the cover in the operational position.

19. The banknote system of claim 18, wherein:

the groove includes a depression on a lower surface of the groove, and the prong includes a protrusion extending from a lower surface of the prong, the protrusion configured to insert into the depression to lock the prong into the groove.

20. The banknote system of claim 11, the banknote feeder further comprises:

a dispense tray in a dispense outlet, the dispense tray including a water ingress slot configured to route a fluid introduced into the banknote feeder to an exterior of the banknote feeder.

* * * * *